US006789252B1

(12) United States Patent
Burke et al.

(10) Patent No.: US 6,789,252 B1
(45) Date of Patent: Sep. 7, 2004

(54) BUILDING BUSINESS OBJECTS AND BUSINESS SOFTWARE APPLICATIONS USING DYNAMIC OBJECT DEFINITIONS OF INGREDIENTIAL OBJECTS

(76) Inventors: Miles D. Burke, 3102 Squaw Peak Cir., Phoenix, AZ (US) 85016; Richard J. Solar, Jr., 4012 N. 40$^{th}$ Pl., Phoenix, AZ (US) 85018

( * ) Notice: Subject to any disclaimer, the term of this patent is extended or adjusted under 35 U.S.C. 154(b) by 0 days.

(21) Appl. No.: 09/550,407

(22) Filed: Apr. 14, 2000

Related U.S. Application Data

(60) Provisional application No. 60/129,767, filed on Apr. 15, 1999, and provisional application No. 60/193,897, filed on Mar. 31, 2000.

(51) Int. Cl.$^7$ ................................................. G06F 9/44
(52) U.S. Cl. ....................................... 717/100; 717/103
(58) Field of Search ................................. 717/100, 103

(56) References Cited

U.S. PATENT DOCUMENTS

| | | | | | |
|---|---|---|---|---|---|
| 5,729,253 | A | * | 3/1998 | Mashita et al. | 345/763 |
| 5,729,747 | A | * | 3/1998 | Tsukakoshi | 717/106 |
| 5,787,438 | A | * | 7/1998 | Cink et al. | 707/103 R |
| 5,860,005 | A | * | 1/1999 | Inoue | 717/101 |
| 5,864,821 | A | * | 1/1999 | Hosoda et al. | 705/8 |
| 6,067,548 | A | * | 5/2000 | Cheng | 707/103 R |
| 6,125,391 | A | * | 9/2000 | Meltzer et al. | 709/223 |
| 6,199,195 | B1 | * | 3/2001 | Goodwin et al. | 717/104 |
| 6,226,675 | B1 | * | 5/2001 | Meltzer et al. | 709/223 |

OTHER PUBLICATIONS

Template Software, Workflow Template Process Template, "Developing a WFt Workflow System", 1997, Whole manual.*

Template Software, SNAP Foundation Template, , "Using the SNAP Development Environment", 1998, whole manual.*

"Communications of the ACM" Cover and TOC Only, Feb. 2002, vol. 45, Number.*

"Building Business Objects", Peter Eeles et al, COVER Only, Mar. 30, 1998.*

* cited by examiner

*Primary Examiner*—Todd Ingberg
(74) *Attorney, Agent, or Firm*—Richard E. Oney; Fennemore Craig, PC

(57) ABSTRACT

A method and system are provided for providing an open and extensible object definition framework that manages business object definitions as specifications. This framework may be used to dynamically define any object that is to be processed by a computer. Objects can include Properties, Classifications, Knowledge, Business Objects, and Business Rules to name a few. Some examples of typical Business Objects include: business and social entities; locations, including spaces, places and channels; activities, including events and processes; items, including products and services; and business records, including orders and other forms of demand, inventory, jobs, deliverables, statements, transaction history et. al. The method and system may be used to define any object that is to be processed by a computer. Objects can include Properties, Classifications, Knowledge, Business Objects, and Business Rules to name a few. Typical Business Objects include: Business and social entities; Locations including spaces, places, and channels; Activity including events and processes; Items including products and services; Business Records including orders and other forms of demand, inventory, jobs, deliverables, statements, transaction history et. al.

237 Claims, 72 Drawing Sheets

VIEWS CONSIST OF PRESET, COLLECTED, AND DERIVED CONTENT
...SOME VIEWS ARE EXCLUSIVELY DERIVED FROM PRIOR VIEWS

CLONE SPECIFICATION
MAKE A COPY OF ANY SPECIFICATION

MODEL DRIVEN SPECIFICATION

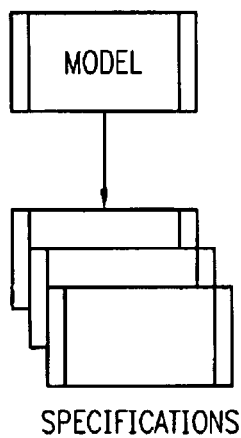

SPECIFICATIONS

- MODEL DEFINES: <u>FORM, FIT AND FUNCTION</u> OF THE SPECIFICATION
- FOR EXAMPLE: HR SHEET PRODUCT MODEL CONTAINS ALL ATTRIBUTES RELATED TO THAT TYPE OF STEEL PRODUCT
- IF ITS NOT IN THE MODEL ITS NOT IN THE SPECIFICATION
- SPECIFICATIONS ARE COPIES OF MODELS THAT ARE INDIVIDUALLY CUSTOMIZED
- <u>WHEN</u> THE BUSINESS CHANGES, SUCH AS CUSTOMERS NOW SPECIFY THE "INSIDE DIAMETER" AND HAS NOT BEEN DONE BEFORE:
  - PLACE "INSIDE DIAMETER" IN THE MODEL, AND RELEASE THE NEW REVISION OF THE MODEL
  - CUSTOMERS CAN NOW SPECIFY "INSIDE DIAMETER"
  - IF IT IS A ONCE IN A BLUE MOON REQUIREMENT, PUT IT IN "SPECIAL PRODUCT INSTRUCTIONS" AS TEXT INSTEAD OF UPDATING THE MODEL.

CREATE AN ATTRIBUTE

DYNAMIC ATTRIBUTE

FIG. 14

ATTACH ATTRIBUTE TO THE SPECIFICATION

FIG. 15

SEARCH BY ATTRIBUTE

XML INTERFACE

THE XML BRIDGE

Product Specification

Product ID 960-01324  Description  Single Reduced Electrolytic Tin Plate Carbon Ferrostan
Revision 1  Customer  Phoenix Can Company

| Partition | Element | Rev | Description | Value① | Min① | Nom① | Max① | UOM① | T O I① | U O M① |
|---|---|---|---|---|---|---|---|---|---|---|
| Product | | | Product Attributes | | | | | | | |
| | Grade | 1 | Steel Grade | 960① | | | | | | |
| | SteelType | 1 | Steel Type | | | | | | | |
| | SEUC | 1 | Specific End Use Code | 603x700 Welded① Body | | | | | | |
| | ChemTreat | 1 | Chemical Treatment | CDC311① | | | | | | |
| | PinHoles | 1 | Pin Holes | | 0① | | 40① | each① | | |
| | Finish | 1 | Finish | 7C① | | | | | | |
| | BandEdgeType | 1 | Band Edge Type | CE① | | | | | | |
| | BandEdgeTrim | 1 | Band Edge Trim | | | .10① | | inch① | | |
| | Branding | 1 | Branding | | | | | | | |
| | Temper | 1 | Temper | | | | | | | |
| ProductDimensions | | | Product Dimensions | | | | | | | |
| | Width | 1 | Width | | | 36① | | inch① | | |
| | WidthTolerance | 1 | Width Tolerance | | .000① | | +.0125① | inch① | | |
| | Gauge | 1 | Gauge | | .018① | | .025① | inch① | | |
| | GaugeTolSpecType | 1 | Guage Tolerance Specification Type | | | | | | | |
| | GuageTolerance | 1 | Guage Tolerance | | | | | inch① | | |
| | FlatnessTolerance | 1 | Flatness Tolerance | | | | | %① | | |
| PhysicalLimits | | | Physical Limitations | | | | | | | |
| | Weight | 1 | Weight | | | | 25000① | Lbs.① | | |
| | InsideDiameter | 1 | Inside Diameter | | | | 20① | inch① | | |
| | OutsideDiameter | 1 | Outside Diameter | | | | 72① | inch① | | |
| Coating | | | Coating | | | | | | | |
| | CoatingType | 1 | Coating Type | | | | | | | |
| | CoatingWeight | 1 | Coating Weight | | | | | | | |
| | Branding | 1 | Branding | | | | | | | |
| | LineMark | 1 | Line Mark | Outside① | | | | | | |
| Oiling | | | Oiling | | | | | | | |
| | OilType | 1 | Oil Type | | | | | | | |
| | OilAmount | 1 | Oil Amount | | | | | | | |
| Weld | | | Weld Restrictions | | | | | | | |
| | WeldRule | 1 | Weld Rule | ATM OK① | | | | | | |
| SrcMaterialReq | | | Source Material Requirements | | | | | | | |
| | MaxHeatsperCoil | 1 | Max Heats Per Coil | | | | | | | |
| | Min.WeightPerHeat | 1 | Min. Weight Per Heat | | | | | | | |
| | ReqSingleHeatCoils | 1 | Require Single Heat Coils | | | | | | | |
| | ExclDeoxPractice | 1 | Exclusive Deox Practice | | | | | | | |
| | StripSourceRule | 1 | Strip Source | | | | | | | |
| | MeltSourceRule | 1 | Melt Source | | | | | | | |
| Marking | | | Marking | | | | | | | |
| | LabelType | 1 | Label Type | Tin Std Domestic ① | | | | | | |
| Packing | | | Packing | | | | | | | |
| | Orientation | 1 | Orientation | Eye Vertical① | | | | | | |
| | WrapMaterial | 1 | Wrap Material | Paper① | | | | | | |
| | Pallet | 1 | Pallet? | Yes① | | | | | | |
| | Banding | 1 | # of Bands | 2① | | | | | | |
| | Blocking | 1 | Blocking | All Sides① | | | | | | |
| | WindingDirection | 1 | Winding Direction | Clockwise ① | | | | | | |
| Loading | | | Loading | | | | | | | |
| | Tiedowns | 1 | Tie Downs | 4① | | | | | | |
| | Tarp? | 1 | Tarp? | No① | | | | | | |
| | MeltSourceRule | 1 | Melt Source | | | | | | | |
| HRL | | | Hot Roll Source | | | | | | | |
| | Grade | 1 | Grade | 960① | | | | | | |
| | Guage | 1 | Guage | | | | | | | |
| | Width | 1 | Width | | | | | | | |
| PCM | | | Pickle Cold Roll | | | | | | | |
| | Trim-BE? | 1 | Trim Band Edge? | | | | | | | |
| | Width | 1 | Band With | | 36.25① | | 37.25① | inch① | | |

FIG. 44A-2

| | | | | | | | | | | |
|---|---|---|---|---|---|---|---|---|---|---|
| | Guage | 1 | Guage | | .022③ | | .032 ① | inch① | | |
| | Sleeve? | 1 | Sleeve? | Yes ① | | | | | | |
| | Band? | 1 | Band? | Yes ① | | | | | | |
| | BandEdgeTrim | 1 | Band Edge Trim? | No ① | | | | | | |
| | BandEdgeType | 1 | Band Edge Type | B ① | | | | | | |
| | FlatnessTolerance | 1 | Flatness Tolerance | | | | | | | |
| | SampleCD | 1 | Sample CD | C ① | | | | | | |
| | Finish | 1 | Surface Finish | | | | 24 ① | | | |
| | Peaks | 1 | Peaks | | | | 120 ① | | | |
| CA1 | | | Annealing | | | | | | | |
| | MachineCycle | 1 | CA Machine Cycle | 50 ① | | | | | | |
| ATM | | | Annealing/Temper | | | | | | | |
| | MachineCycle | 1 | ATM Machine Cycle | BB ① | | | | | | |
| | TemperRoll? | 1 | Temper Roll? | No ① | | | | | | |
| | Oiling? | 1 | Oiling? | No ① | | | | | | |
| | Weld Rule | 1 | Weld Rule | 250 ① | | | | | | |
| | FlatnessTolerance | 1 | Flatness Tolerance | | | | | | | |
| | Temper | 1 | Temper | | | | | | | |
| | SamplePunch | 1 | Sample Punch | C ① | | | | | | |
| | Width | 1 | Output Width | | | | | | | |
| TTM | | | Tempering | | | | | | | |
| | Guage | 1 | Roll to Guage | | | | | | | |
| | Finish | 1 | Finish | 7C ③ | | | | | | |
| | Temper | 1 | Temper | | | | | | | |
| TST | | | Side Trim | | | | | | | |
| | Width | 1 | Width | | | | | | | |
| ET3 | | | Electro Tin | | | | | | | |
| | CoatinType | 1 | Coating Type | | | | | | | |
| | CoatingWeight | 1 | Coating Weight | | | | | | | |
| | OilType | 1 | Oil Type | | | | | | | |
| | OilAmount | 1 | Oil Amount | | | | | | | |
| | Temper | 1 | Temper | | | | | | | |
| | ApplyTag? | 1 | Apply Tag? | | | | | | | |
| | ShippingLeeway | 1 | Shipping Leeway | | | | | | | |
| Testing | | | Testing | | | | | | | |
| | Grade | 1 | Steel Grade | 960 ① | | | | | | |
| Inspect | | | Inspection | | | | | | | |
| | WidthTolerance | 1 | Width Tolerance | | -.000 ① | | +.0125 ① | inch① | | |
| | Guage Tolerance | 1 | Guage Tolerance | | -.0006 ① | | +.0006 ① | Inch① | | |

| Composition Partition | S T E P | A L T | R E V | Ingredient | Description | Activity | Correlation Model # | |
|---|---|---|---|---|---|---|---|---|
| Chemistry | 1 | 1 | 1 | Ch2304 | Chemistry ① | | | ① |
| Alternate Routings | 1 | 1 | 1 | R670330 | Ferrostan Routing ① | Manufacture | | ① |
| Alternate Routings | 1 | 2 | 1 | R670330-2 | Ferrostan Routing ① | Trim Rework | | ① |
| Marking | 1 | | 1 | M43652A ① | Marking Spec ① | | Mark | ② |
| Packing | 1 | | 1 | P77632 ① | Packing Spec ① | | Pack | ② |
| Loading | 1 | | 1 | L4353 ① | Loading Spec ① | | Load | ② |

Note: A product spec has the potential of requiring that some of its values be entered at the time of Order Entry. This happens in the "Prompted Order Spec Capture" stop. Such entries appear in the color "Black".
"Red" values are from the Product Model. "Blue" values are Customer Preferences for the Product Type. "Violet" values are Inherited from the Customer Delivery Model. "Green" values are derived from other value(s).

For above note and originally color coded table:

Red   =   ①
    Violet =   ②
    Green =   ③
    Blue  =   ④
    Black =   ⑤

FIG. 44B-1

Customer Product Preferences

| | | | |
|---|---|---|---|
| Preference ID | CP-34625 | Description | Customer Supplied Default Parameters for Ferrostan960 Product |
| Revision | 2 | Customer | Phoenix Can Company |

| Partition | Element | Rev | Description | Value① | Min① | Nom① | Max① | UOM① | TO I① | UO M① |
|---|---|---|---|---|---|---|---|---|---|---|
| Product | | | Product Attributes | | | | | | | |
| | Grade | 1 | Steel Grade | 960 ① | | | | | | |
| | SteelType | 1 | Steel Type | | | | | | | |
| | SEUC | 1 | Specific End Use Code | 603x700 Welded① Body | | | | | | |
| | ChemTreat | 1 | Chemical Treatment | CDC311① | | | | | | |
| | PinHoles | 1 | Pin Holes | | 0 ① | | 40 ① | each ① | | |
| | Finish | 1 | Finish | 7C ① | | | | | | |
| | BandEdgeType | 1 | Band Edge Type | CE ① | | | | | | |
| | BandEdgeTrim | 1 | Band Edge Trim | | .01① | | 1.0 ① | inch① | | |
| | Branding | 1 | Branding | | | | | | | |
| | Temper | 1 | Temper | | | | | | | |
| ProductDimensions | | | Product Dimensions | | | | | | | |
| | Width | 1 | Width | | 35 ① | | 37 ① | inch① | | |
| | WidthTolerance | 1 | Width Tolerance | | .000① | | +.0125① | inch① | | |
| | Gauge | 1 | Gauge | | .018① | | .025① | inch① | | |
| | GaugeTolSpecType | 1 | Guage Tolerance Specification Type | | | | | | | |
| | GuageTolerance | | Guage Tolerance | | | | | inch① | | |
| | FlatnessTolerance | 1 | Flatness Tolerance | | | | | %① | | |
| PhysicalLimits | | | Physical Limitations | | | | | | | |
| | Weight | 1 | Weight | | | | 25000 ① | Lbs.① | | |
| | InsideDiameter | 1 | Inside Diameter | | | | 20① | inch① | | |
| | OutsideDiameter | 1 | Outside Diameter | | | | 72① | inch① | | |
| Coating | | | Coating | | | | | | | |
| | CoatingType | 1 | Coating Type | | | | | | | |
| | CoatingWeight | 1 | Coating Weight | | | | | | | |
| | Branding | 1 | Branding | | | | | | | |
| | LineMark | 1 | Line Mark | Outside① | | | | | | |
| Oiling | | | Oiling | | | | | | | |
| | OilType | 1 | Oil Type | | | | | | | |
| | OilAmount | 1 | Oil Amount | | | | | | | |
| Weld | | | Weld Restrictions | | | | | | | |
| | WeldRule | 1 | Weld Rule | ATM OK① | | | | | | |
| SrcMaterialReq | | | Source Material Requirements | | | | | | | |
| | MaxHeatsperCoil | 1 | Max Heats Per Coil | | | | | | | |
| | Min.WeightPerHeat | 1 | Min. Weight Per Heat | | | | | | | |
| | ReqSingleHeatCoils | 1 | Require Single Heat Coils | | | | | | | |
| | ExclDeoxPractice | 1 | Exclusive Deox Practice | | | | | | | |
| | StripSourceRule | 1 | Strip Source | | | | | | | |
| Marking | | | Marking | | | | | | | |
| | LabelType | 1 | Label Type | | | | | | | |
| Packing | | | Packing | | | | | | | |
| | Orientation | 1 | Orientation | Eye Vertical④ | | | | | | |
| | WrapMaterial | 1 | Wrap Material | Paper ⑤ | | | | | | |
| | Pallet | 1 | Pallet? | Yes④ | | | | | | |
| | Banding | 1 | # of Bands | 2① | | | | | | |
| | Blocking | 1 | Blocking | All Sides⑤ | | | | | | |
| | WindingDirection | 1 | Winding Direction | Clockwise ④ | | | | | | |
| Loading | | | Loading | | | | | | | |
| | Tiedowns | 1 | Tie Downs | 4 ④ | | | | | | |
| | Tarp? | 1 | Tarp? | No ① | | | | | | |
| | MeltSourceRule | | Melt Source | | | | | | | |

| Composition Partition | SLOT | ALT | REV | Ingredient | Description | Activity | Correlation Model # |
|---|---|---|---|---|---|---|---|
| Marking | | | | | | | |
| Packing | | | | | | | |
| Loading | | | | | | | |

FIG. 44B-2

Notes: Values in "blue" represent the customer's preferences (i.e. default specification criteria) for this Product Type.
Values in "red" were inherited from the Product Family Model.
In this specification, Customer supplied preferences take precedence over corresponding values that exist in the Product Family Model.

For above note and originally color coded table:

| | | |
|---|---|---|
| Red | = | ① |
| Violet | = | ② |
| Green | = | ③ |
| Blue | = | ④ |
| Black | = | ⑤ |

FIG. 44C-1

Product Family Model

Model ID 38096M    Description   Single Reduced Electrolytic Tin Plate Carbon Ferrostan
Revision   1        Owner       Product Specifications Department

| Partition | Element | Rev | Description | Value① | Min① | Nom① | Max① | UOM① | TO I① | UO M① |
|---|---|---|---|---|---|---|---|---|---|---|
| Product | | | Product Attributes | | | | | | | |
| | Grade | 1 | Steel Grade | 960 ① | | | | | | |
| | SteelType | 1 | Steel Type | | | | | | | |
| | SEUC | 1 | Specific End Use Code | 603x700 Welded① Body | | | | | | |
| | ChemTreat | 1 | Chemical Treatment | CDC311① | | | | | | |
| | PinHoles | 1 | Pin Holes | | 0 ① | | 40 ① | each ① | | |
| | Finish | 1 | Finish | 7C ① | | | | | | |
| | BandEdgeType | 1 | Band Edge Type | CE ① | | | | | | |
| | BandEdgeTrim | 1 | Band Edge Trim | | .01 ① | | 1.0 ① | inch① | | |
| | Branding | 1 | Branding | | | | | | | |
| | Temper | 1 | Temper | | | | | | | |
| ProductDimensions | | | Product Dimensions | | | | | | | |
| | Width | 1 | Width | | 35 ① | | 37 ① | inch① | | |
| | WidthTolerance | 1 | Width Tolerance | | .000① | | +.0125① | inch① | | |
| | Gauge | 1 | Gauge | | .018① | | .025① | inch① | | |
| | GaugeTolSpecType | 1 | Guage Tolerance Specification Type | | | | | | | |
| | GuageTolerance | 1 | Guage Tolerance | | | | | inch① | | |
| | FlatnessTolerance | 1 | Flatness Tolerance | | | | | %① | | |
| Coating | | | Coating | | | | | | | |
| | CoatingType | 1 | Coating Type | | | | | | | |
| | CoatingWeight | 1 | Coating Weight | | | | | | | |
| | Branding | 1 | Branding | | | | | | | |
| | LineMark | 1 | Line Mark | Outside① | | | | | | |
| Oiling | | | Oiling | | | | | | | |
| | OilType | 1 | Oil Type | | | | | | | |
| | OilAmount | 1 | Oil Amount | | | | | | | |
| Weld | | | Weld Restrictions | | | | | | | |
| | WeldRule | 1 | Weld Rule | | | | | | | |
| SrcMaterialReq | | | Source Material Requirements | | | | | | | |
| | MaxHeatsperCoil | 1 | Max Heats Per Coil | | | | | | | |
| | Min.WeightPerHeat | 1 | Min. Weight Per Heat | | | | | Lbs ① | | |
| | ReqSingleHeatCoils | 1 | Require Single Heat Coils | | | | | | | |
| | ExclDeoxPractice | 1 | Exclusive Deox Practice | | | | | | | |
| | StripSourceRule | 1 | Strip Source | | | | | | | |
| | MeltSourceRule | 1 | Melt Source | | | | | | | |
| HRL | | | Hot Roll Source | | | | | | | |
| | Grade | 1 | Grade | 960 ① | | | | | | |
| | Guage | 1 | Guage | | | | | Inch① | | |
| | Width | 1 | Width | | | | | Inch | | |
| PCM | | | Pickle Cold Roll | | | | | | | |
| | Trim-BE? | 1 | Trim Band Edge? | | | | | | | |
| | Width | 1 | Band With | | 35 ① | | 37 ① | | | |
| | Guage | 1 | Guage | | .018① | | .025 ① | inch① | | |
| | Sleeve? | 1 | Sleeve? | Yes ① | | | | | | |
| | Band? | 1 | Band? | Yes ① | | | | | | |
| | BandEdgeTrim | 1 | Band Edge Trim? | No ① | | | | | | |
| | BandEdgeType | 1 | Band Edge Type | B ① | | | | | | |
| | Flatness Tolerance | 1 | Flatness Tolerance | | | | | | | |
| | Sample CD | 1 | Sample CD | C ① | | | | | | |
| | Finish | 1 | Surface Finish | | | | 24 ① | | | |
| | Peaks | 1 | Peaks | | | | 120 ① | | | |
| CA1 | | | Annealing | | | | | | | |
| | MachineCycle | 1 | CA Machine Cycle | 56 ① | | | | | | |
| ATM | | | Annealing/Temper | | | | | | | |
| | MachineCycle | 1 | ATM Machine Cycle | BB ① | | | | | | |
| | TemperRoll? | 1 | Temper Roll? | No ① | | | | | | |
| | Oiling? | 1 | Oiling? | No ① | | | | | | |
| | WeldRule | 1 | Weld Rule | 250 ① | | | | | | |
| | Flatness Tolerance | 1 | Flatness Tolerance | | | | | % ① | | |
| | Temper | 1 | Temper | | | | | | | |
| | SamplePunch | 1 | Sample Punch | C ① | | | | | | |

FIG. 44C-2

| | Width | 1 | Output Width | | | | | | |
|---|---|---|---|---|---|---|---|---|---|
| TTM | | | Tempering | | | | | | |
| | Guage | 1 | Roll to Guage | | | | | inch④ | |
| | Finish | 1 | Finish | TC⑤ | | | | | |
| | Temper | 1 | Temper | | | | | | |
| TST | | | Side Trim | | | | | | |
| | Width | 1 | Width | | | | | | |
| ET3 | | | Electro Tin | | | | | | |
| | CoatingType | 1 | Coating Type | | | | | | |
| | CoatingWeight | 1 | Coating Weight | | | | | | |
| | OilType | 1 | Oil Type | | | | | | |
| | OilAmount | 1 | Oil Amount | | | | | | |
| | Temper | 1 | Temper | | | | | | |
| | ApplyTag? | 1 | Apply Tag? | | | | | | |
| | ShippingLeeway | 1 | Shipping Leeway | | | | | %④ | |
| Testing | | | Testing | | | | | | |
| | Grade | 1 | Steel Grade | 950③ | | | | | |
| Inspect | | | Inspection | | | | | | |
| | WidthTolerance | 1 | Width Tolerance | | -.000② | | +.0125② | inch④ | |
| | Guage Tolerance | 1 | Guage Tolerance | | -.0005② | | +.0005② | inch④ | |

| Composition Partition | S T E P | A L T | R E V | Ingredient | Description | | Activity | Correlation Model # |
|---|---|---|---|---|---|---|---|---|
| Chemistry | 1 | 1 | 1 | Ch2304 | Chemistry | ① | | |
| Alternate Routings | 1 | 1 | 1 | R670330 | Manufacture | ① | Manufacture ① | |
| Alternate Routings | 1 | 2 | 1 | R670330-2 | Trim Rework | ① | Trim Rework ① | |

Note: Values in "green" are auto derived from values in "red" using rules set up by Engineering.

For above note and originally color coded table:

Red   =   ①
    Violet  =   ②
    Green =   ③
    Blue   =   ④
    Black =   ⑤

FIG. 44D

Delivery Model

Preference ID: FERO960-01324
Revision: 2
Description: Steel Coil Normal Delivery Criteria
Customer: Phoenix Can Company

| Partition | Element | Rev | Description | Value | Min | Nom | Max | UOM | TOI | UOM |
|---|---|---|---|---|---|---|---|---|---|---|
| PhysicalLimits | | | Physical Limitations | | | | | | | |
| | Weight | 1 | Weight | | | | | | | |
| | InsideDiameter | 1 | Inside Diameter | | | | | | | |
| | OutsideDiameter | 1 | Outside Diameter | | | | | | | |
| Marking | | | Marking | | | | | | | |
| | LabelType | 1 | Label Type | Tin Std Domestic ② | | | | | | |
| Packing | | | Packing | | | | | | | |
| | Orientation | 1 | Orientation | | | | | | | |
| | WrapMaterial | 1 | Wrap Material | | | | | | | |
| | Pallet | 1 | Pallet? | | | | | | | |
| | Banding | 1 | # of Bands | | | | | | | |
| | Blocking | 1 | Blocking | | | | | | | |
| | Winding Direction | 1 | Winding Direction | | | | | | | |
| Loading | | | Loading | | | | | | | |
| | Tiedowns | 1 | Tie Downs | | | | | | | |
| | Tarp? | 1 | Tarp? | | | | | | | |
| | InventoryTx | 1 | Inventory Tx Code | | | | | | | |

| Composition Partition | SLOT | ALT | REV | Ingredient | | Description | | Activity | Correlation Model # | |
|---|---|---|---|---|---|---|---|---|---|---|
| Marking | 1 | | 1 | M43652A | ② | Marking Spec | ② | | Mark | ② |
| Packing | 1 | | 1 | P77632 | ② | Packing Spec | ② | | Pack | ② |
| Loading | 1 | | 1 | L4353 | ② | Loading Spec | ② | | Load | ② |

Note: Customer Delivery Preferences are often a function of Product Type, Location, and Season.

For above note and originally color coded table:

Red    =    ①
    Violet  =    ②
    Green  =    ③
    Blue   =    ④
    Black  =    ⑤

| PRODUCTS (5) | | | | | | | | | | |
|---|---|---|---|---|---|---|---|---|---|---|
| SELECTED | GAUGE | WIDTH | FORM | LOCATION | QUANTITY | WEIGHT | WT. UOM | COMMENT | FINISH DATE | PRICE | PRICE UOM |
| ☑ | .0230 | 36" | COIL | PHX, AZ | 1 | 25000 | LB | | 07/07/99 | 1.32 | $/CWT |
| ☑ | .0460 | 20" | SHEET | PHX, AZ | 5 | 10000 | LB | | 07/07/99 | 1.52 | $/LB |
| ☑ | .0520 | 24" | SHEET | TEMPE, AZ | 2 | 8000 | LB | | 07/07/99 | 1.64 | $/LB |
| ☐ | .0600 | 16" | COIL | TEMPE, AZ | 1 | 20000 | LB | BAD EDGES | 07/07/99 | 1.75 | $/CWT |
| ☐ | .0600 | 24" | COIL | TEMPE, AZ | 1 | 26000 | LB | | 07/07/99 | 1.52 | $/CWT |

| SELECTED PRODUCTS (3) | | | | | | | | | | | |
|---|---|---|---|---|---|---|---|---|---|---|---|
| SELECTED | PURCHASE | GAUGE | WIDTH | FORM | LOCATION | QUANTITY | WEIGHT | WT.UOM | COMMENT | FINISH DATE | PRICE | PRICE UOM |
| ☑ | ☑ | .0230 | 36" | COIL | PHX, AZ | 1 | 25000 | LB | | 07/07/99 | 1.32 | $/CWT |
| ☑ | ☑ | .0460 | 20" | SHEET | PHX, AZ | 5 | 10000 | LB | | 07/07/99 | 1.52 | $/LB |
| ☑ | ☐ | .0520 | 24" | SHEET | TEMPE, AZ | 2 | 8000 | LB | | 07/07/99 | 1.64 | $/LB |

| PENDING ORDER (2) | | | | | | | | | | | |
|---|---|---|---|---|---|---|---|---|---|---|---|
| SELECTED | PURCHASE | GAUGE | WIDTH | FORM | LOCATION | QUANTITY | WEIGHT | WT.UOM | COMMENT | FINISH DATE | PRICE | PRICE UOM |
| ☑ | ☑ | .0230 | 36" | COIL | PHX, AZ | 1 | 25000 | LB | | 07/07/99 | 1.32 | $/CWT |
| ☑ | ☑ | .0460 | 20" | SHEET | PHX, AZ | 5 | 10000 | LB | | 07/07/99 | 1.52 | $/LB |

*FIG. 61*

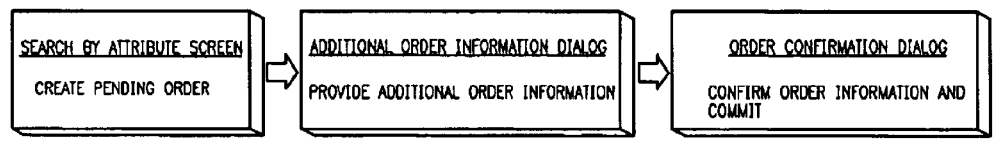

*FIG. 62*

INTERACTIONS OF PCS, CDS, AND OMS

B2B COMMERCE SPEC MANAGEMENT

B2B COMMERCE PRODUCT TYPES

| | ATTRIBUTE COMMERCE | | | |
|---|---|---|---|---|
| PRODUCTION GOODS (DIRECT) | LOGISTICS/ FINANCIAL SETTLEMENT | RFP/RFQ | SPECIFICATION | NEGOTIATED BID |
| | PRODUCTS/COMPONENTS/ CUSTOMIZATION | PRODUCT/ PROCESS | ATTRIBUTES | ATTRIBUTE PRICING |
| NON PRODUCTION GOODS (INDIRECT) | MRO | CATALOG+ | PARAMETRICS | AUCTION |
| | OFFICE SUPPLIES | CATALOG | SKU | LIST PRICE |
| COMMERCE | | | | |

FIG. 68

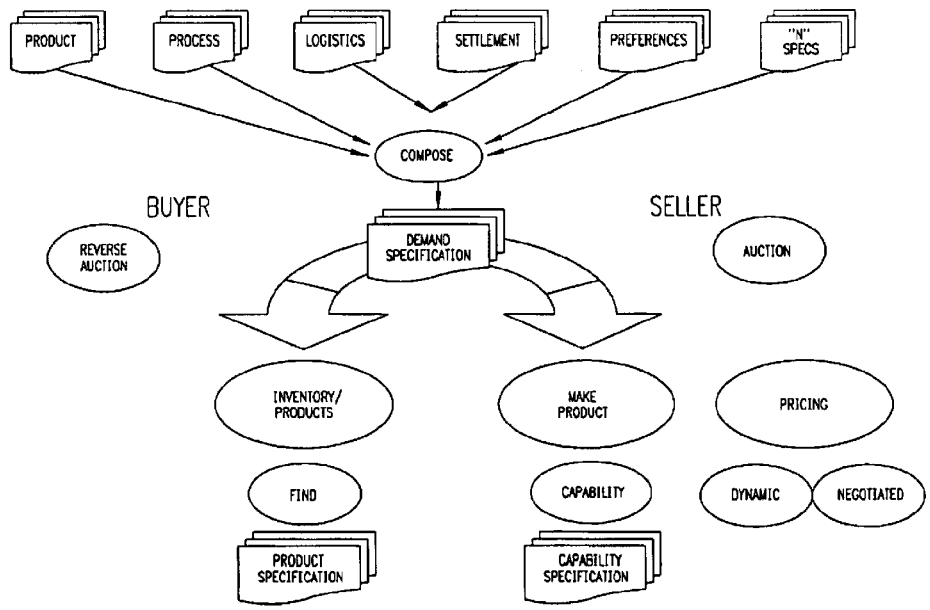

DETAILS FOR ITEM
TUBE-PRODUCT 2

| | | | |
|---|---|---|---|
| END FINISH | C | CE | COLLAPSE PRESSURE |
| EUE | NULL % | NULL % | 8100.000000 PSI |
| COUPLING GRADE | Cr | Cu | INTERNAL YIELD PRESSURE |
| L-55 | NULL % | NULL % | 7700.000000 PSI |
| LENGTH | Mn | Mo | NI |
| 12.000000 FT | NULL % | NULL % | NULL % |
| OUTSIDE DIAMETER | PRODUCT TYPE | TENSILE STRENGTH | THREADED? |
| 2.875000 IN | ROUND | 55000.000000 PSI | TRUE |
| TUBING JOINT STRENGTH | V | WALL | WEIGHT |
| 71700.000000 PSI | NULL % | 0.217000 IN | 6.500000 LBS/FT |
| YIELD STRENGTH | | | |
| 75000.000000 PSI | | | |

BUILDING BUSINESS OBJECTS AND BUSINESS SOFTWARE APPLICATIONS USING DYNAMIC OBJECT DEFINITIONS OF INGREDIENTIAL OBJECTS

RELATED APPLICATION

This application claims the benefit of U.S. Provisional Application No. 60/129,767, filed Apr. 15, 1999, and U.S. Provisional Application No. 60/193,897, filed Mar. 31, 2000.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever in such included copyrighted materials.

FIELD OF THE INVENTION

This invention relates generally to computer systems that capture, manage and share business enterprise information. More specifically, it relates to a method and apparatus for creating and applying dynamically defined business objects used in such computer systems, for using such business objects to configure business software applications, and for facilitating the automated sharing of business information across a business enterprise or with other business enterprises or customers.

BACKGROUND

Due to the convergence of technology advances and socioeconomic forces, global electronic commerce is becoming a reality. The Internet, based on high-bandwidth communications technologies, is the vital network platform that enables all consumers and businesses on a global basis to transact business with one another. High-performance systems hardware and software provide the computing power to enable new automated commerce processes. Object-oriented software technologies enable the construction and operation of new types of rules-based business objects, applications and processes.

Notwithstanding these advances, however, a significant barrier to the automation of global commerce has remained. The proliferation of applications and information systems built on differing data, information, logic, functional, process and computing models has continued. Consequently, significant resources are wasted because of the lack of automated interaction between individuals, enterprises and computer systems.

The Need to Share Business Information

Every business transaction involves a complex communication between the buyer and the seller. There is assumed to be a mutual understanding of both what is being acquired and what is being exchange for it. As businesses have sought to automate business transactions, efforts have been made to provide that communication and record keeping via computer systems.

One result of prior efforts to automate exchanges of fixed format definitions was the development of Electronic Data Interchange (EDI), which involves the transfer of data directly conforming to agreed message standards from computer to computer by electronic means. EDI, however, suffers from significant shortcomings. Although EDI provides a mutually agreed upon format for stating the item requested, the quantity, the date required, and so forth, it does not allow the syntax to be understood by two independent computer systems. EDI does not provide a definition of the specifications of the item requested by the buyer or of the specifications of the item being offered by the seller to satisfy the buyer's request. Nor does it address dynamic object definition extension or creation and exchange of processable definitions across functional and company boundaries. Rather, EDI defines a limited number of message records as fixed arrangements of data fields. In contrast, in accordance with the invention, traditional records are replaced with dynamically created and applied definitions consisting of the defined object's relationship to other ingrediential objects.

When the communication breaks down or the standard EDI record definition fails to keep pace, and there is a mismatch between the specifications of the buyer and the seller, an expensive process of "product returns" begins. Most of this can be attributed to manual transposition and inadequate product requirements definition and to cultural differences in terms. This problem can be completely avoided if the specifications are shared and compared as part of the business transaction. To accomplish this there must be a machine processable mechanism to store and compare specifications that relies on the ability to process to a shared ontology. The problem of semantic communication between parties is exacerbated by the requirement to forward the communication to all the supply chain participants since that implies that the seller's item's component specifications must then be shared with the seller's supplier.

In any business enterprise, information that is critical to the business needs to be exchanged or shared across the enterprise. Manufacturing companies, in particular depend upon an integrated source of product, process and facility information to run and or automate their operational and order management systems. This information must be consistent in form and accurate in content to facilitate the ordering and delivery of quality products. Unfortunately, there is a history of business enterprise information systems optimized around functional responsibilities that give secondary importance to managing product and specification data. The result is that each enterprise has a number of different systems that deal with varying aspects of the same product and specification information differently from each other. For example, the marketing system stores the marketing information one way. The manufacturing system stores some of the information. The MRP system stores some of the information. The MES system stores some of the information. The purchasing system holds some of the information. This disparity leads to information not readily exchangeable or processable by computer systems. This results in a requirement for human interfaces that introduce translation errors and time delays.

For a business enterprise to conduct business interactively on the Internet with its consumers and suppliers, there is a need for capturing and storing information in a consistent and organized fashion so that it can be processed by computer systems across separate business enterprises or by computer systems within a given enterprise. There are many benefits from having such processible specifications. For example, customers need to compare the specifications of competitors' products in making decisions based on those specifications, such as which product to purchase. Because the present invention makes specifications processable, one can automatically verify whether a requested specification is manufacturable. In addition, information known by an enterprise's knowledge workers can be captured and applied within the enterprise or shared with others in object specification form. For example, quality information can now be captured and managed automatically so that quality can be evaluated on the basis of what changes occurred in both specifications and processes. Consequently, quality and consistency across different work teams and time can be realized.

The ability for an object definition system invention to define anything makes it possible to create objects that can form the foundation for the ultimate order entry system, the ultimate Product Composition System, the ultimate data warehousing system, and the ultimate business collaboration framework, among others.

Specifications and the Collaboration Problem

Until now, there has been no effective way to automate the process of comparing specifications across an industry. Computers have been largely used up to the present time in an environment of departmental acquiescence in a program-by-program, task isolated environment. Nowhere is this truer than in product definitions and specifications. Different departments within a business enterprise have used and continue to use diverse formats and representations of specification information depending on their functional responsibility within the enterprise. It follows that when there is no effective way to manage the sharing of specifications across responsibilities, each department will tend to sub-optimize the specification around its particular needs and culture. This often presents difficulties in understanding, applying, and translating specification content to those who need the information but who are outside of the engineering discipline.

Also, there has been no effective way to deal with the evolution of specifications. Attributes of an object that were not relevant to the business when a system is first used become relevant as the object finds new applications. Consider a simple example of a screw as the type of product. When the screw was first introduced as a product, it may have had only one type of configuration for the head, e.g. slotted, so there was no need for a purchaser or supplier of screws to differentiate one screw head configuration from another. However, as new screw head configurations were developed, e.g. the Phillips head, it then became important to the purchaser and supplier to differentiate the screws by their head type. A new attribute had to be added to the product specification for a screw to differentiate types of screws. Subsequently, it was discovered that a screw may make an effective control mechanism. At that point, screw thread thickness and gap needed to be added to the screw's product specification. The lesson learned is that once successful use of an object is experienced, it and its specification will evolve.

The Internet and Web Based Commerce

The growth of commerce over the Internet and emerging supply-chain web environments, has created an even greater demand for a change to integrated access, definition, and execution that can transcend company and organizational dimensions. Success of supply chain and web-based market interactions will depend on the ability to exchange, compare and collaborate on specifications. To realize the full potential of Web-based commerce requires an integrated solution covering the entire value chain, i.e., an integrated solution applying to the cycles of creating new products and bringing them to market as well as to the interactions of buyers and sellers in the market. This requires a shared vision across a company out into the marketplace for the exchange and collaboration of the definitions and specifications that are the basis for web based commerce.

Disparate definitions and specifications spanning products and the capabilities that produce them are not easily reconciled into a shared ontological form. The reasons are many. First, there is an information explosion as products and capabilities become more sophisticated at an ever faster pace. Second, mechanisms offering integrative assimilation into a useful form have not yet become available. Third, should they become available they must be of a new form that will facilitate the rigor and discipline necessary to provide a repository of content that transcends individual corporate cultures and definitional preferences.

All object definitions/specifications have the potential of interrelating with other definitions/specifications within and across company boundaries. This produces an urgent mandate for a definition system that can be configured for an industry or industry group to provide a common ontology for applying and exchanging object definitions and specifications. Such a system must support end user creation of definitions/specifications through a consistent user interface for viewing, understanding, exchanging, and processing such definitions/specifications. Successful supply chains will increasingly depend on the future ability to exchange and compare specifications within a shared ontology.

Goals of the Invention

Thus, there is a need for a method and apparatus to solve the needs described above. Accordingly, it is a goal of this invention to provide a method and apparatus for defining, programming, configuring and executing computer processible business objects, which can transcend organizations, cultures, and engineering disciplines.

Another goal of the invention is to provide a system and method that can define, program, configure and execute a set of business objects that provide a common model of people, places, things and activities, the commerce interactions between them, the rules that govern those interactions and the business information models that result from these interactions. Such a combination of a definition system and a set of business objects can enable seamless global electronic commerce.

It is another goal of the invention to provide a method and apparatus that can define and manage the evolution of business object definitions.

It is another goal of the invention to provide a method and apparatus that is open and extensible.

It is another goal of the invention to provide a method and apparatus for specification collaboration that facilitates business between members of a supply-chain.

It is still another goal of the invention to provide a system that provides dynamic object definition.

It is still another goal of the invention to provide a system that provides dynamic definition of attributes and object relationships.

It is still another goal of the invention to provide a system that provides dynamic definition of relationships to external objects.

It is still another goal of the invention to provide a system that provides dynamic rendering relationships.

It is still another goal of the invention to provide a system that provides optional revision control with content and composition effectivities for attributes and all relationships.

It is still another object of the invention to provide a system that can build business software applications by combining these dynamic object definitions.

It is still another goal of the invention to provide a method and system for defining business objects across a company out into the marketplace for the exchange and collaboration of the definitions and specifications within a shared ontology. Such a system will become key to web-based commerce.

It is another goal of the present invention, therefore, to provide a specification management system that enables the dynamic definition and execution of all business objects required in the conduct of business.

Another goal of the present invention is to provide a demand satisfaction system that is used to model, define and execute the life cycle of a variety of demands that exist in global commerce, both within and between enterprises.

Yet another goal of the present invention is to provide the ability to extend the definition of the apparatus itself in order to define and build new commerce actors and processes.

Additional goals and advantages of the invention will be set forth in the description, which follows, and in part will be apparent from the description, or may be learned by practice of the invention. The goals and advantages of the invention may be realized and obtained by means of the instrumentalities and combinations pointed out in the appended claims.

SUMMARY

To achieve the foregoing goals, and in accordance with the purposes of the invention as embodied and broadly described in this document, we have provided a method and system for creating and applying business objects that take the form of dynamically managed definitions. The method and system is based on an open and extensible object definition framework that manages definitions as specifications. The method and system provides the means for defining any business object needed in a business system regardless of its scope and type.

In accordance with the invention, an open and extensible object definition framework is provided for managing business object definitions as specifications. The framework is based on the assumption that that the definition of anything and everything will evolve over time. Attributes of business objects that are not relevant when a system is first used may become relevant as the object finds new applications.

All object definitions/specifications have the potential of interrelating with other definitions/specifications within and across company boundaries. This produces an urgent mandate for a definition system that can be configured for an industry or industry group to provide a common ontology a collaborative environment for applying and exchanging object definitions and specifications. Such a system must support end user creation of definitions/specifications through a consistent user interface for the viewing, understanding, exchanging, and processing said definitions/specifications.

A system in accordance with the invention provides the means for defining any object regardless of its scope and type. When applied to a specific object environment, the business object definition system can be used to build a business application, such as a Product Composition System (PCS) for managing the definition of products, specifications, customer preferences, processes, manufacturing and facility capabilities, resources, drawings, instructions, and industry standards. Other environments include customer profiles, application software objects such as orders and inventory, location networks, et. al. Additional uses of the system include: Product Definitions, Specification Management, Product Catalogs, Process Directory, Situational Index, Expert Assistant/Advisor, Problem Identification, Problem Resolution and an Education/Training Application Menu.

The invention provides a shared vision across a company out into the marketplace for the exchange and collaboration of the definitions and specifications that are the basis for web based commerce. It provides a framework for an integrated solution covering the entire value chain to provide a total solution. An integrated solution applying to the cycles of creating new products and bringing them to market as well as to the interactions of buyers and sellers in the market. The invention provides the ability to exchange and compare and collaborate on specifications, on which the success of supply chain and web based market interactions will depend.

The invention may be used to define any object that is to be processed by a computer. Objects can include Properties, Classifications, Knowledge, Business Objects, and Business Rules to name a few. Typical Business Objects include: Business and social entities; Locations including spaces, places, and channels; Activity including events and processes; Items including products and services; Business Records including orders and other forms of demand, inventory, jobs, deliverables, statements, transaction history et. al.

The present invention allows one to formally define the themes, then to define each instance as a combination of objects and instance variables within a context and a role. In addition, one can define specification attributes as individual values or derive them via formula or Boolean logic that considers other attributes of the specification. When one makes the formulas part of the criteria that are inherited by individual specification instances, one can effectively create unique, fully complete specifications by simply entering the variation parameter values.

The applicability of an aspect of definition content can be defined as a specification to control and/or assist in the creation of appropriate content. Such applicabilities can take into account the content of other objects. By way of example, capability models and specifications can be set up for each manufacturing facility. Having done so, one can check each generated specification to insure that it is still within the processing capabilities of the manufacturing facilities.

The capabilities of this invention include ontology definition and execution, defining and applying business objects, providing a common view of products and processes, demand satisfaction management, and providing a common view of supply and demand. A brief discussion of each of these capabilities follows.

In accordance with the invention, industry-specific ontologies, consisting of object taxonomies, attributes and attribute values can be defined and can be executed. In understanding and applying the invention to the task of managing industry and company ontologies as well in applying an ontology to the definition and creation of business objects definitions of the terms "ontology," "taxonomy" and "business lexicon" are useful. An "ontology" is a set of abstract concepts that defines the area of common interest within a particular community. It is the theory of what the world is, or "contains." A "taxonomy" is a division into ordered groups or categories, such as a classification of objects in an ordered system that indicates or features natural relationships. Industry-specific ontologies, consisting of object taxonomies, attributes and attribute values can be defined. Attributes can be organized into specifications. These specifications can be organized into various conceptual structures that represent the taxonomies of a given industry vertical or product group. This ontology definition drives a dynamic user interface that enables the user to create, extend and use the ontology to process specifications. A "business lexicon" is the set of actual terms used within a particular human activity system, where a term can be a word or a set of words.

Also in accordance with the invention, attributes can be organized into specifications that define any object or area of knowledge. Examples of such specifications include industry standards, organization profiles, products, processes, customer preferences, logistics requirements and financial arrangements, among others. The invention provides advanced functionality that operates on these specifications. Examples of such functionality include defining, finding, selecting, copying, comparing, combining and many others. The invention provides many sample definitions of business objects. Some illustrative examples of such business objects include customer, product, location, demand, order and workflow, among many others.

In accordance with the invention, all expressions of buyer preferences and requirements and seller offerings and capabilities, as well as the commerce processes buyers and sellers use to interact, can be stored as specifications. Thus, the invention provides all users with a common view of product and process. This capability is further enhanced where there is agreement within a company or an industry or globally for using the same ontology lexicon source.

In accordance with the invention, one can model, define and execute commerce processes used to satisfy the demands that exist between buyers and sellers. These demand life cycles are the core processes of commerce. Examples include Customer Order, Purchase Order and many others. In accordance with the invention, one can define and build new commerce types. It includes several built examples, including "Buy From Inventory," "Make-To-Order" and "Negotiated Bid." The invention includes a workflow component that automates these processes.

In addition to common definitions of product and process, the invention provides a common view of supply and demand. Buyers and sellers transact business using a common view of demand satisfaction. The invention captures and summarizes all interactions between buyers and sellers.

Because of these capabilities, the invention enables users to participate in automated commerce based on well-defined, computer processable business objects that provide a common definition and execution of commerce processes. As a result of the specification management system, the demand satisfaction system and the underlying method for defining, programming, configuring and executing computer processible business objects, this method enables electronic commerce to be automated and seamless.

The invention provides the capability to build business applications for any market (e.g., private/public, buy/sell), anyone (e.g., Buyer, Seller, Broker, Market maker), anywhere (e.g., having currency, language and unit-of-measure independence), anytime (24×7, Internet, Extranet, Intranet), for any demand (e.g., sales order, purchase order), for any product (MTS, MTO, ATO, ETO), for an service (e.g., advertising, consulting, people, etc.) and for any process (from simple to complex).

One exemplary embodiment of an application constructed in accordance with the invention is a Product Composition System application for managing the definition of products, specifications, customer preferences, processes, manufacturing and facility capabilities, resources, drawings, instructions, and industry standards. The Product Composition System can be applied to the products and specifications of any supply chain business environment.

Another exemplary embodiment of an application constructed in accordance with the invention is an Internet-enabled order management system for complex, attribute-based products and business processes. The order management system can capture an order and direct the order through the supply chain of an enterprise and extended enterprise. The order management system is uniquely suited to providing order management in non-SKU environments in process industries such as metals, paper and pulp, and textiles, as well as being suited to providing order management in SKU environments.

Yet another exemplary embodiment of an application constructed in accordance with the invention is a customer ordering system, which provides a system for customer self-service order management. With the customer application, product suppliers can post their product catalog on the Internet, making it directly available to their customers. Those customers can then use the Internet to browse or search through posted inventory and create orders for selected products.

Another exemplary embodiment of an application constructed in accordance with the invention is a customer ordering application, which provides order entry over the Internet, allowing customers direct and easy access to the order management system.

Still another exemplary embodiment is managed bid or negotiated bid application, which enables buyers and sellers to negotiate for products and services over a computer network, such as the Internet, by creating postings, bidding on postings, and countering these bids.

The invention can be used to support design collaboration among and between engineers and designers in different collaborating companies in a supply chain. In fact, the invention could be used to in any business system to manage products and specifications as the core data that serve to automate pricing based on product attributes, scheduling, promising, capacity commitment, material allocation and the like.

The invention, however, is not limited in its application only to the exemplary areas or environments. Rather, it can be applied to any business environment. Some examples of other such business environments include customer profiles, application software objects such as orders and inventory, location networks, and business system processes. Additional uses of the system can include product definitions, specification management, product catalogs, process directory, situational index, expert assistant/advisor, problem identification, and problem resolution education/training curricula.

Because of the capabilities provided by the invention, all users of this invention can participate in automated commerce based on well-defined computer processable business objects that provide a common definition and execution of commerce processes. As a result of the specification management system, the demand satisfaction system and the underlying method for defining, programming, configuring and executing computer processible business objects, the invention enables global electronic commerce to be automated and seamless.

In summary, the characteristics of the invention include providing a single point for exchanging definitions and specifications involving products, capabilities, processes, and capacities. All objects have the same definitional form making it possible to compose and/or to compare them. The form of object definitions/specifications is consistent across functional and organizational boundaries. An ontology can be applied or will evolve providing a shared language for all participants of the business that results in synergistic activity. Knowledge can be managed as non-redundant chunks of applied or composable knowledge. Benefits include standardization and consistency of definition. Definitions are an intuitive read because the ontology and definition approach allows one to avoid cryptic codes. A company can share one ontology across all systems, including legacy systems that import or export business object definition system definitions. Moreover, ontologies can be shared at industry and global levels in business-to-business settings. Terms in the ontology can be used directly, thus avoiding reliance on cryptic codes.

BRIEF DESCRIPTION OF THE DRAWINGS

The accompanying drawings, which are incorporated in and constitute a part of the specification, illustrate the presently preferred embodiments and methods of the invention and, together with the general description given above and the detailed description of the preferred embodiments and methods given below, serve to explain the principles of the invention.

FIG. 12 graphically depicts how models serve as templates for creating business object instances.

Figures 13, 14:
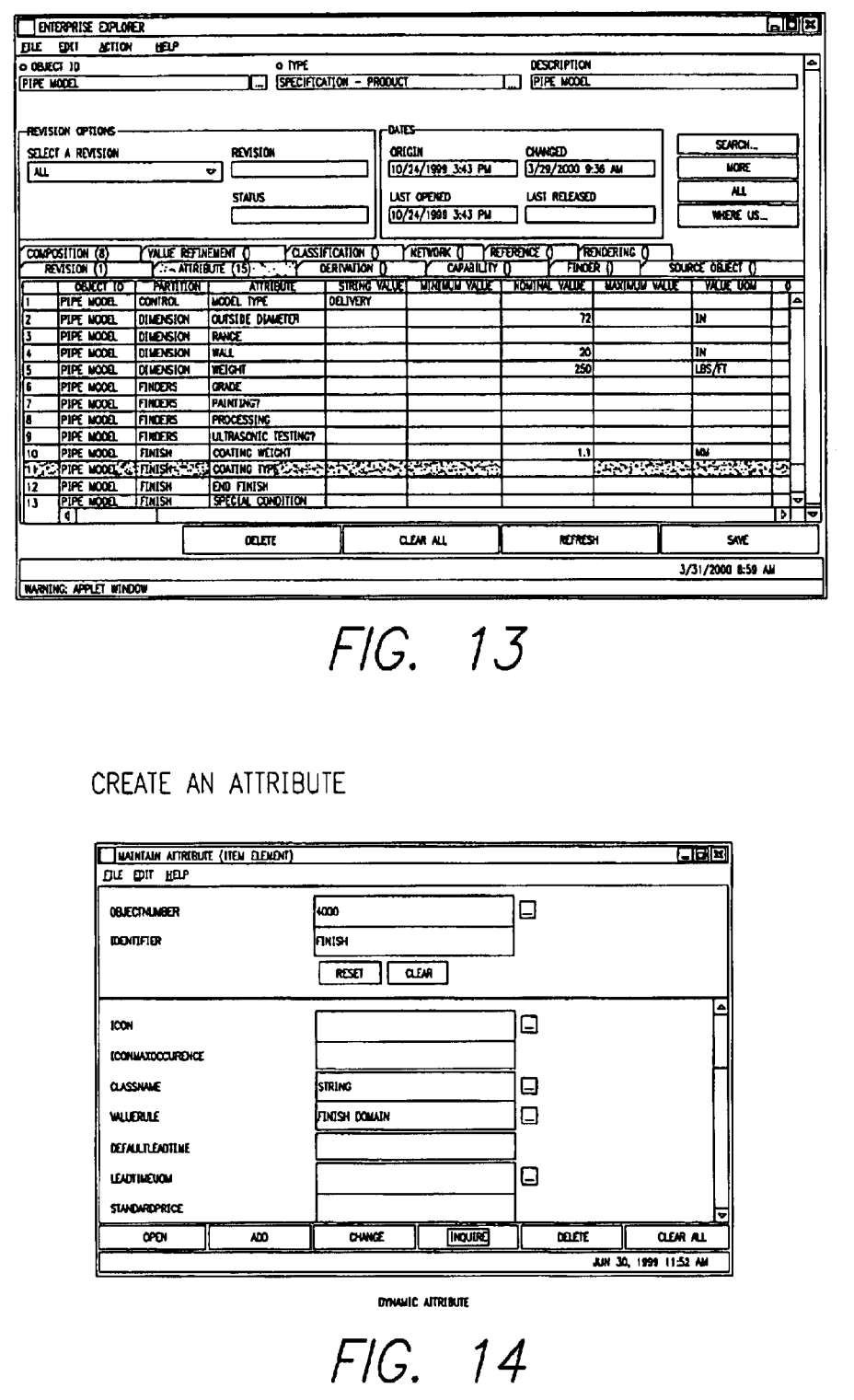

FIG. 13 graphically shows attributes of a model object used to create instances of pipe specifications FIG. 14 graphically shows a screen for attribute maintenance.

Figures 15, 16:
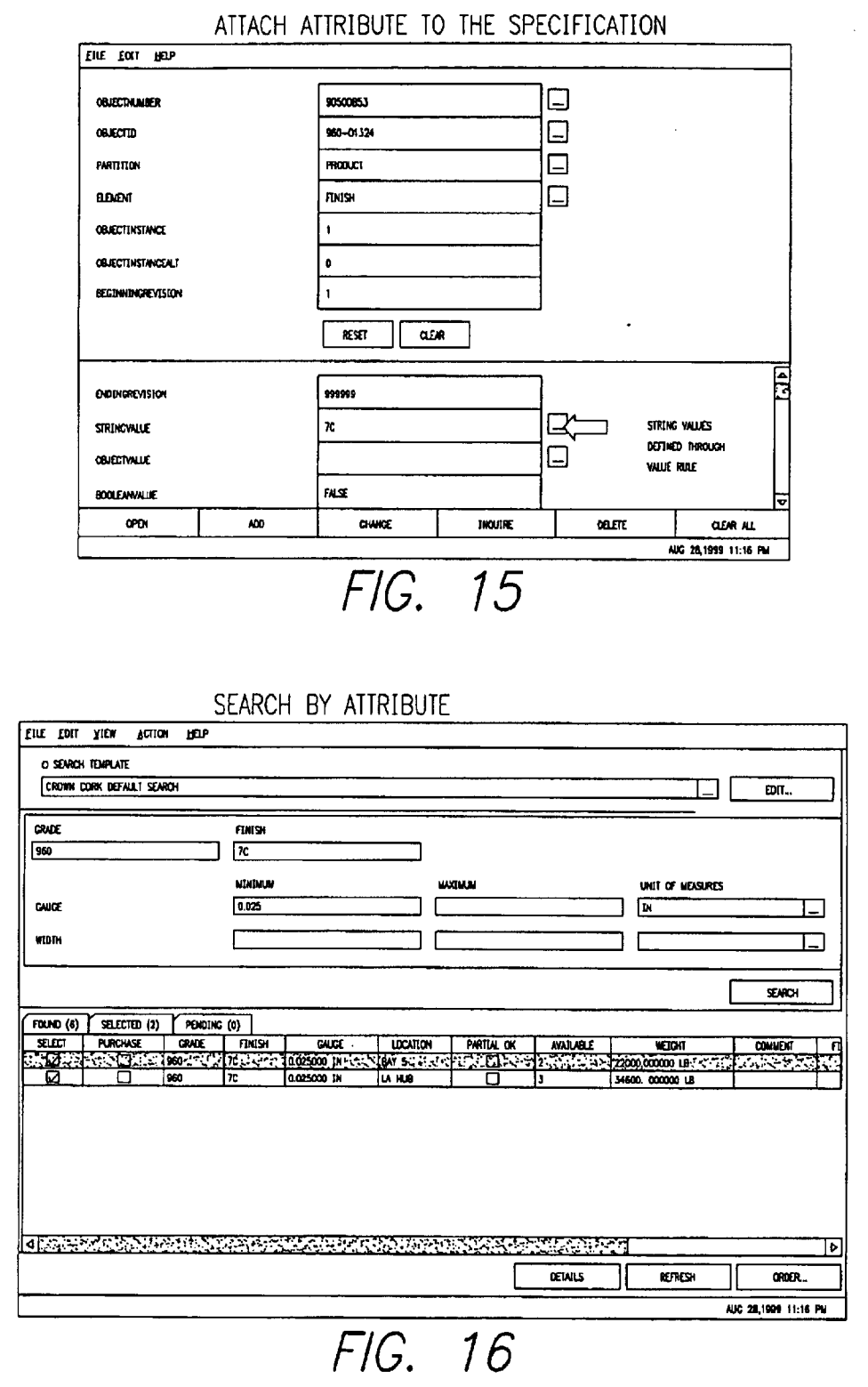

FIG. 15 graphically shows an attribute being added to an object.

FIG. 16 shows a search object specification.

Figures 17E, 18A:
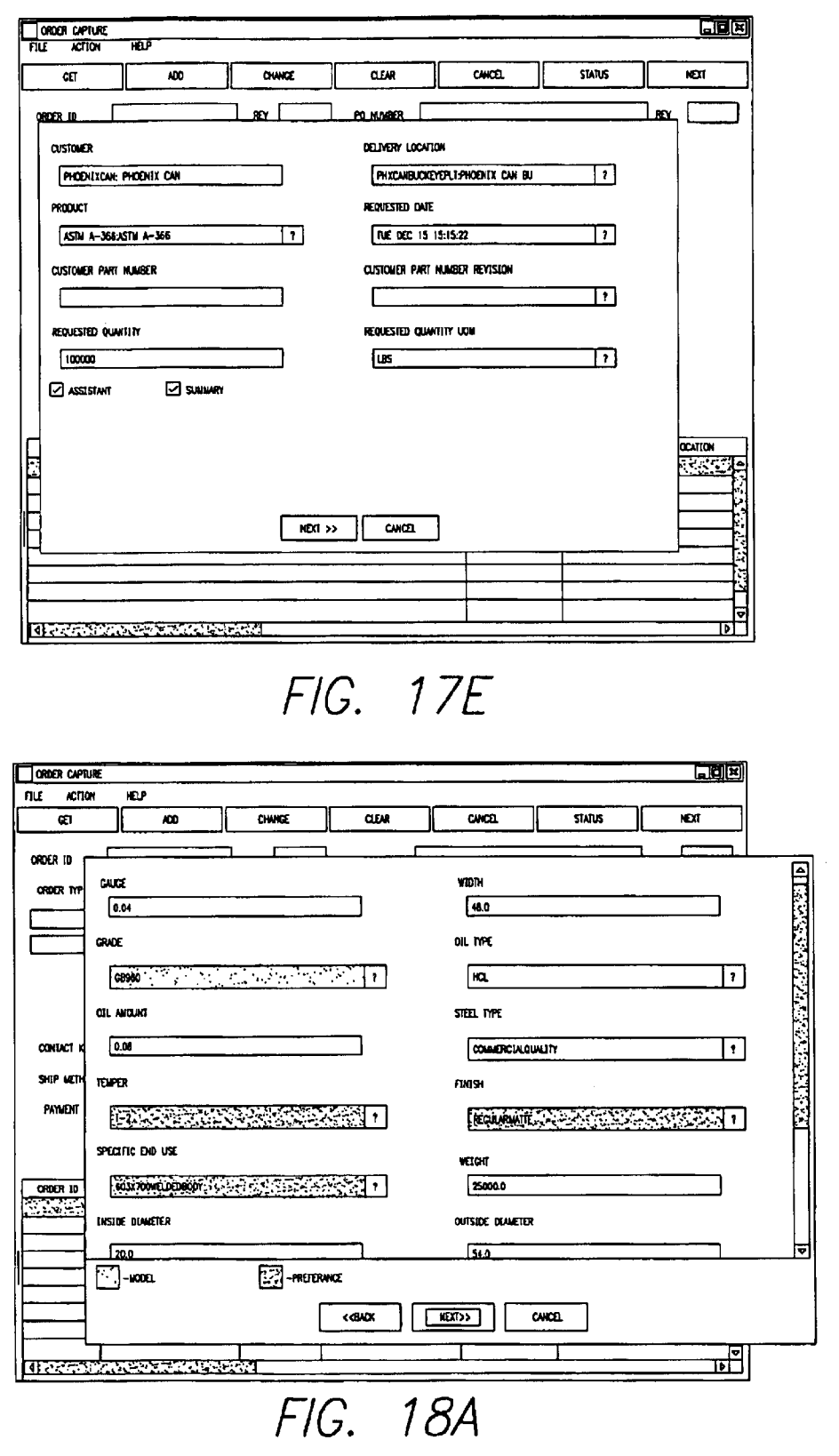

FIGS. 17A through 17E show a search template being used within the Order Management System.

Figures 18B, 18C:
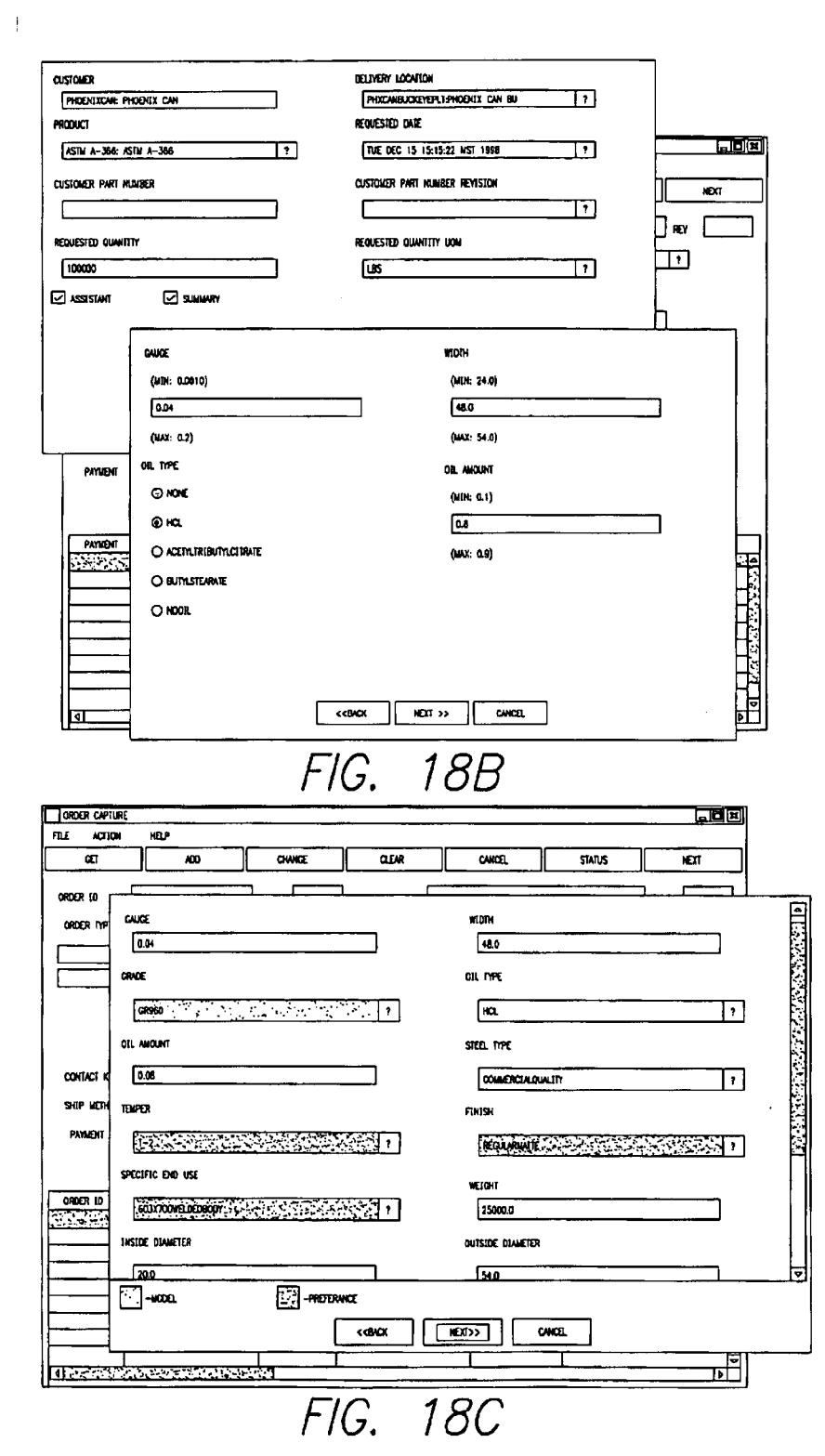
Figures 18D, 19:
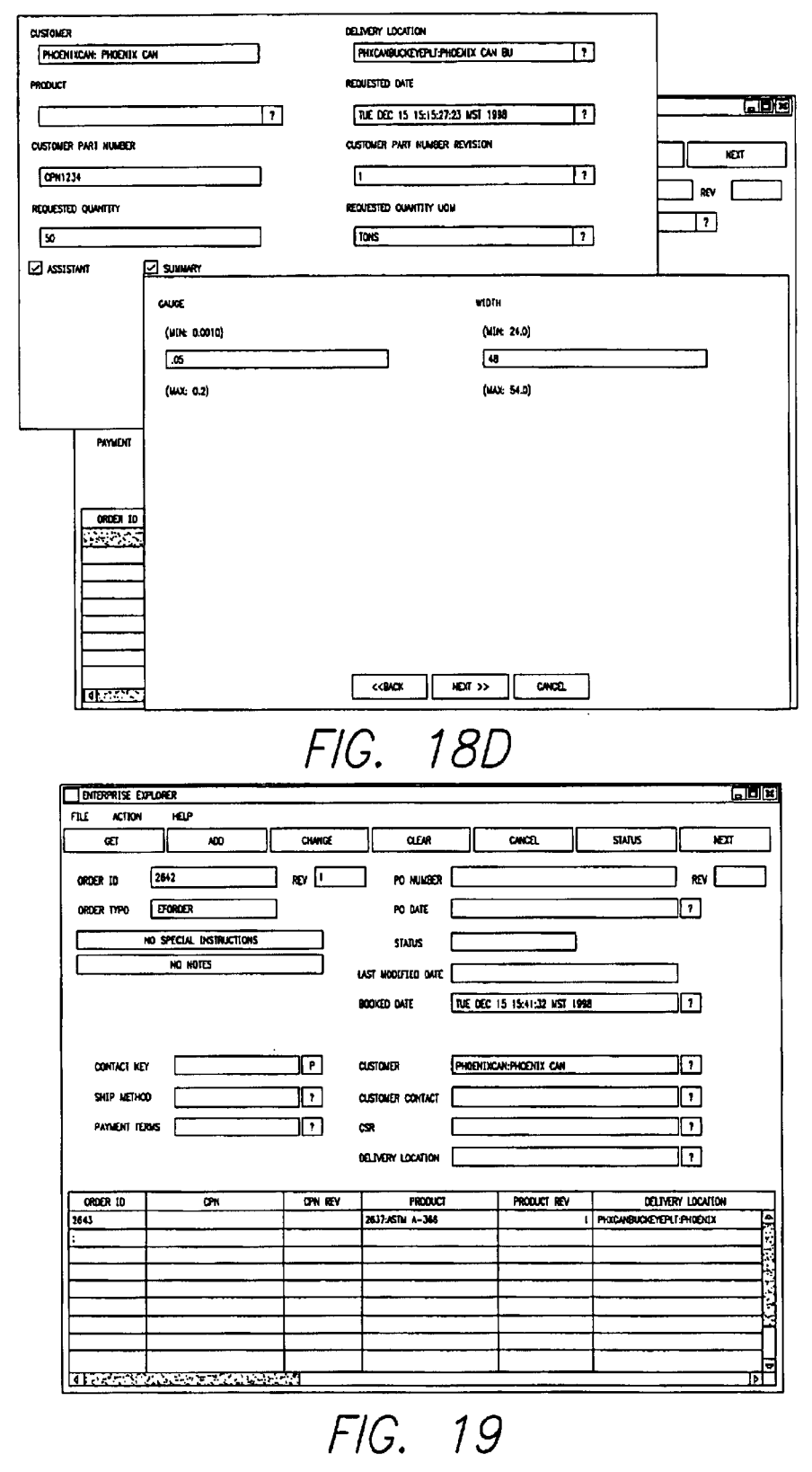

FIGS. 18A through 18D show Product Composition System components being used within the Order Management System to collect a product specification that can be ordered using the Order Management System.

FIG. 19 shows the order line item that was set up using the activity depicted by FIGS. B21 through B24.

Figures 22, 23:
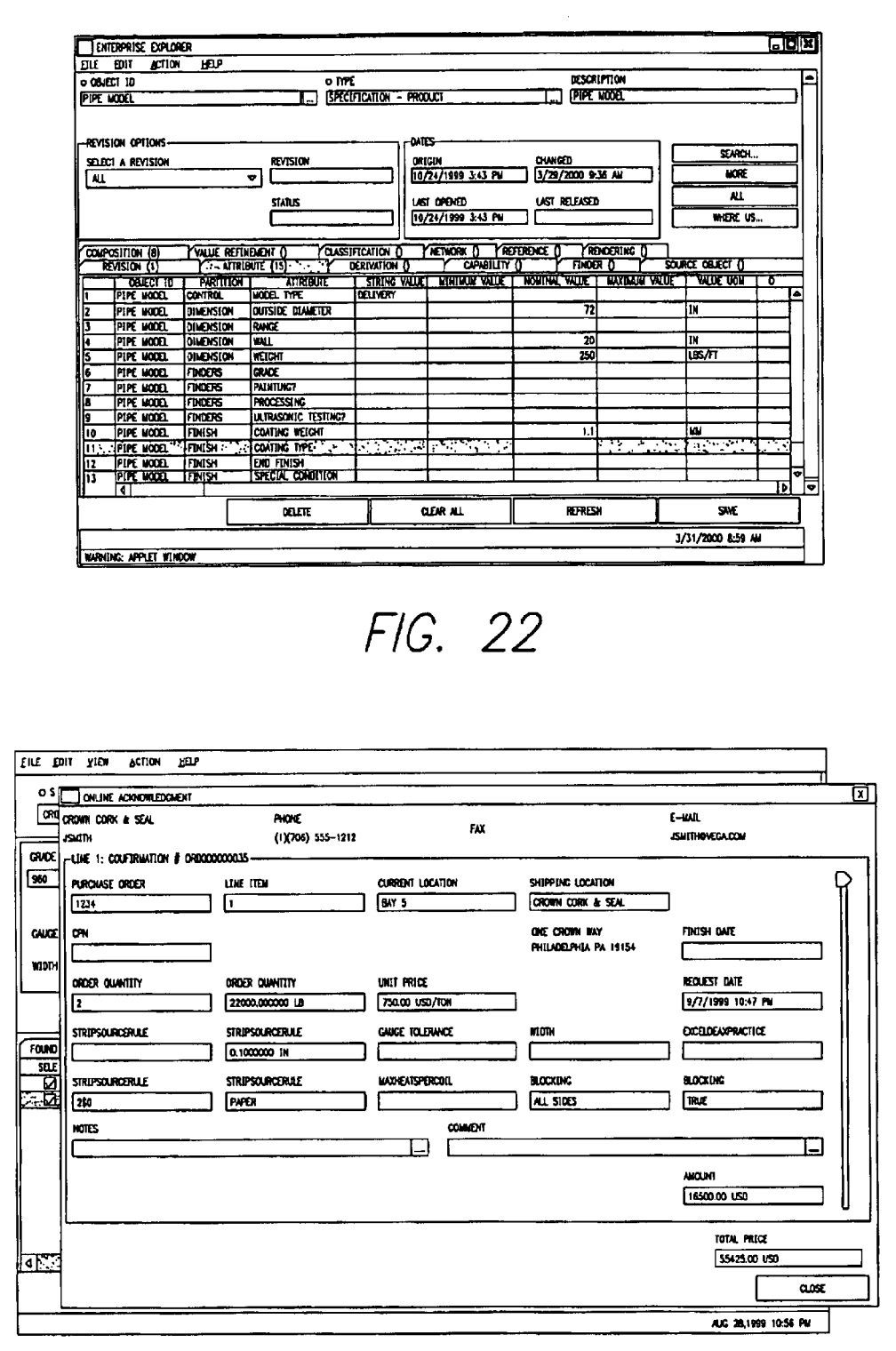

FIG. 22 shows attributes of a product model.

FIG. 23 shows an Order Management System order acknowledgement with the ordered product's attributes.

Figures 39C, 39D:
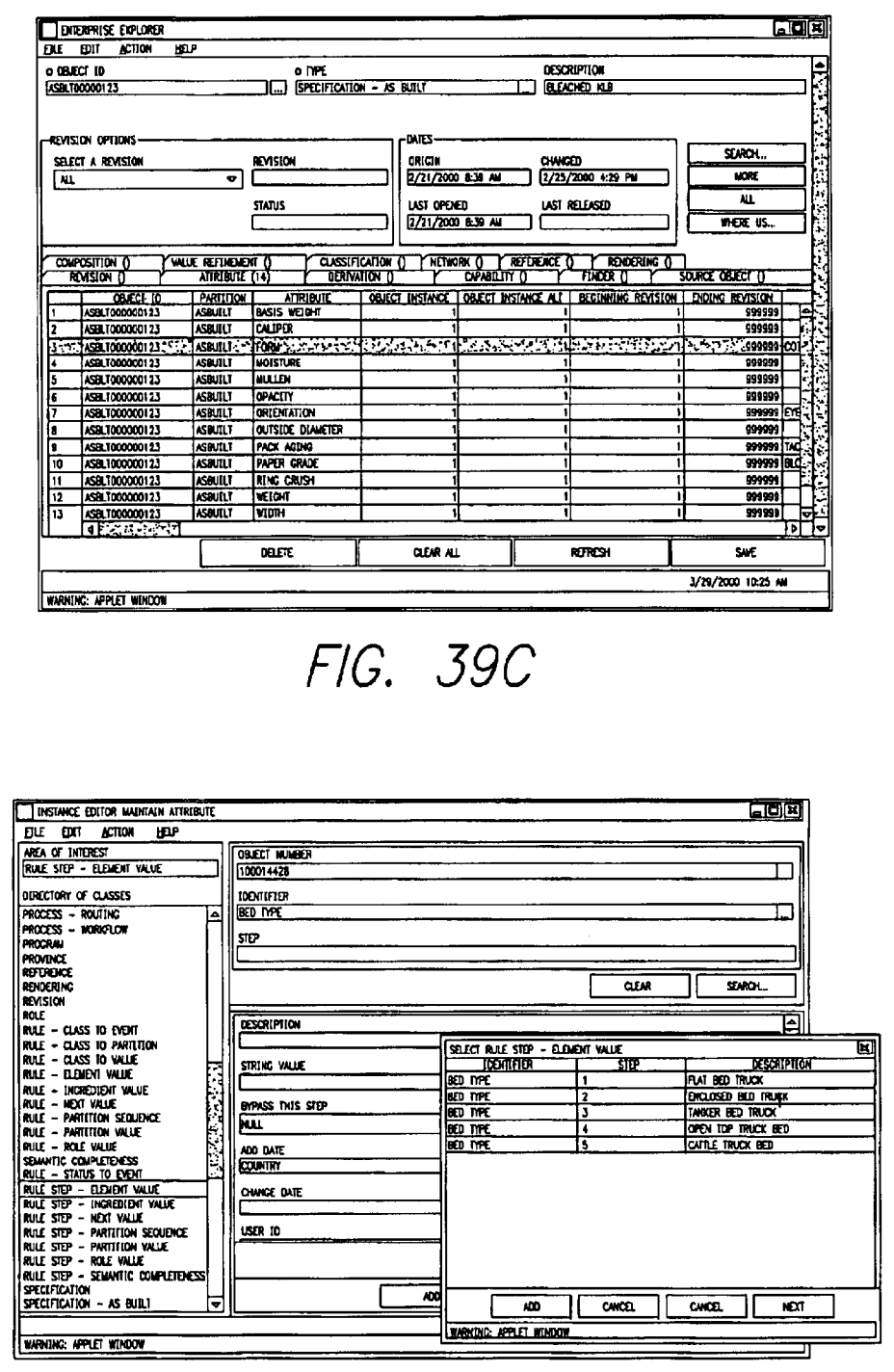

FIGS. 39A through 39D show computer monitor displays depicting examples of the use and features of the instance editor of the business object definition system of FIG. 37.

FIGS. 44A through 44D show rendering examples of the detail of the specifications depicted in FIG. 43.

FIG. 61 shows an example use of the Products tab, the Selected Products tab, and the Pending Order tab.

FIG. 62 shows the Additional Order Information and Order Confirmation Dialogs.

FIG. 66 shows line items of an order.

Figures 66, 67A:
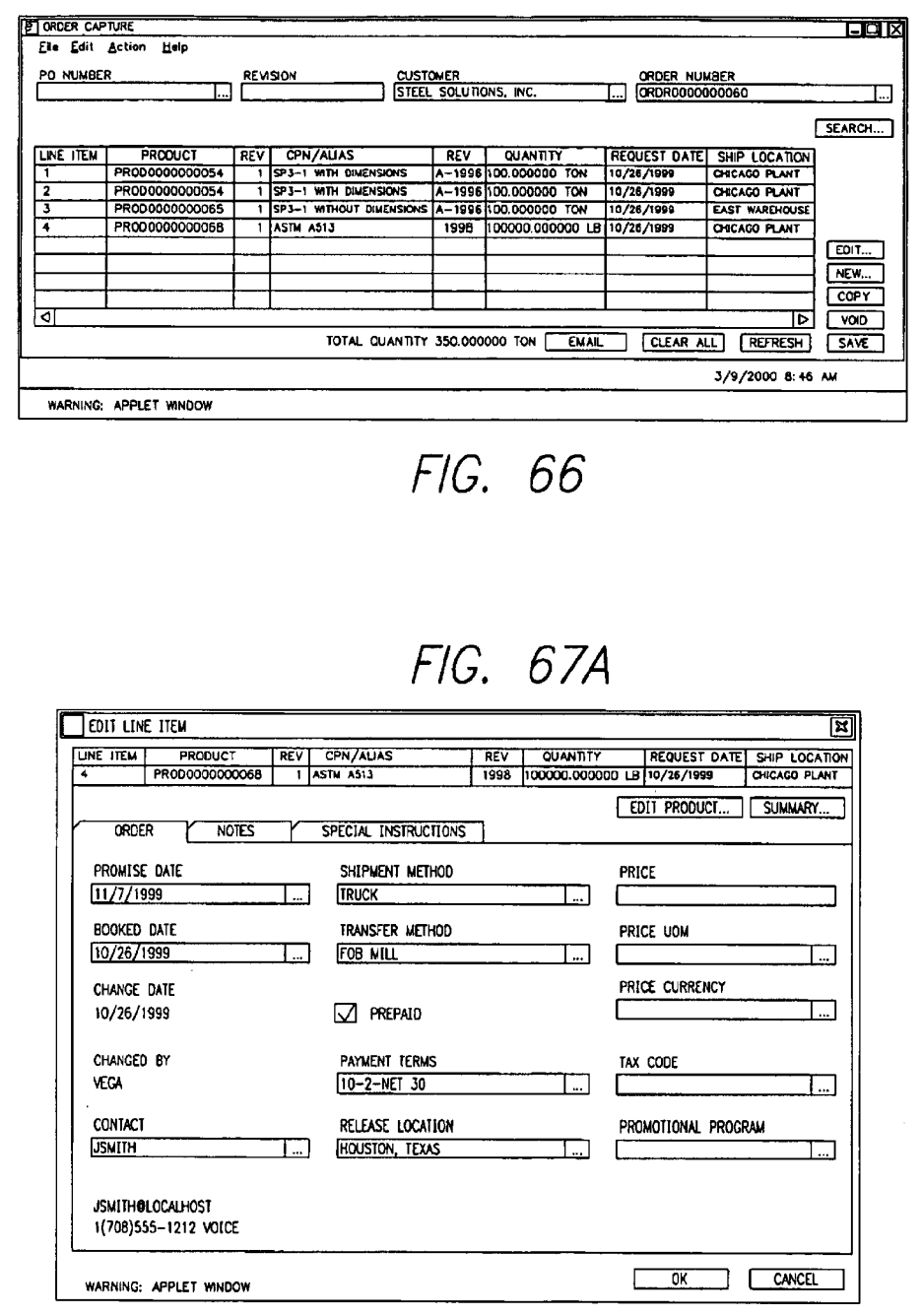

FIGS. 67A through 67D show the use of the business object definition system specifications prompting component in an Order Assistant setting for capturing the product specification details for an order line item.

FIG. 68 shows a typical user interface for business-to-business commerce

FIGS. 69 and 70 provide visuals of the components of the business object definition system used in Negotiated Bid and Negotiation Management that are also part of the business-to-business system.

FIG. 76 shows nodes in the example knowledge hierarchy that resulted in a display of a search template.

FIGS. 77A and 77B show the conforming objects for the refined search shown in FIG. 76.

DESCRIPTION

Reference will now be made in more detail to the presently preferred embodiments and methods of the invention as illustrated in the accompanying drawings, in which like numerals refer to like parts throughout the several views.

GLOSSARY OF TERMS AND ACRONYMS

The following terms and acronyms are or may be used throughout the detailed description:

Attribute dimensions. This term is used to refer to the range of values that can be assigned to an ingrediential attribute object (e.g. min, nominal, and max).

Figure 1:
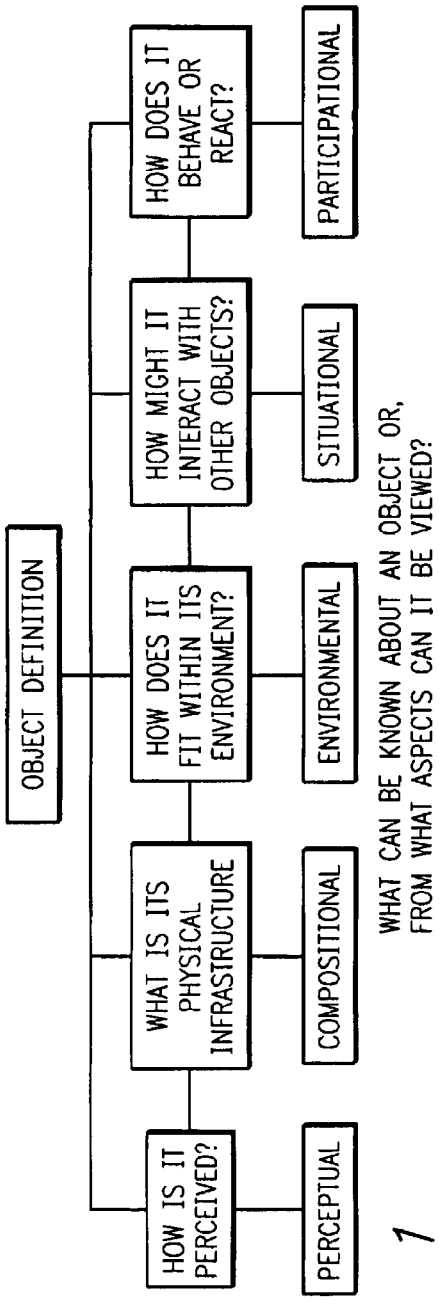
FIG. 1 is a block diagram depicting what information can be known about any object, such as a business object, and the aspects from which the object can be viewed.

Business objects. Any object receiving an identifier that is used in an information system. Objects range from properties and classifications to product and people to name a few. FIG. 1 depicts a view of some of the information that can be known about any business object, and the aspects from which the object can be defined and/or viewed. Such objects can be defined and/or viewed using the present invention.

Client-Server. A model of interaction in a distributed system in which a program at one site sends a request to a program at another site and waits for a response. The requesting program is called the "client," and the program which responds to the request is called the "server." In the context of the World Wide Web, the client is typically a "Web browser" which runs on a user's computer; the program which responds to Web browser requests at a web site is commonly referred to as a "Web server."

Figure 3:
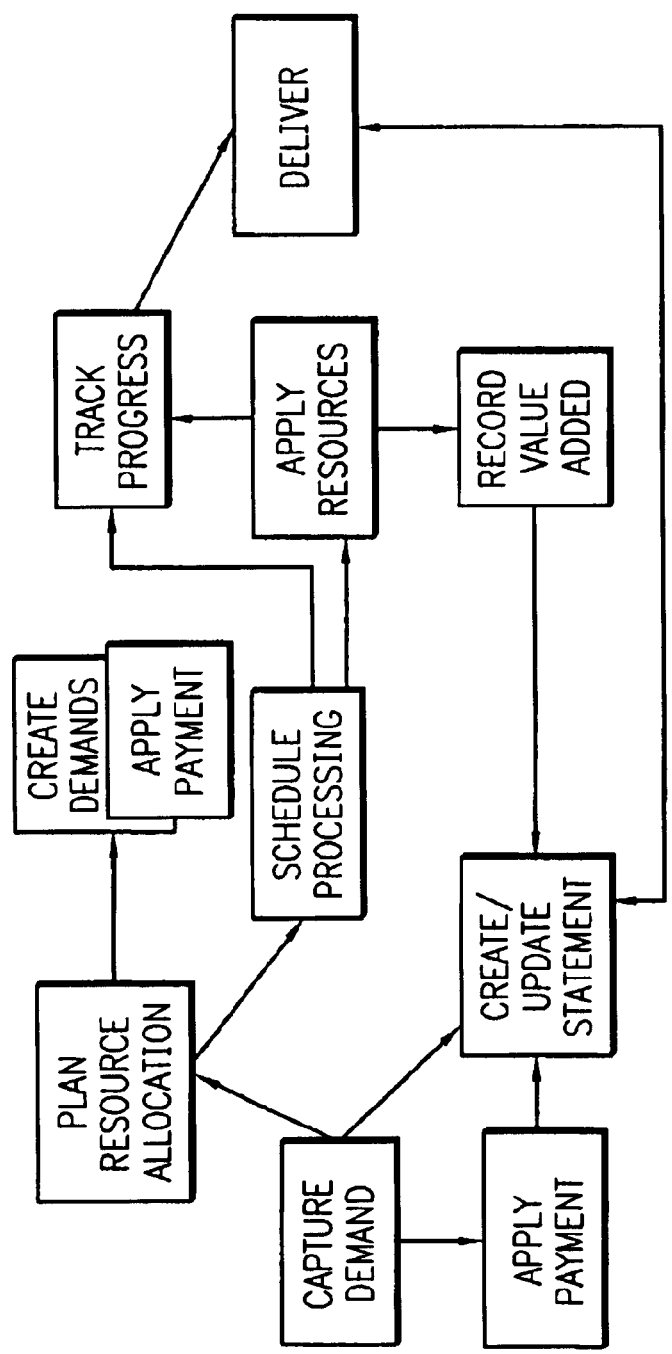
FIG. 3 is a block diagram showing how an Industry Supply Chain Operational Reference (SCOR) model view of a business can be translated to the Demand Satisfaction Model of FIG. 3.

Demand Satisfaction Model. Any business can be modeled based on the fundamental concept that all businesses exist to satisfy demands. FIG. 3 is a block diagram showing a Demand Satisfaction Model for modeling a business. But before one can model a business based on such a demand satisfaction model, one must first define all of the participating business objects. This is a purpose well-served by the present invention.

Internet Information Server (IIS). Microsoft Corporation's Web server that runs on Windows NT platforms.

Internet. A collection of interconnected (public and/or private) networks that are linked together by a set of standard protocols to form a distributed network. While this term is intended to refer to what is now commonly known as the Internet, it is also intended to encompass variations which may be made in the future, including changes and additions to existing standard protocols.

HyperText Markup Language (HTML). A standard coding convention and set of codes for attaching presentation and linking attributes to informational content within documents. During a document authoring stage, the HTML codes (referred to as "tags") are embedded within the informational content of the document. When the Web document (or "HTML document") is subsequently transferred from a Web server to a Web browser, the codes are interpreted by the Web browser and used to parse and display the document. In addition to specifying how the Web browser is to display the document, HTML tags can be used to create links to other web sites and other Web documents (commonly referred to as "hyperlinks"). For more information on HTML, see Ian S. Graham, The HTML Source Book, John Wiley and Sons, Inc., 1995 (ISBN 0471-11894-4).

Hypertext Transport Protocol (HTTP). The standard World Wide Web client-server protocol used for the exchange of information (such as HTML documents, and client requests for such documents) between a Web browser and a Web server. HTTP includes a number of different types of messages that can be sent from the client to the server to request different types of server actions. For example, a "GET" message, which has the format GET, causes the server to return the document or file located at the specified Universal Resource Locator (URL).

Internet Inter-ORB Protocol (IIOB). A protocol developed by the Object Management Group (OMG) to implement CORBA solutions over the World Wide Web. IIOP enables browsers and servers to exchange integers, arrays, and more complex objects, unlike HTTP, which only supports transmission of text. The OMG is an international consortium of organizations involved in various aspects of client/server computing on heterogeneous platforms. The OMG has set forth published standards by which clients communicate (in OOP form) with servers. As part of these standards, an Object Request Broker has been defined (known as the Common Object Request Broker Architecture, or CORBA for short), which provides the object-oriented bridge between the client and the server. The ORB decouples the client and server applications from the object oriented implementation details.

GIOP. As part of the CORBA standard, a protocol for communication amongst ORBs is defined, known as the General Inter-Orb Protocol (GIOP). This protocol is basically a list of messages which a client ORB and a server ORB can send to each other. When the Internet is used as the transport medium between the client ORB and the server ORB, a mapping is required from the GIOP to the TCP/IP level (which is the basis for Internet traffic). This mapping is known as the Internet Inter-Orb Protocol (IIOP).

Remote Method Invocation (RMI). A set of protocols being developed by Sun Microsystem's JavaSoft division that enables Java objects to communicate remotely with other Java objects. RMI is designed to work only with Java objects. In contrast, CORBA is designed to support objects created in any language.

Ingrediential Object: An ingrediential object is an object being used in another object's definition. This would include objects used in the capacity of 'attribute' as well as objects used to define structure or associations.

Java Database Connectivity (JDBC). A Java API developed by JavaSoft, a subsidiary of Sun Microsystems. JBDC enables Java programs to execute SQL statements. This allows Java programs to interact with any SQL-compliant database. Since nearly all relational database systems (RDBMSs) support SQL, and because Java itself runs on most platforms, JDBC makes it possible to write a single database application that can run on different platforms and interact with different DBMSs.

World Wide Web ("Web"). Used herein to refer generally to both (1) a distributed collection of interlinked, user-viewable hypertext documents (commonly referred to as "Web documents", "Web pages", "electronic pages" or "home pages") that are accessible via the Internet, and (2) the client and server software components that provide user access to such documents using standardized Internet protocols. Currently, the primary standard protocol for allowing applications to locate and acquire Web documents is the HyperText Transfer Protocol (HTTP), and the electronic pages are encoded using the HyperText Markup Language (HTML). However, the terms "World Wide Web" and "Web" are intended to encompass the Extensible Markup Language and future markup languages and transport protocols which may be used in place of or in addition to existing markup languages and transfer protocols.

Extensible Markup Language (XML). A standardized formatting notation, created for structured document interchange on the World Wide Web. XML describes a class of data objects called XML documents and partially describes the behavior of programs that process these objects. XML is a subset, or restricted form, of SGML (the Standard Generalized Markup Language—ISO 8879). XML allows designers to create their own customized tags, enabling the definition, transmission, validation, and interpretation of data between applications and between organizations. XML has been approved by the World Wide Web Consortium (W3C) recommendation.

Capability Specification. These specifications define the mill's physical limitation. Product experts define the element to element rules that apply to products. These rules are tested during order entry or manually using CCM.

Formula Specification. These specifications fill in values for other specifications. Formulas specifications are associated with elements where they are used to derive element values.

Search Templates. These specifications are used to find any other specification in the system and include the use of Boolean operators (e.g. >, <,=).

Customer Preference. These specifications allow customers to define defaults for elements by product, delivery location and season. These defaults are applied during order entry.

Demand Specification. These specifications describe the product being ordered. Customers use product specifications as a template for creating order specifications during order entry. No required element will be without a value on a order specification.

Delivery Specification. These specifications describe elements associated with delivering a product. They are separated from the product and merged during order entry. Incremental prompted order entry enables this functionality as does automated multi-level compose.

Effective Revision. The "latest released revision" and it there is no "latest released revision" then it is the "pending revision."

Ingrediential Object. An ingrediential object is an object used to define another object. This would include objects used in the capacity of "attribute" and objects used to define structure or associations. See Figure xxx.

Model As used in the invention a Model is an object definition that is used as a template for instantiating object instances.

Ontology. A set of abstract concepts that defines the area of common interest within a particular community. It is the theory of what the world is, or "contains."

Taxonomy. A division into ordered groups or categories, such as a classification of objects in an ordered system that indicates or features natural relationships.

Partition Context. A definitional attribute of ingrediential object used to add meaning to the object to object association. The meaning can take the form of background or framework in which to understand or apply the object. Partition names are often in accordance with process steps.

Ingrediential Role. A definitional attribute of an ingrediential object used to define the nature and behavior of the object-to-object association.

Registration. The process for authoring an Object Identity.

Object Definition Specification. An object definition enveloped within a specification construct facilitating the functions of revision control, content effectivity, and composition effectivity.

DESCRIPTION OF THE INVENTION

Reference will now be made in more detail to the presently preferred embodiments and methods of the invention as illustrated in the accompanying drawings, in which like numerals refer to like parts throughout the several views.

The method and system of the present invention provides an open and extensible object definition framework that manages business object definitions as specifications. This framework may be used to dynamically define any object that is to be processed by a computer. Objects can include Properties, Classifications, Knowledge, Business Objects, and Business Rules to name a few. Some examples of typical Business Objects include: business and social entities; locations, including spaces, places and channels; activities, including events and processes; items, including products and services; and business records, including orders and other forms of demand, inventory, jobs, deliverables, statements, transaction history et. al.

The method and system of the invention is founded upon the basic assumption that the definition of anything and everything will evolve or regress over time. The invention provides a business object definition system for defining any object regardless of its scope and type. When applied to a specific object environment, the business object definition system will be embodied in one of its assembled software application forms. A Product Composition System ("PCS") is one example of such an assembled application when the business object definition system is applied to the environment of products and specifications. Such a Product Composition System is described in more detail below. Other examples of applied environments include customer profiles, application software objects such as orders and inventory, and location networks. Additional examples of applied forms of the system include: Product Definitions Specification Management, Product Catalogs, Negotiated Bid, Collaborative Design, Process Directory, Situational Index, Expert Assistant/Advisor, Problem Identification, Problem Resolution, and Education/Training Knowledgebase.

In accordance with the invention, attributes can be organized into specifications that represent any object. Examples of such specifications include industry standards, organization profiles, products, processes, customer preferences, logistics requirements, financial arrangements and many others. The invention also provides advanced functionality that operates on these specifications. Examples of such functionality include defining, finding, selecting, copying and combining objects, as well as many others. In a preferred embodiment, the invention can include sample definitions of business objects. Examples of such definitions include customer, product, location, demand, order, workflow and many others.

Business Object Definition

Figure 2:
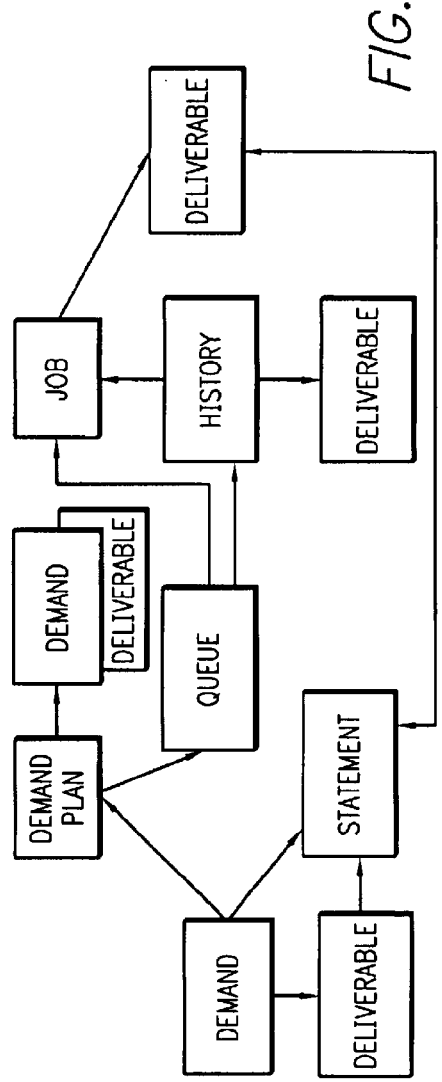
FIG. 2 is a block diagram showing a Demand Satisfaction Model for modeling a business.

FIG. 1 is a block diagram depicting what information can be known about any object, such as a business object, and the aspects from which the object can be viewed. The invention provides the means to create a processible definition of these objects that cover their structure and behavior. The objects then participate in a business model that can be used to model a business. FIG. 2 is a block diagram showing one example of such a model, i.e. a Demand Satisfaction Model. It will be understood that the Demand Satisfaction Model is only one example of a business model that can be used with objects defined in accordance with the invention. FIG. 3 is a block diagram showing how another business model, the Industry Supply Chain Operational Reference (SCOR) model of a business, can be translated to the Demand Satisfaction Model of FIG. 3. The SCOR model is published by the Supply Chain Council, Inc.

Figure 4:
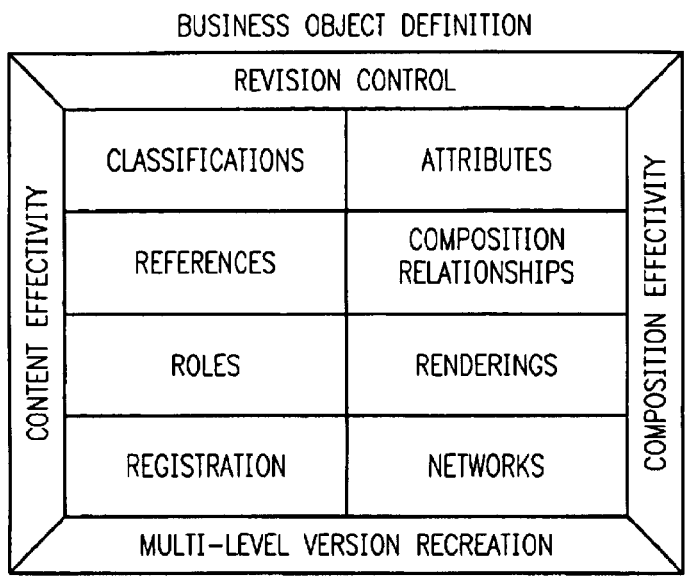
FIG. 4 depicts the business object definition in accordance with the invention for defining the business objects that can participate in a business model such as that of FIG. 3.
Figure 5:
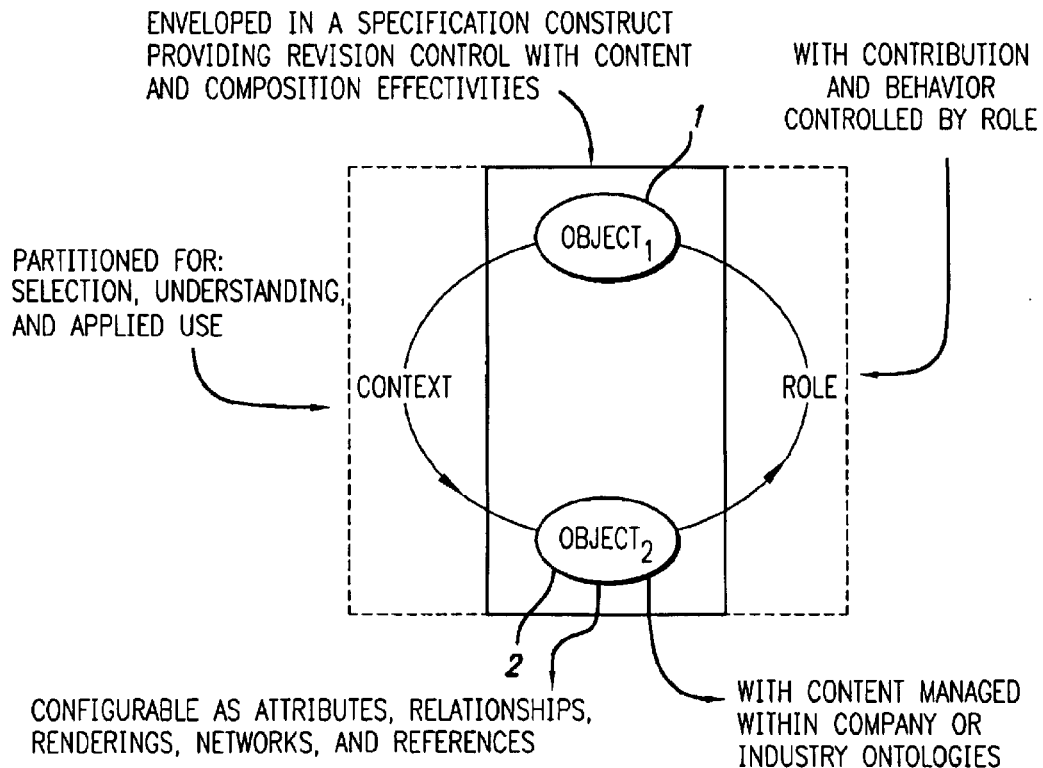
FIG. 5 shows the underlying concept for using other objects as ingredients of a business object definition in accordance with the invention.

FIG. 4 depicts the business object definition in accordance with the invention for defining the business objects that can participate in a business model such as that of FIG. 3. The invention provides the means to create a processible definition of these objects that covers their structure and behavior. FIG. 5 shows the underlying concept for using other objects as ingredients of a business object definition in accordance with the invention. Referring to FIG. 5, all definition takes the form of object1-to-object2 relationships maintained within a context where each ingrediential object 2 has a role relationship with the object 1 being defined. In FIG. 5, this object-to-object relationship is depicted between a defined object 1 and an ingrediential object 2.

Object definitions initially take the form of models. Models define the content and the collection and derivation rules that are used in creating business object instances. The models serve as templates for creation of the actual business object instances used in a business' systems. FIG. 12 graphically depicts how models serve as templates for creating business object instances.

Still referring to FIGS. 4 and 5, the object-to-objects definitions in accordance with the invention can be perceived as Attributes, Compositional Ingredients, Networked Ingredients, Renderings, and References. The choice among these categories is a matter of configuration by the user. Users of the invention may present these facets of definition using other categories more suitable to their culture. This is done by configuring partitions to appear within named areas of interest (e.g., through display tabs as discussed below). The presentation of object definition as Attributes, Relationships, Renderings, and References assists users of the system in the understanding and applied use of the object and its definitions. As noted above, this presentation set as related above is arbitrary and reconfigurable by the user. It can be reconfigured into the breakouts that the user culture needs or desires through reconfiguration of tabs and partition context participation within tabs. This allows the object definition components to be presented in whatever sub-views may be desired or needed.

Object Attribution

Again referring to FIG. 4, any object given a processable definition in specification form is given attributes and ingrediential object relationships. An attribute is an object acting in the capacity of object attribute. The rest of an object's definition is handled with ingrediential References, Renderings, Compositional Relationships, Network Relationships and Revision. "Element" is a frequently used term for the fundamental constituents of object attribution. "Elements" then are the attributes by which something is perceived, qualified, and/or dimensioned. These attributes (a.k.a. Elements) can be properties covering inherent characteristics or ascribed qualities, or physical relatum such as "product width", or assigned classification/categorization such as "product commodity."

Dynamic Definition of Any Object or Area of Knowledge

Figure 6:
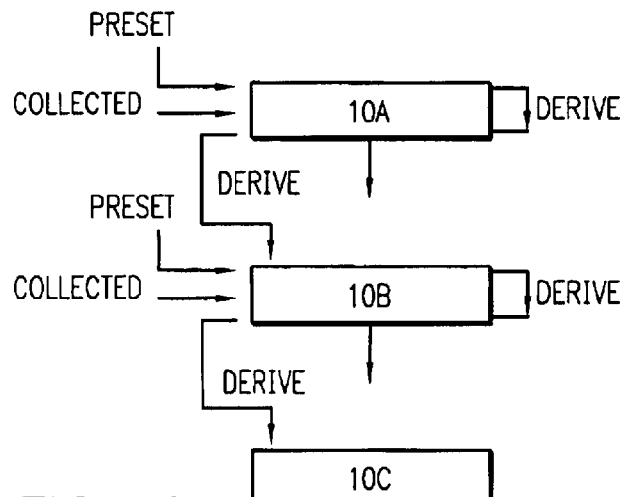
FIG. 6 depicts how ingrediental objects can be preset, collected or derived.

The present invention provides for dynamic definition of relationships and attribution views within a single revision-controlled specification. A view can be provided for each activity involved with the collection and derivation of specification content, and for each activity involved with the understanding or applied use of a sub-view within the activities of the business. Views required by a company's systems and culture about an object can be directly or automatically derived, becoming partitioned content (i.e. sub-views) of the object's revision-controllable definition/specification. Each needed view is first defined at a Model level where it will apply to all object definition/specification instances instantiated from the Model using the Create function explained below. The completion or population of the views within the instances continue to be governed by the collection and derivation rules specified in their respective parent Models. FIG. 6 shows how preset, collected, and derived attributes for given views 10a, 10b, 10c can be formed. Note that the derivation or validation of some contents of a view, such as view 10b or 10c, may depend on or use content of prior views.

Collection and Derivation Criteria functions include various ways of dimensioning attributes and selecting ingrediential role objects. Other specifications called Applicabilities determine the participation of definition ingredients in a released revision of the object definition. Still other specifications inherited from the model called Capabilities determine the efficacy of the specification prior and as a condition of its release. Any definition is reduced to object-to-object relationships and scalar values that are language independent.

Definition Partitions

Figure 41:
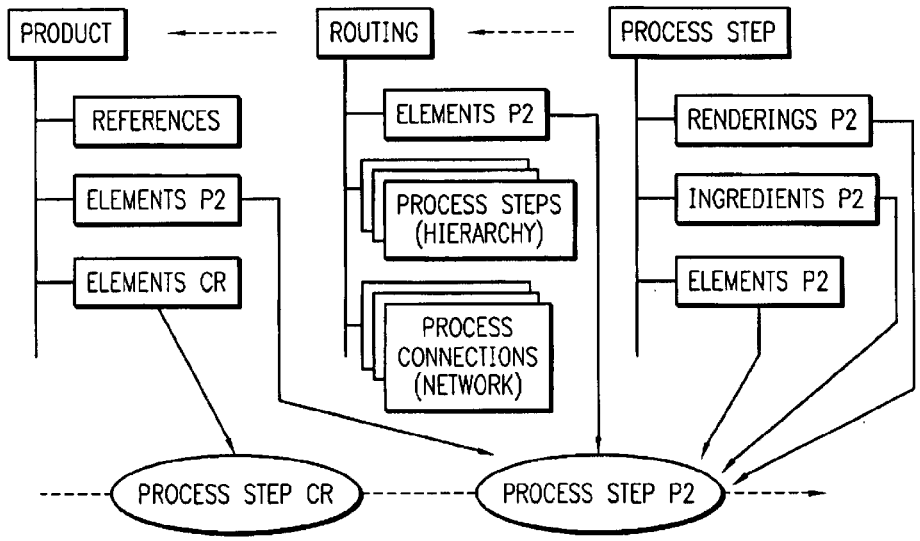
FIG. 41 depicts how the Product Composition System can be used to link specification detail to process steps.

Specification documents are usually organized by section or paragraph, and they include tabled data, pictures and diagrams to facilitate the reader in understanding those aspects of the specification in which he/she has interest. In discussing the invention, Partition Context (a.k.a. Partition) is the term selected to demark processable sub-views of the facets of an object definition consisting of Attributes, Renderings, References, Composition, and Network. Using Attributes (in a Product Composition Environment) as an example, one can see that it historically has been the practice to group measurements and tests into partitioned sets to make it easier to bring them into play. The invention uses "Partition Context" a.k.a. "Partition Name" to identify these groupings. The partition name adds meaning to the group of ingrediential objects by providing the context. A good Partition Name will convey nature and purpose to a set of ingrediential objects. In some cases all of the ingrediential objects in a partition work together to carry out a purpose such as driving a function or piece of machinery. FIG. 41 depicts the role of "Partition" in the integration of structure and process. The invention can provide uniform specification appearance across all kinds of business objects. All specifications are configurable to have the same look and feel.

The Role of Ontology in Business Object Definition

The invention is well-suited to the task of managing industry and company ontologies as well in applying an ontology to the definition and creation of business objects. In applying the invention to this task, the following definitions are helpful. An "ontology" is a set of abstract concepts that defines the area of common interest within a particular community. It is the theory of what the world is, or "contains". A "lexicon" is the set of actual terms used within a particular human activity system, where a term can be a word or a set of words. An example of this is a business lexicon, which includes the set of terms used in a particular business. A "taxonomy" is a division into ordered groups or categories, such as a classification of objects in an ordered system that indicate or feature natural relationships.

Company-specific and/or industry-specific ontologies, consisting of a lexicon of predefined ingrediential objects and values in taxonomic form, can be defined to the system as business objects. Content-wise they are organized into various conceptual structures that represent the taxonomies of given industry vertical or product groups. Once created they become input to the process of creating and modifying business object models in a language consistent manner.

As related earlier, all object definitions/specifications have the potential of interrelating with other definitions/specifications within and across company boundaries. This produces an urgent mandate for a definition system that can be configured for an industry or industry group to provide a common ontology producing a collaborative environment for applying and exchanging object definitions and specifications.

The invention provides such a system for end user creation of definitions/specifications through a consistent user interface for the viewing, understanding, exchanging, and processing such definitions/specifications.

Building an Ontology

In accordance with the invention, one can define the terms and their use within a target ontology body of knowledge. As each term object is added to the ontology, it is placed within a "partition context" and assigned a "role." Context defines how the ontology terms are used within the target body of knowledge. Role defines the nature and behavior of the ontology ingredient should it be chosen (e.g., by drag-drop from the ontology palette) as a participating ingredient of some business object.

Formulating Specification Content

The invention can be used to define templates for the creation and management of Business Objects. As discussed above, these templates are known as "models". Models are business objects that take the form of revision-controlled specifications. Model definitions are composed of other business objects that also are dynamically created and/or composed by users of the invention.

One preferred embodiment of a business object definition system in accordance with the invention uses Explorer or Instance Editor transactions (discussed below) to create machine processable, application independent, model definitions that capture knowledge as reusable chunks that become the patterns for all object definition/specification instances needed in the business.

Each model, as part of its definition, contains rules for managing the collection, edit, and derivation of ingrediential attribution values. A model's rules apply to all business object instances that are instantiated from models. To promote consistency and standardization new objects including sub-models can be based on (higher) preexisting models.

Collecting and Completing Object Definitions

Object definitions produced by the "create" function require additional specification detail in order to complete their definitions. Criteria controlling additional detail in the form of user input, as well as compliance checking, content applicability, auto derivation, and specification efficacy checking is inherited from the parent model.

Object Definition Prompting

The invention provides a "prompting function" as an assist to a user in capturing additional specification detail. Prompting uses the definition criterion inherited from an object's parent model to generate the requisite collection window/display screen form in the desired prompting capture sequence using drop boxes, check boxes, etc per the specification's definition. It further uses the object's definition to determine the collection sequence. Prompting works in an exception mode displaying for capture and derivation only the as yet incomplete or missing specification contents. During prompting, subsequent ingrediential content may be dynamically suspended from display during prompted capture based on earlier choices and applicability rules. The prompting function, along with derivation, content suppression, and capability validation allow the invention to be used as a configurator for capturing the definitions of Products, Processes, and the like.

Object Definition Display

Figure 38A:
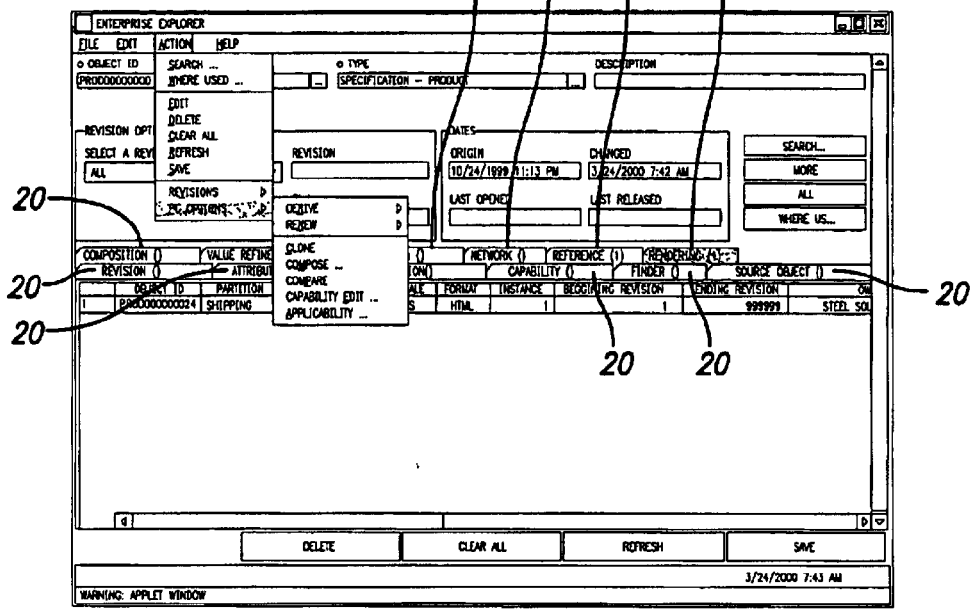
FIGS. 38A through 38Z show computer monitor displays depicting examples of the use and features of the enterprise explorer of the business object definition system of FIG. 37.
Figure 38B:
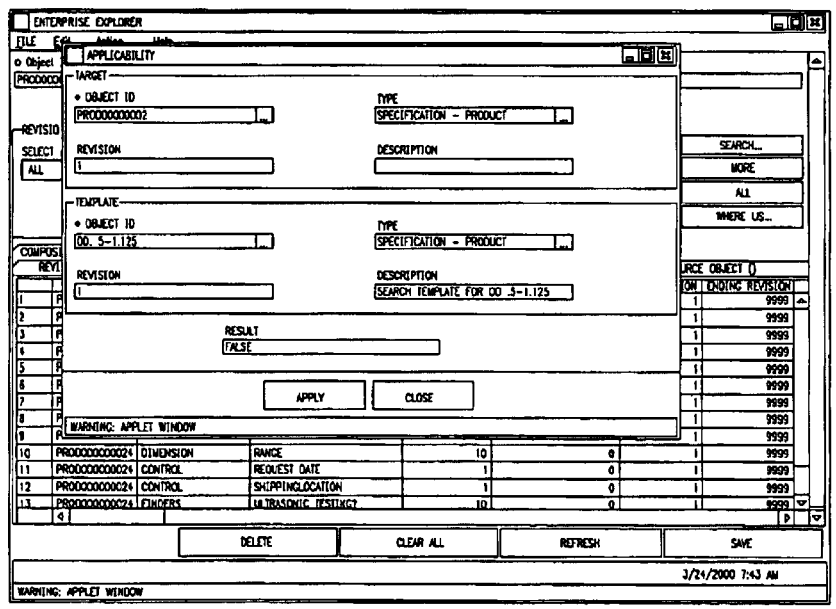
Figure 38C:
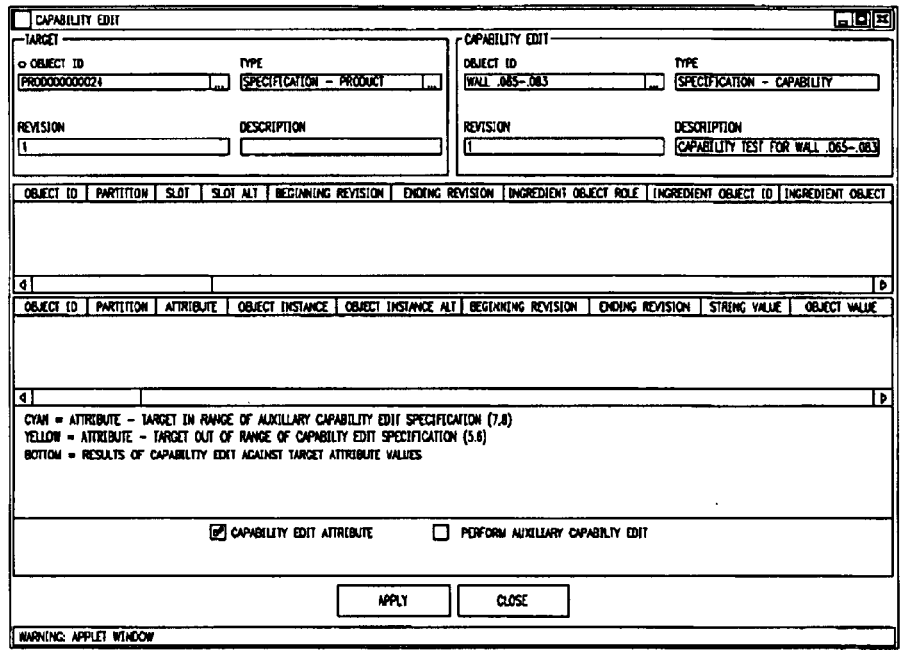
Figure 38D:
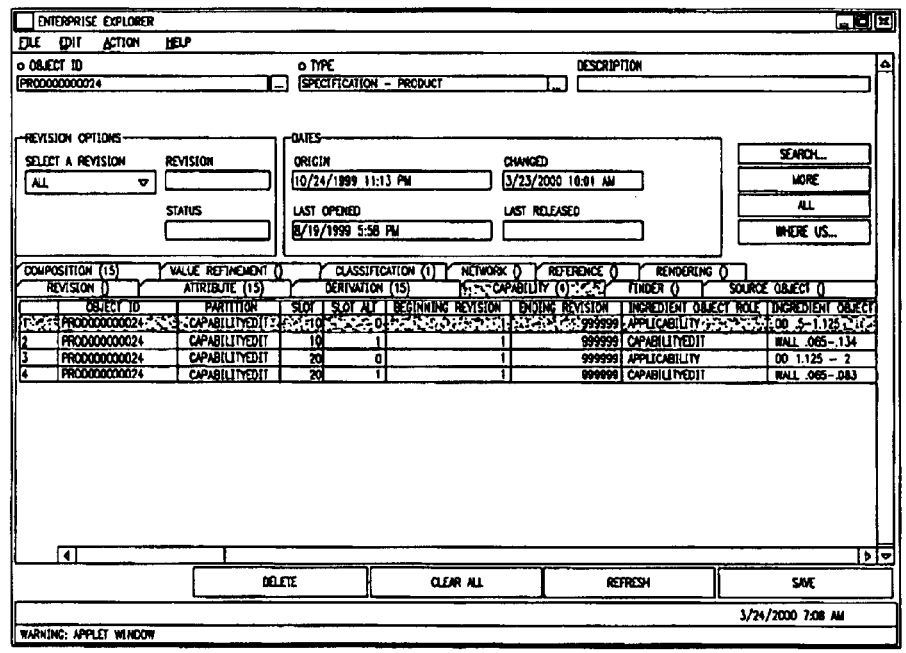
Figure 38E:
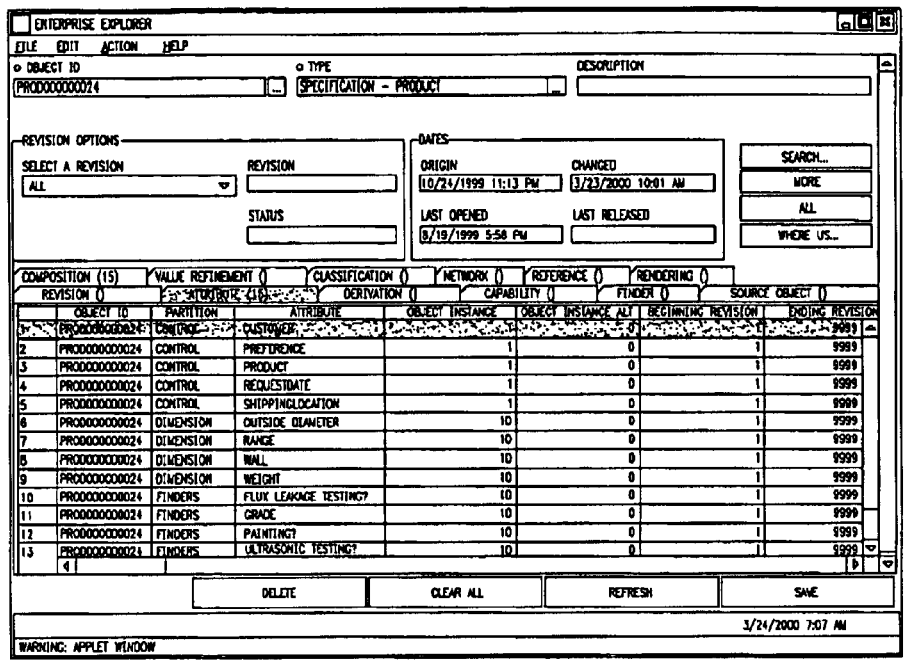
Figure 38F:
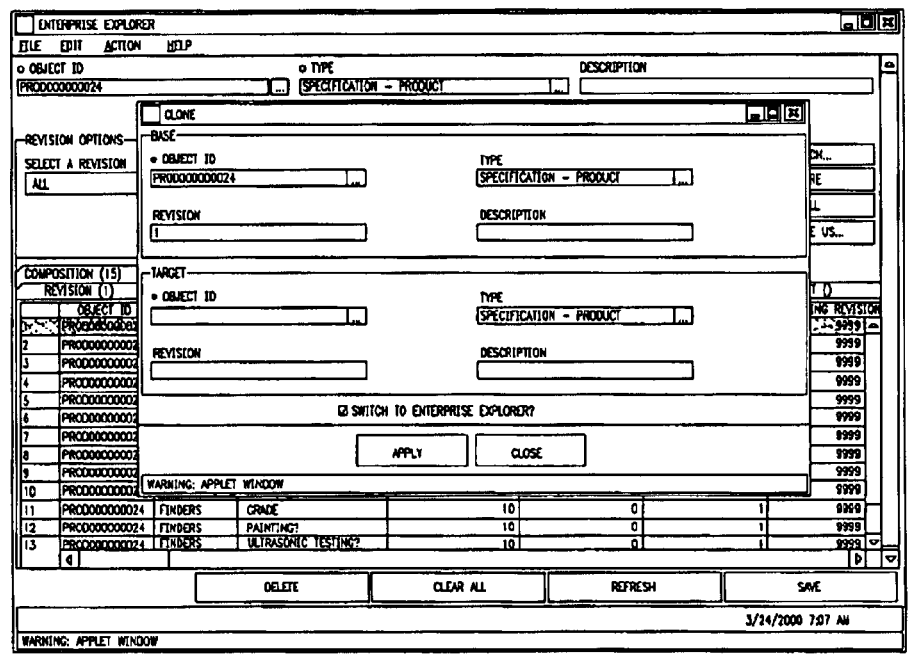
Figure 38G:
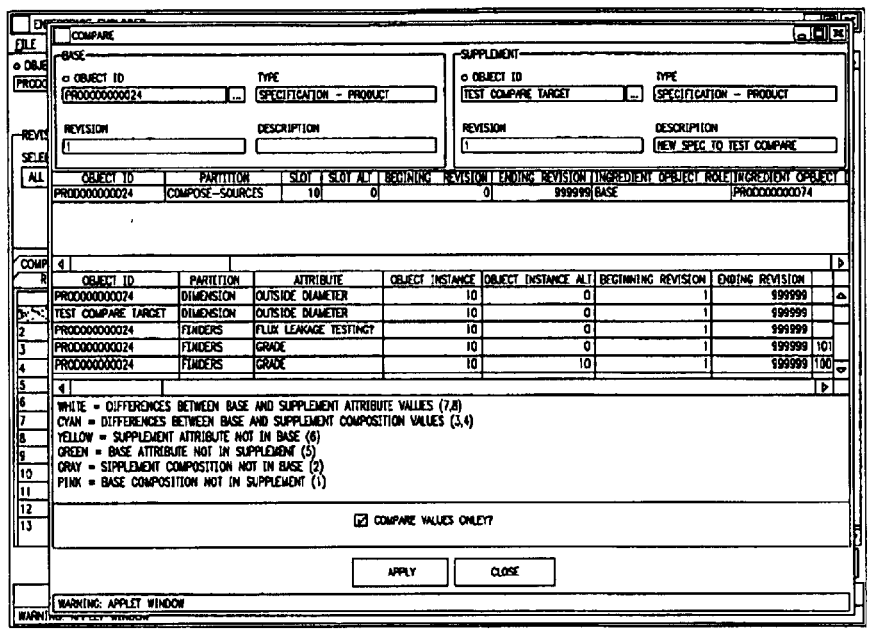
Figure 38H:
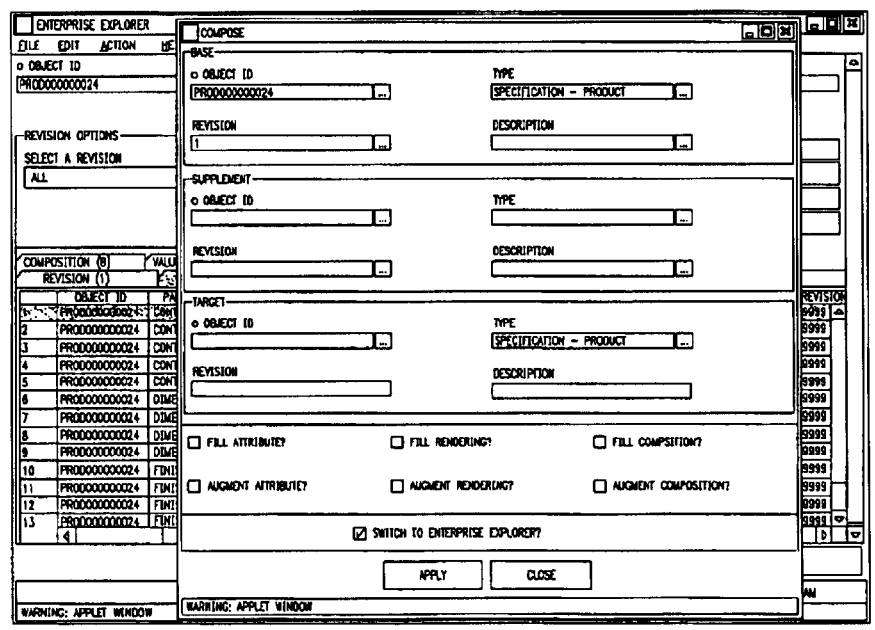
Figure 38I:
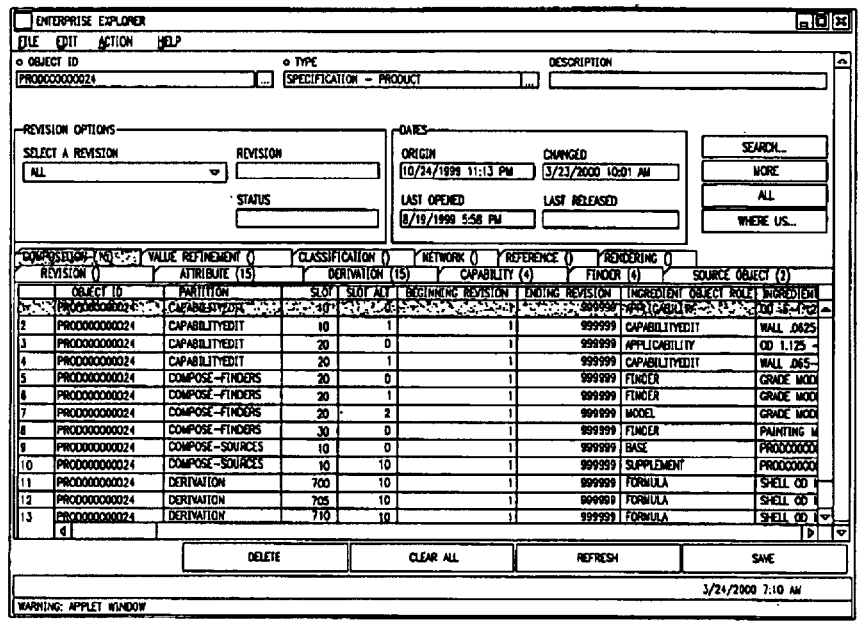
Figure 38J:
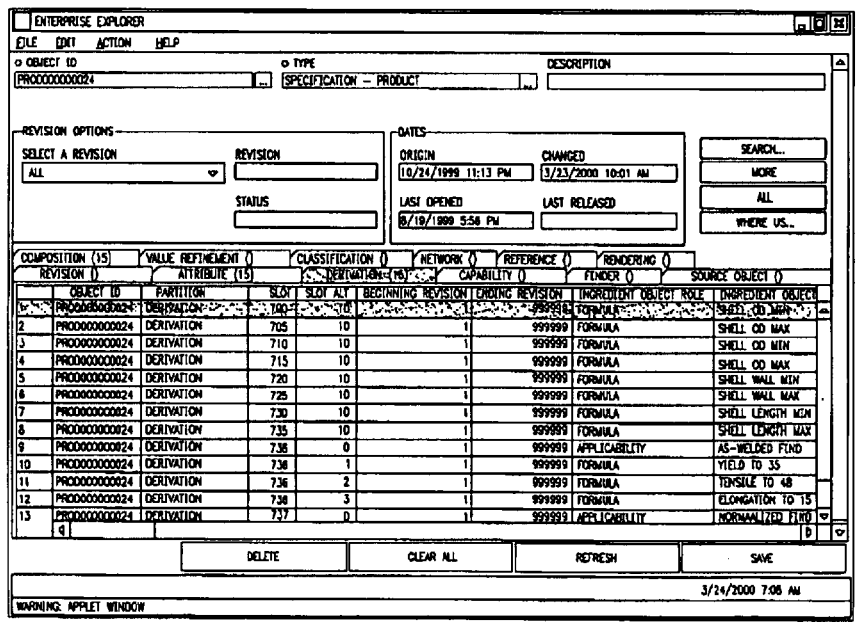
Figure 38K:
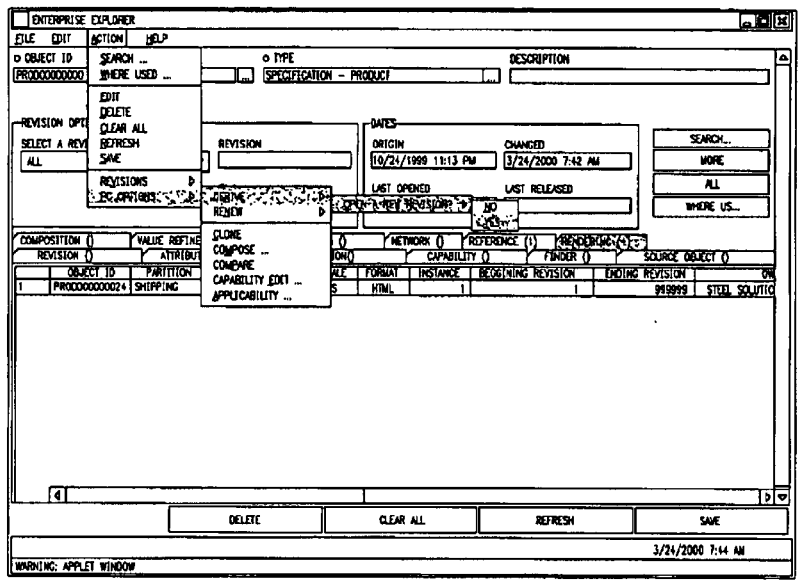
Figure 38L:
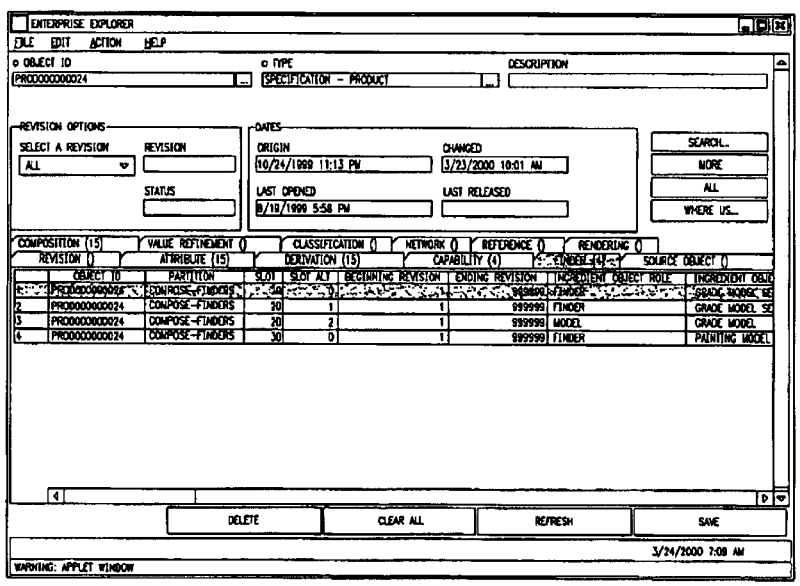
Figure 38M:
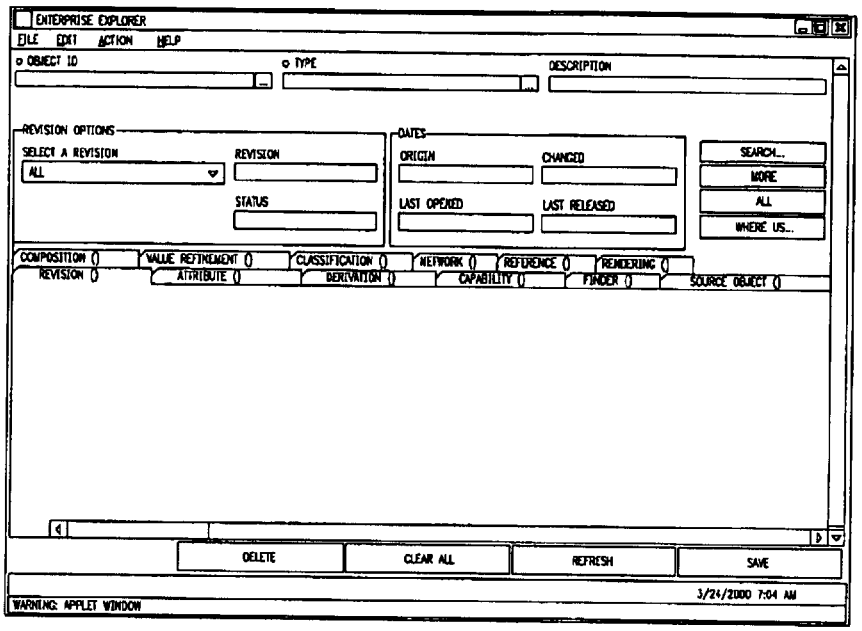
Figure 38N:
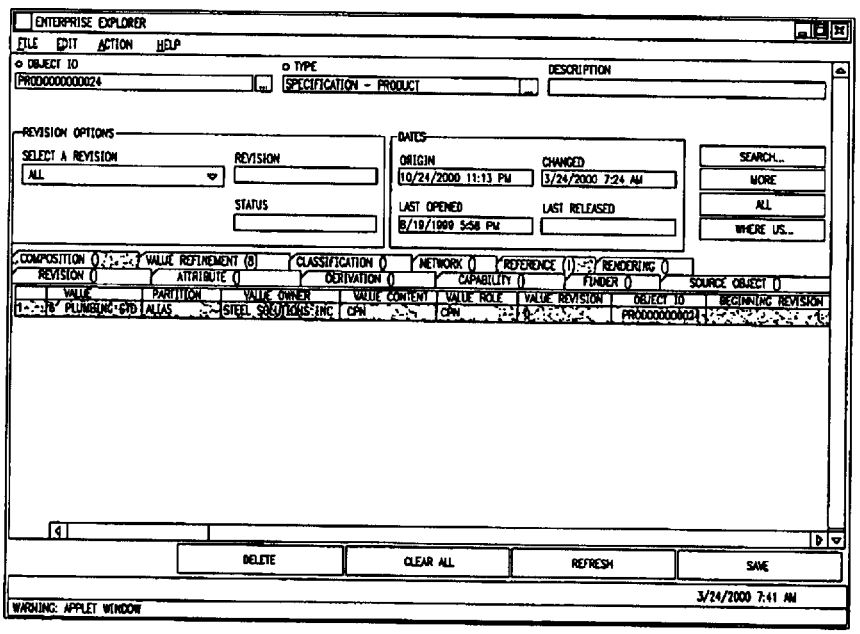
Figure 38O:
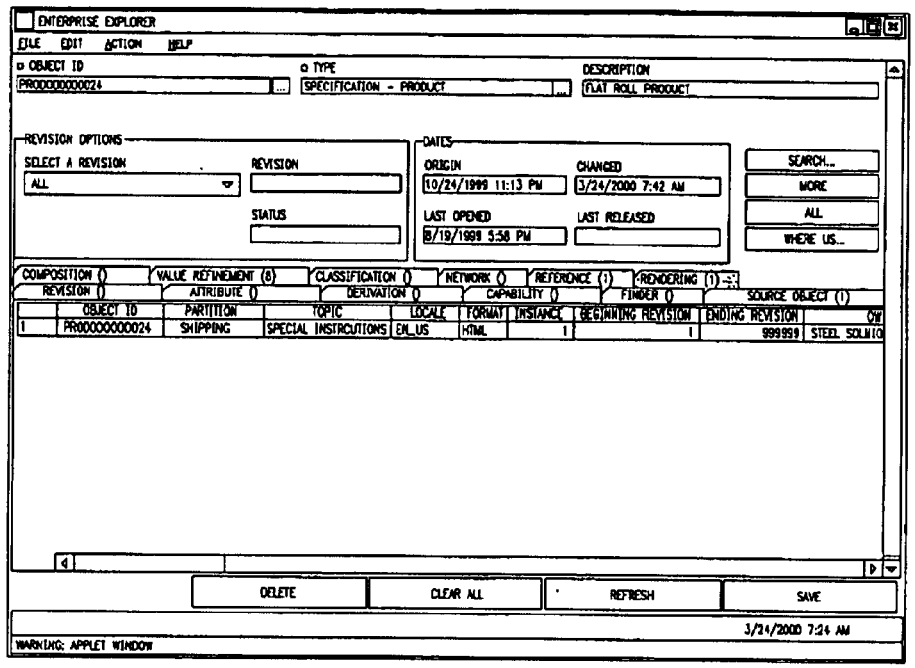
Figure 38P:
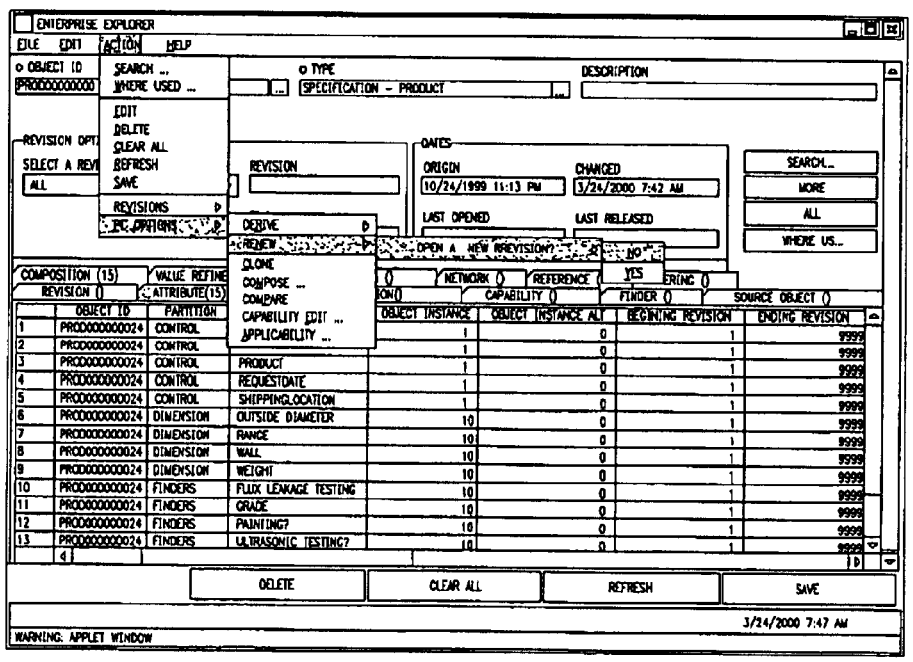
Figure 38Q:
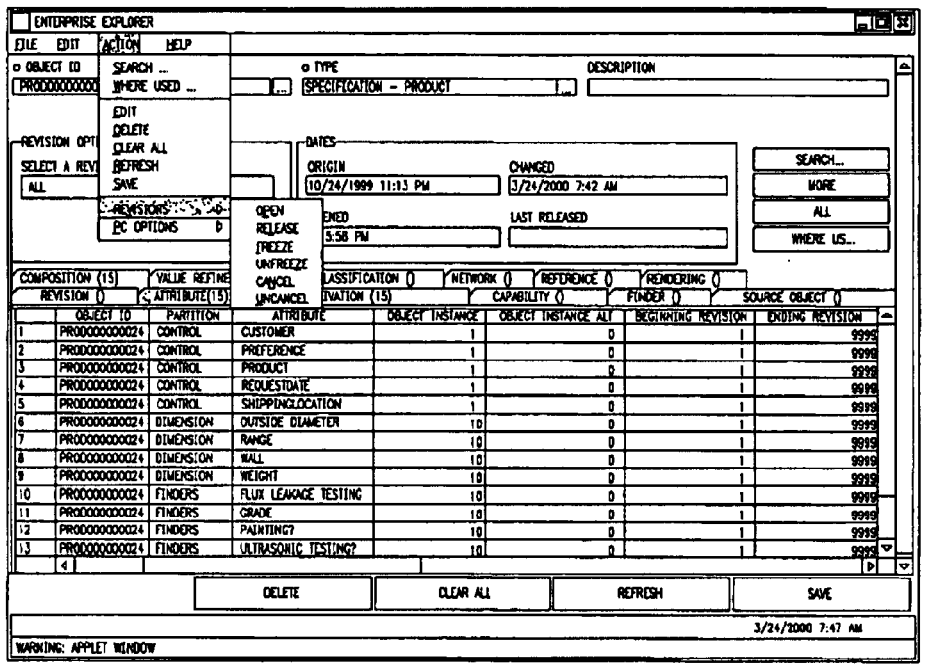
Figure 38R:
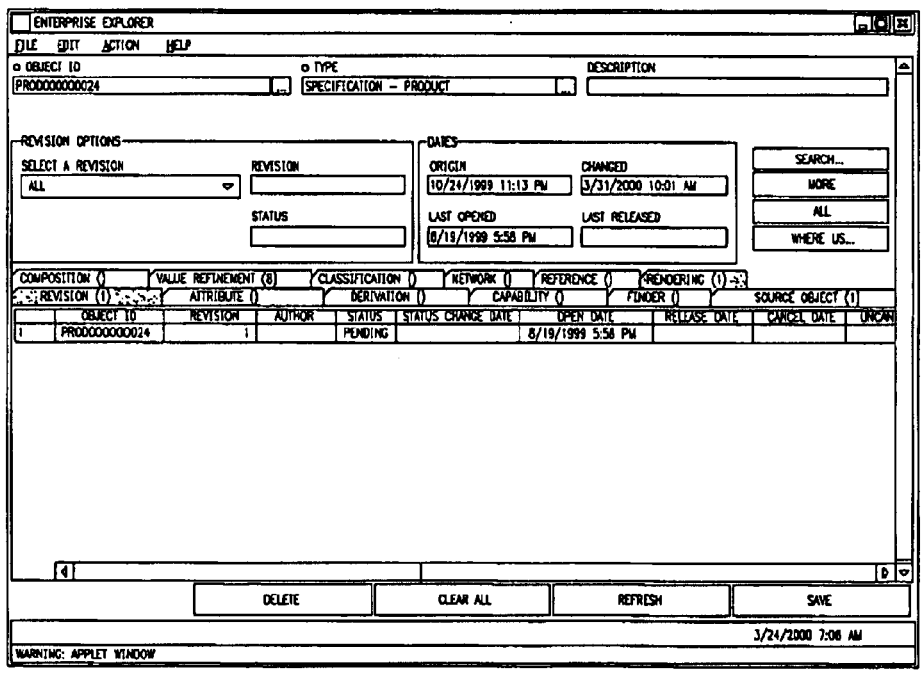
Figures 38S, 38T:
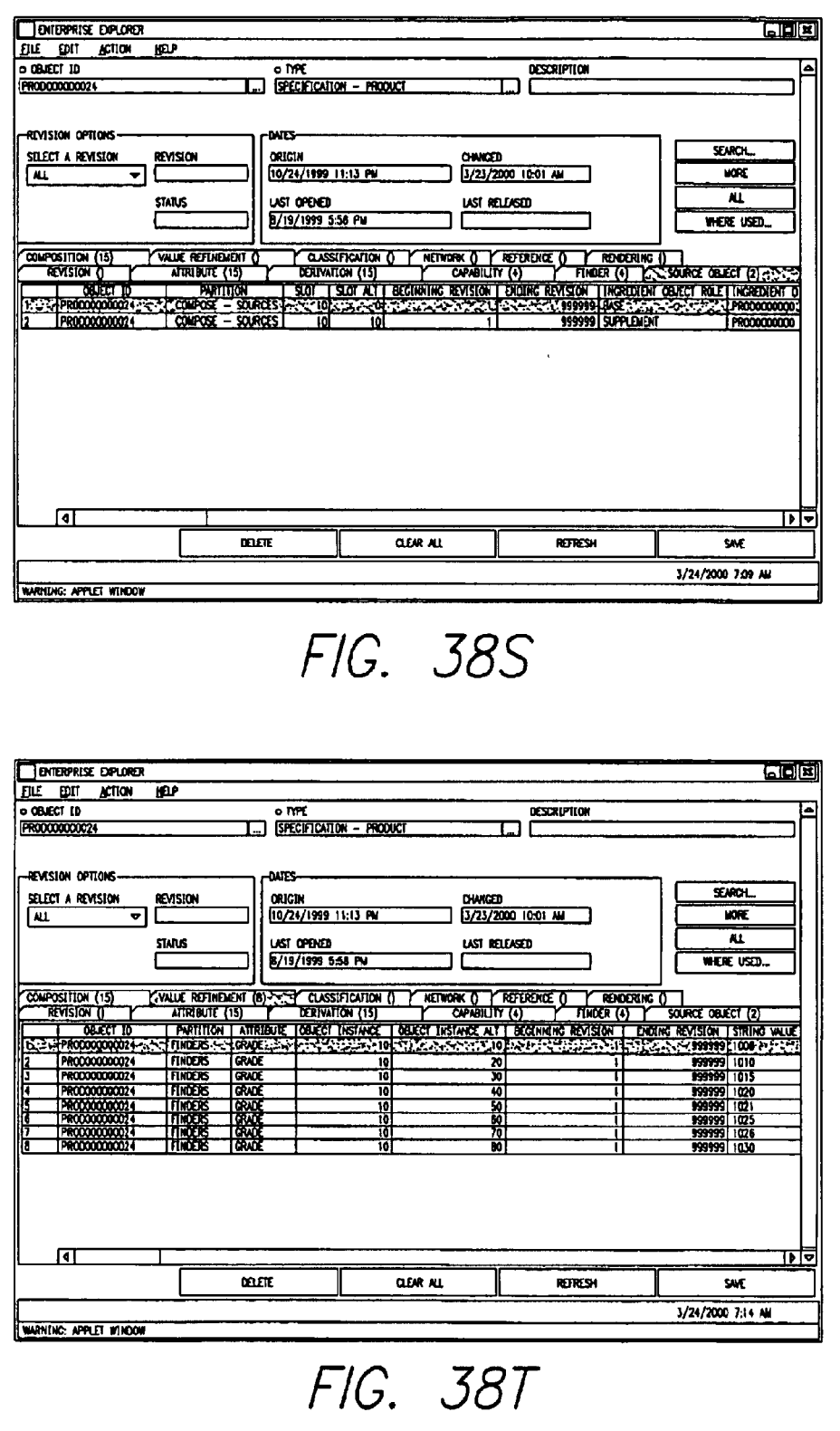
Figure 38U:
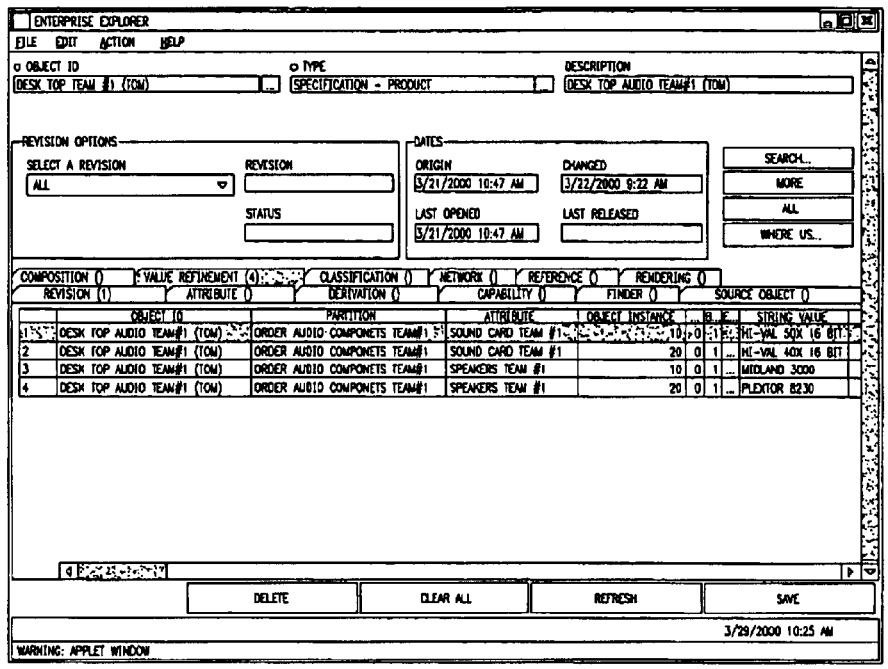
Figure 38V:
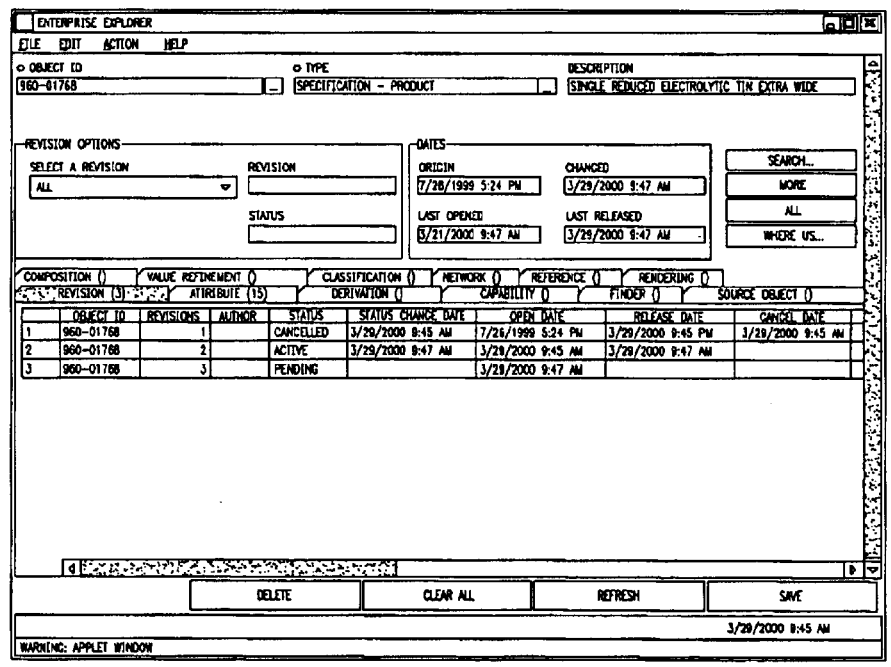
Figure 38W:
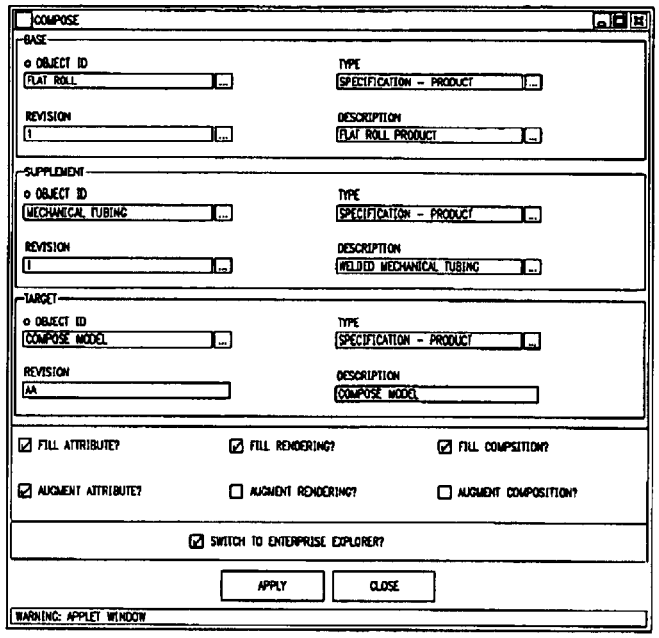
Figure 38X:
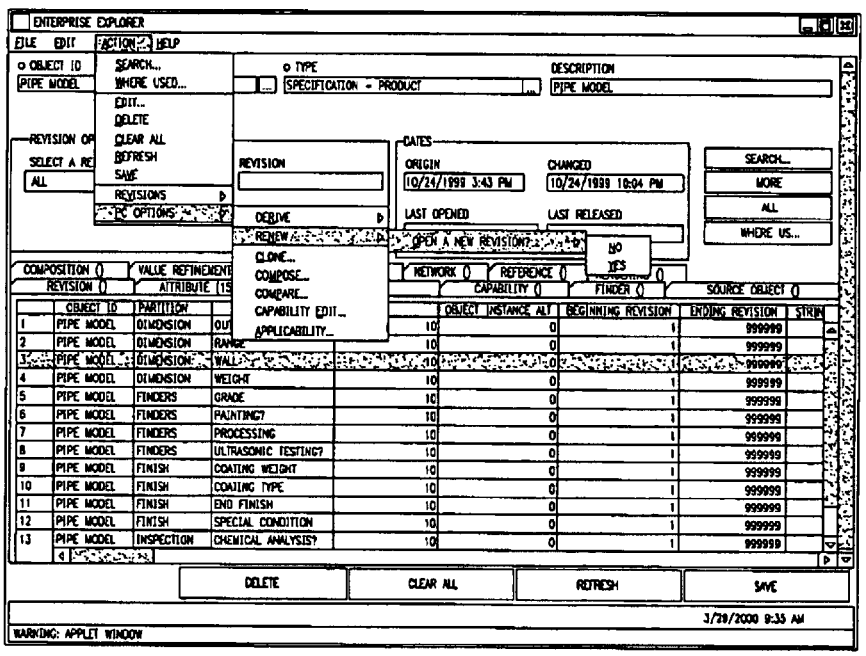
Figure 38Y:
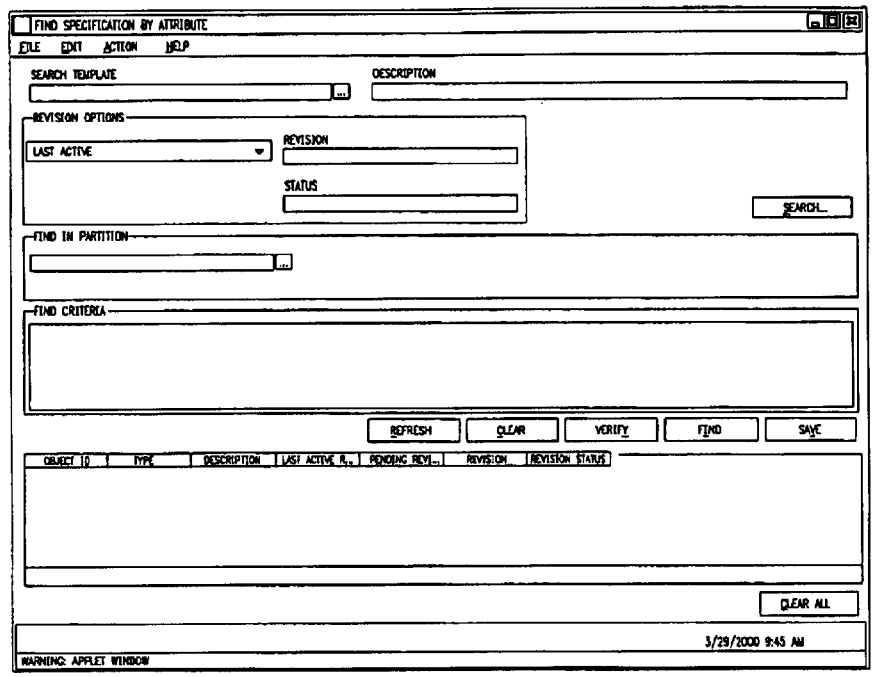
Figure 38Z:
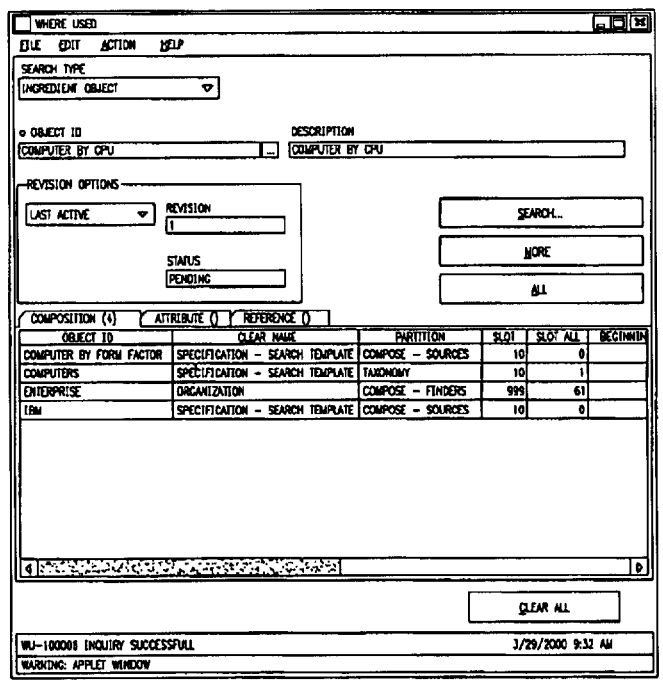
Figure 39A:
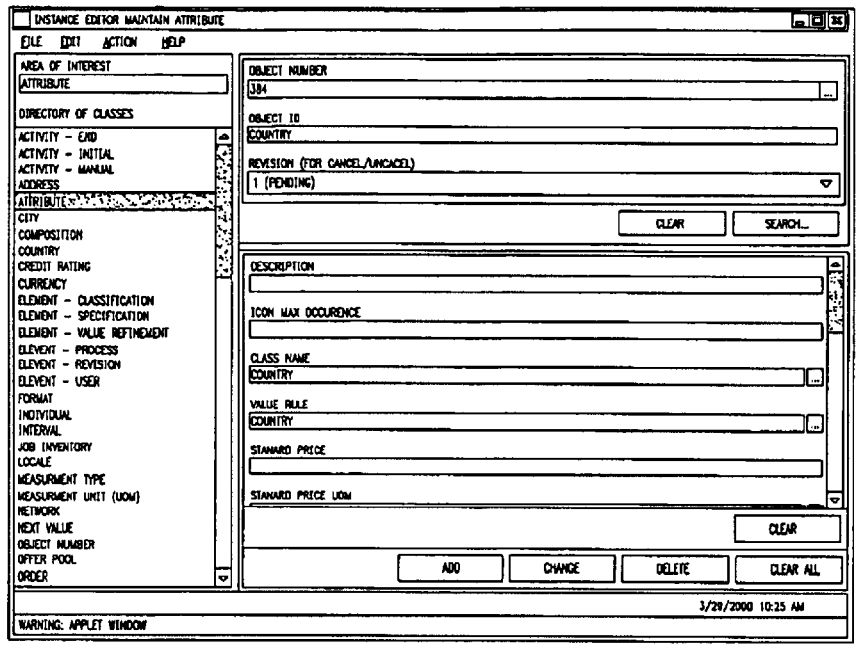
Figure 39B:
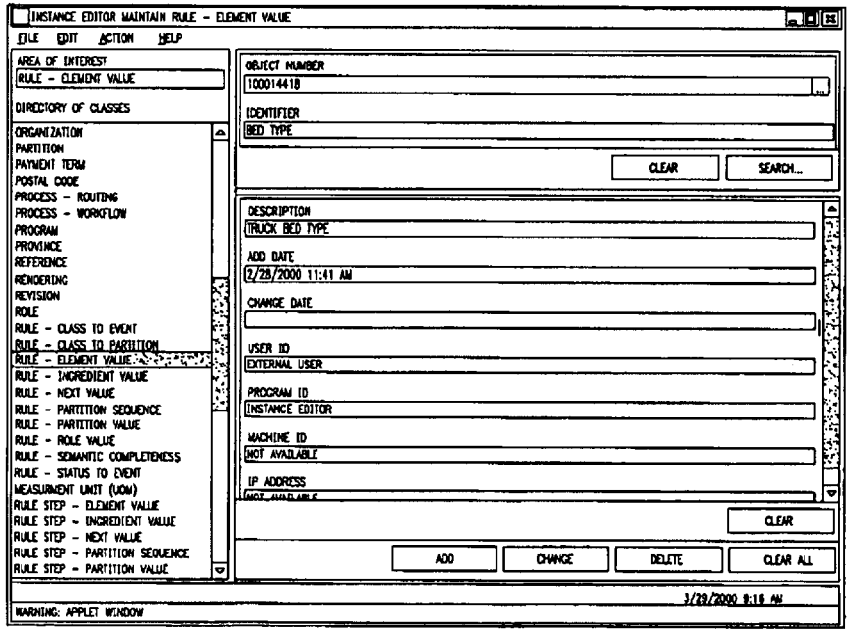

The object's definition is directly used to display the constituent definitional ingredients of the object for viewing or update. The various facets of definition that can be viewed and updated include revisions, attributes, relationships, renderings, and references. The invention provides an Enterprise Explorer and Instance Editor to display and update the all aspects of an object specification. FIGS. 38A through 38Z show examples of the Enterprise Explorer displays. As shown in those figures, the Explorer view of object definition is customizable using configured tabs 20. The tabs 20 are relate to partitions. The user administrator can configure and name the tabs and the "Partition Contexts" that appear within a tab.

Content Personalization

Specification content can be owned and may include a mix of locales and content audience ownership. Use of the attribute Ingrediential "content ownership" and "locale" allows ownership of an object's definition to transcend company and organizational boundaries.

Core Methods

This section describes the core functions of the invention and the general approach to creating business applications in accordance with the invention. The basic functions of the Business Object Definition System and Method include creating object definitions, displaying object definitions and capturing or deriving ingrediential content definitions.

Create

The Create function initializes new business object instances by instantiating them from a selected Model. The newly instantiated instance then has its definition completed in accordance with criterion that it has inherited from its parent Model.

Clone

Figure 7:
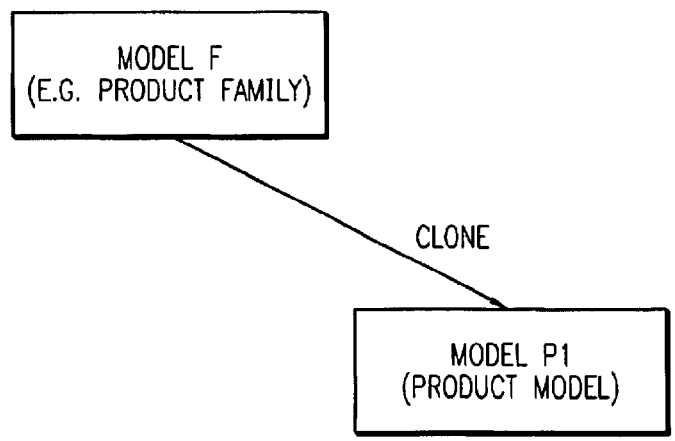
FIG. 7 graphically depicts an example of how the clone method produces a new object by copying an existing object.

The clone method instantiates a new object from an existing object (specification) providing the newly instantiated object with a new identifier. FIG. 7 graphically depicts an example of how the clone method produces a new object by copying an existing object. The newly instantiated object is given an open pending revision. While the pending revision is open, the new object's definition can be modified. The collection and derivation rules that govern the new object's specification are the same as existed for the source object. Stated another way, the new object inherits the source object's model parentage.

Compose

Figure 8:
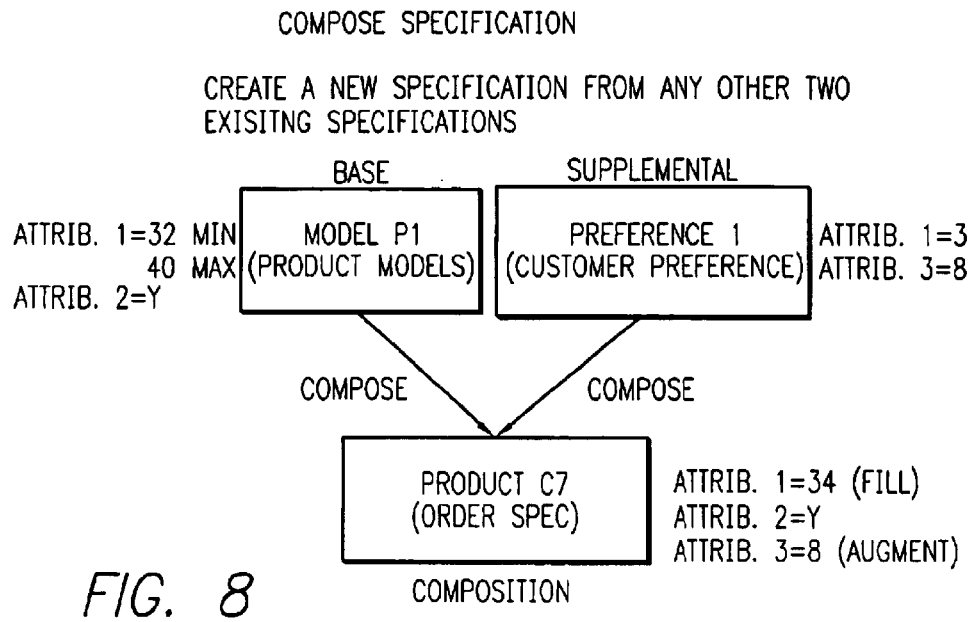
FIG. 8 graphically depicts an example of how the compose method melds together a base specification and a supplemental specification to produce a composite specification.

The compose function or method melds two objects together to create a third object specification referred to as a "composite" specification. When melding two objects, one object acts as the "base" specification and the other object acts as the "supplementing" specification. FIG. 8 graphically depicts an example of how the compose method melds together a base specification and a supplementing specification to produce a composite specification. The first step of the "compose" method applies the clone method to the base specification to instantiate what is to become the "composite" object. The compose method next applies the supplementing object's specification to the newly created composite base object using fill and/or augment rules. The fill step looks for corresponding ingrediential objects and uses them to override the base object attribution values with the supplementing object's attribution values. The augment step adds ingrediential objects appearing in the supplementing object that do not already exist in the base object specification. With the fill mode, when a match is found, the values on the target are overridden with the values from the supplement. As is the case for the create and clone methods, the instantiated composite object is given a pending revision of one. A typical use of the compose method is to instantiate a Product Specification by combining a selected Product Model with Customer shipping Preferences and Customer Commercial Terms. Pseudo code for implementing the "compose" method is presented in the Appendix hereto.

Compare

Figure 9:
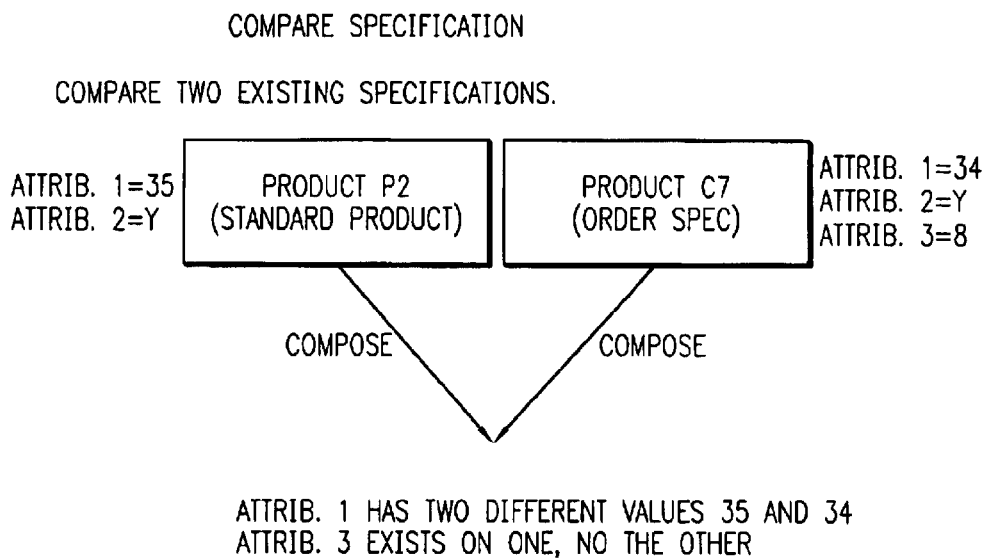
FIG. 9 graphically depicts an example of how the compare method compares two specifications to show elements in one specification that are different or are not in the other.

The compare compares a first business object definition with a second business object definition to ascertain differences or similarities between the first and second business object definitions. The compare method includes the steps of selecting the first object definition, selecting the second object definition, setting the comparison rules for comparing the first object definition with the second object definition, and comparing the first object definition and the second object definition. FIG. 9 graphically depicts an example of how the compare method compares two specifications to show elements in one specification that are different or are not in the other.

Find

The find method uses user-supplied criteria in the form of attributes and their values or ranges plus a list of other ingrediential objects and their values and/or references to create a list of conforming objects. The Appendix describes the "Find" method in more detail and includes the pseudo code for implementing the method for finding an object via its attributes.

Renew

The renew method updates specification content and rules to be consistent with an object's latest parent model revision. The renew method operates at the ingrediential object level. The source specification for each ingredient is used to refresh the criterion and rules criteria for managing object ingrediential content collection and derivation for that specific ingredient. Normally, the source-specification is the original parent model. Sometimes it is a "compose" source. Pseudo code for applying the renew method to attributes is provided in the Appendix.

Revision Control

Revision control may be used to formally manage and release the different versions of a definition that evolve over time. Revision Control is an optional feature when creating the definition of an object.

Content effectivity is used to track the beginning and ending participation of individual ingrediential objects of the definition in the range of object definition revisions. Content effectivity provides the ability to create revision instances whenever they are needed and then to dispose of them when they are no longer needed knowing that they can be recreated.

Composition Effectivity is used to designate which revision of an ingredient option works for which range of revisions of the object definition. Versioning Using a date and/or a revision, the exact versions of any or all related ingrediential objects in effect at a moment in time can be determined.

Applicability Determination Method

Figure 11:
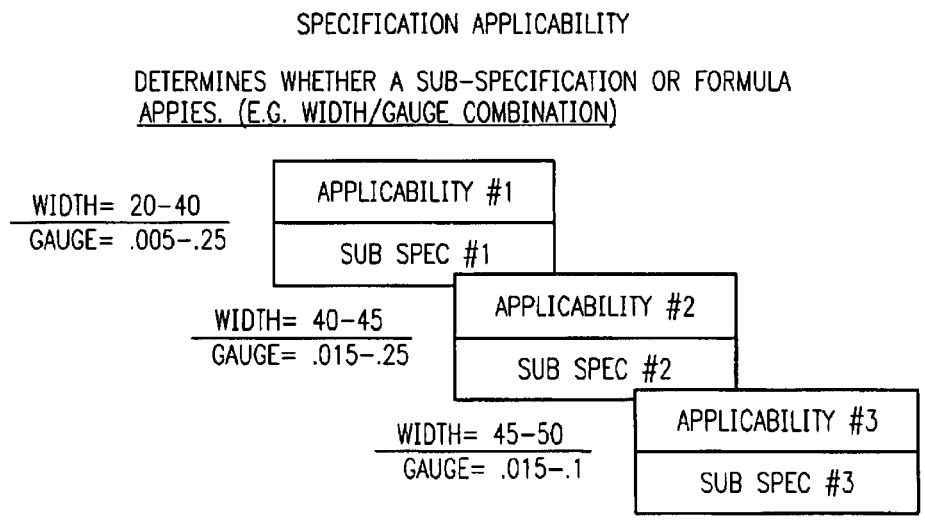
FIG. 11 graphically depicts an example of the use of specification applicability to determine whether a sub-specification applies.
Figure 17A:
Figure 17B:
Figure 17C:
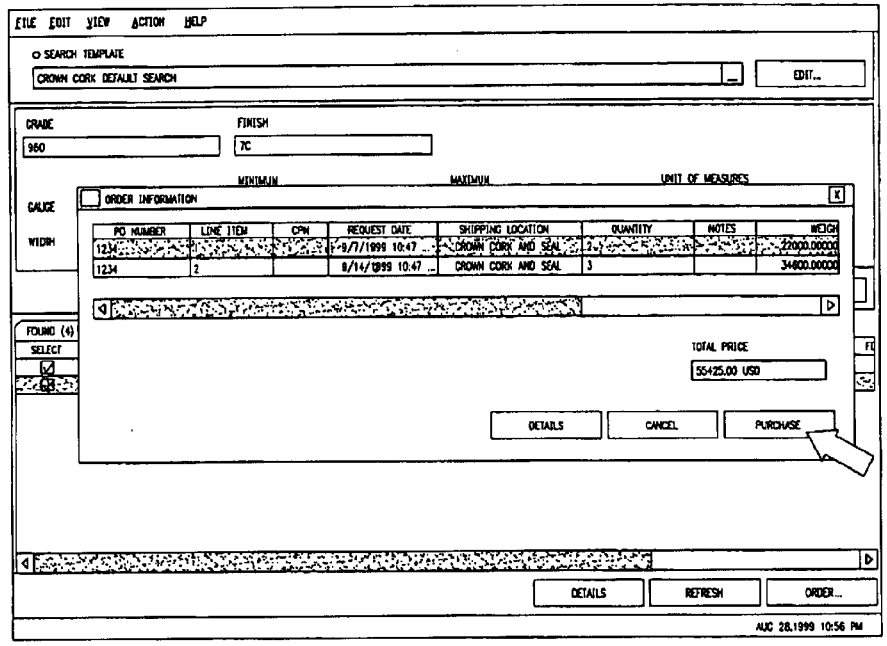
Figure 17D:
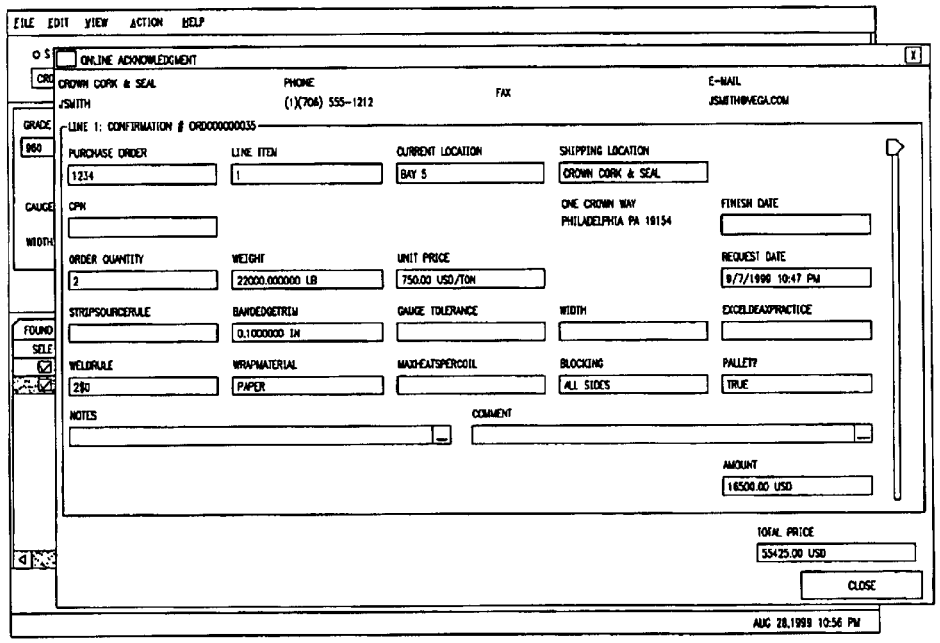
Figure 20:
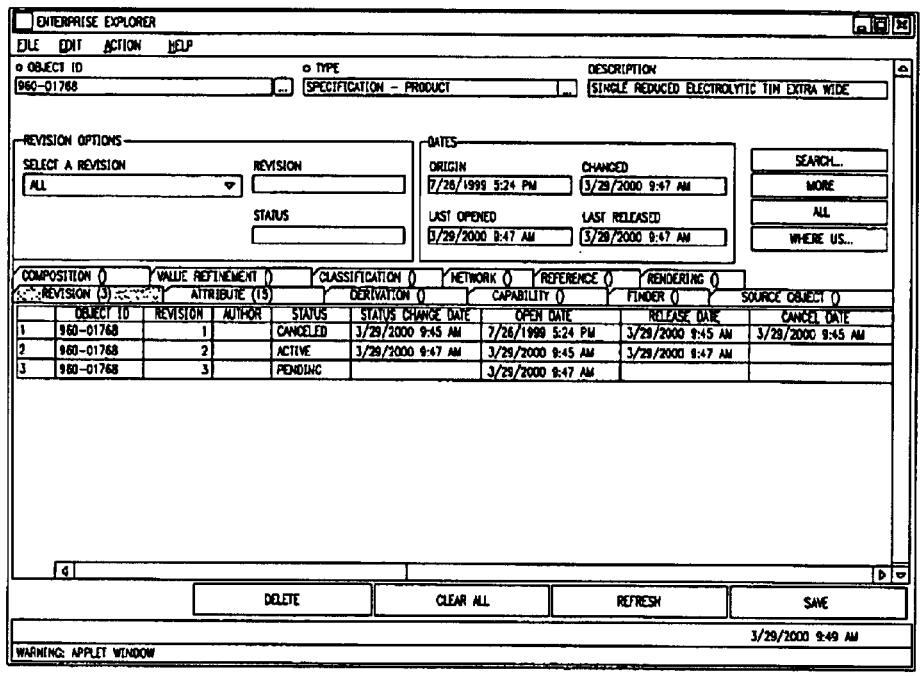
FIG. 20 shows the revisions of product specification.
Figure 21:
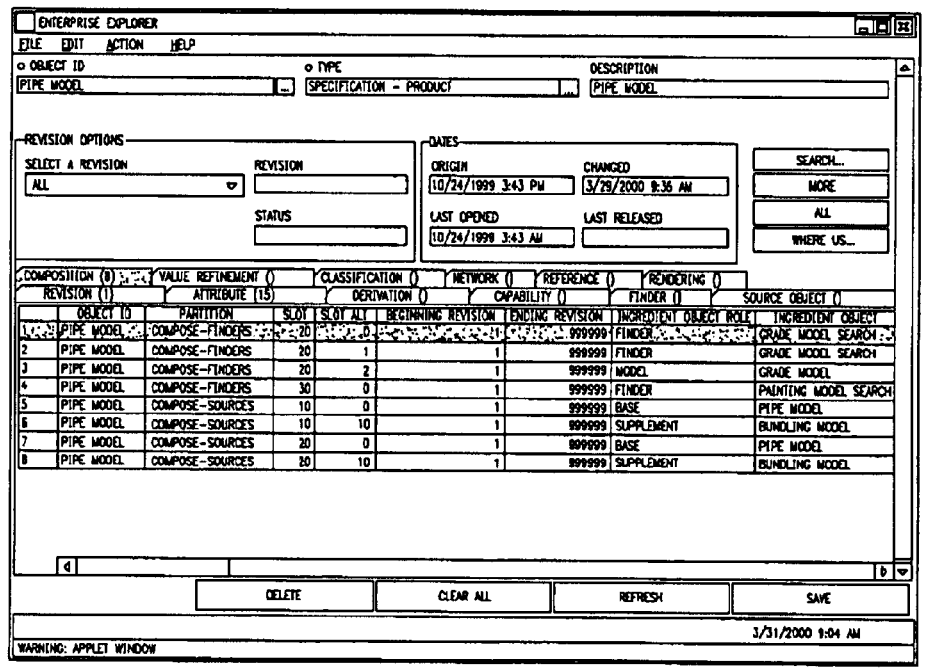
FIG. 21 shows various ingrediential objects used in composing a specification from multiple other specifications.
Figure 24:
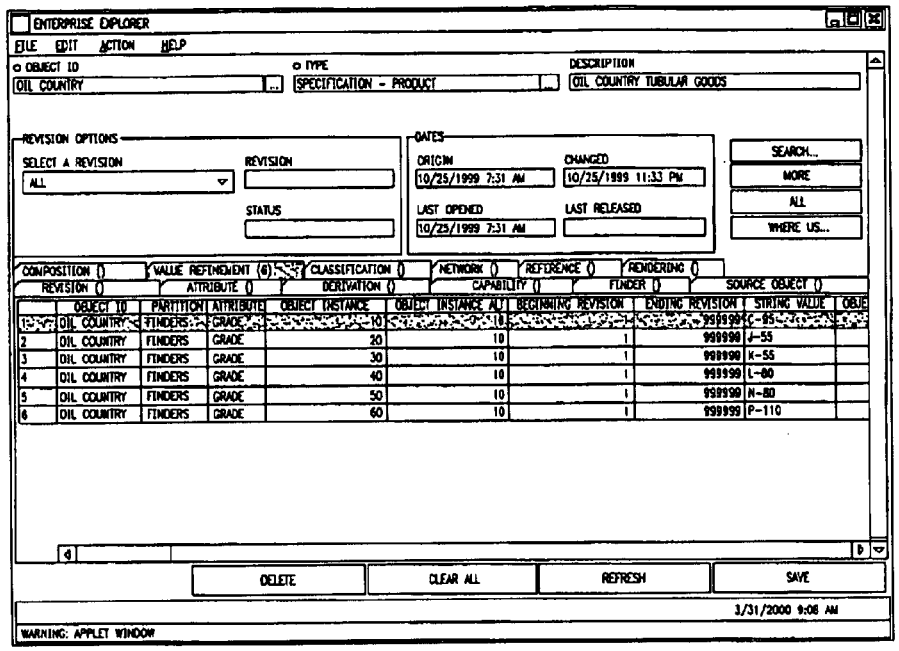
FIG. 24 shows the refinements to an attribute domain that are in effect for the shown product model.
Figure 25:
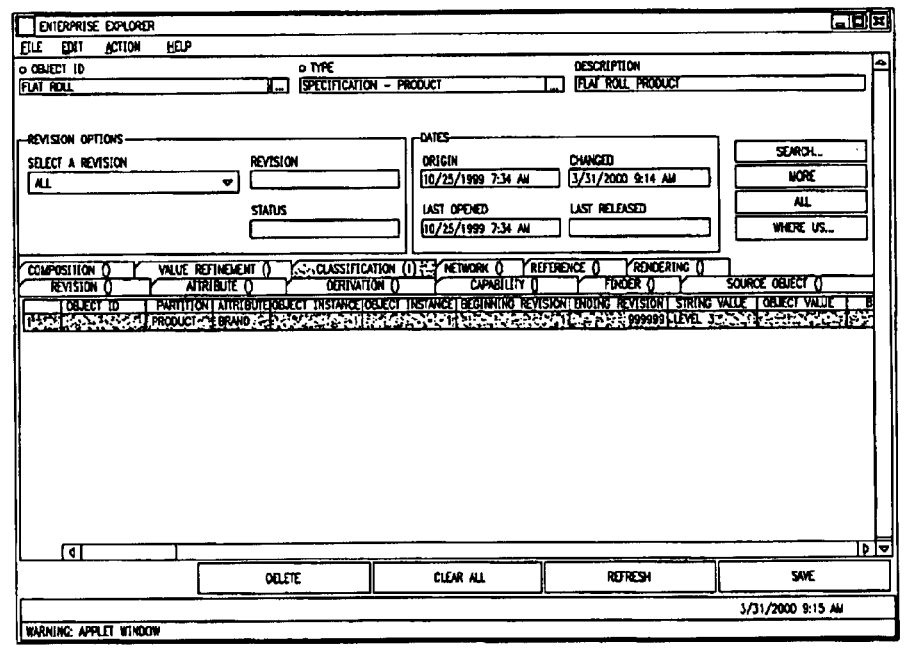
FIG. 25 shows an assigned classification for a product.
Figure 26:
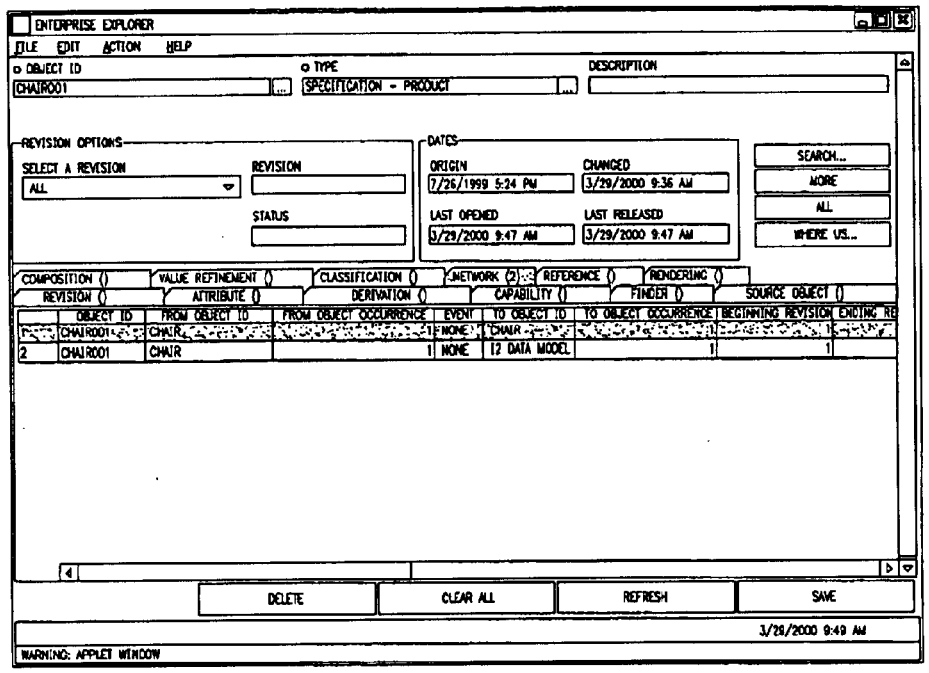
FIG. 26 shows is a screen for defining object network connections. The same information is maintainable through the graphical network editor.
Figure 27:
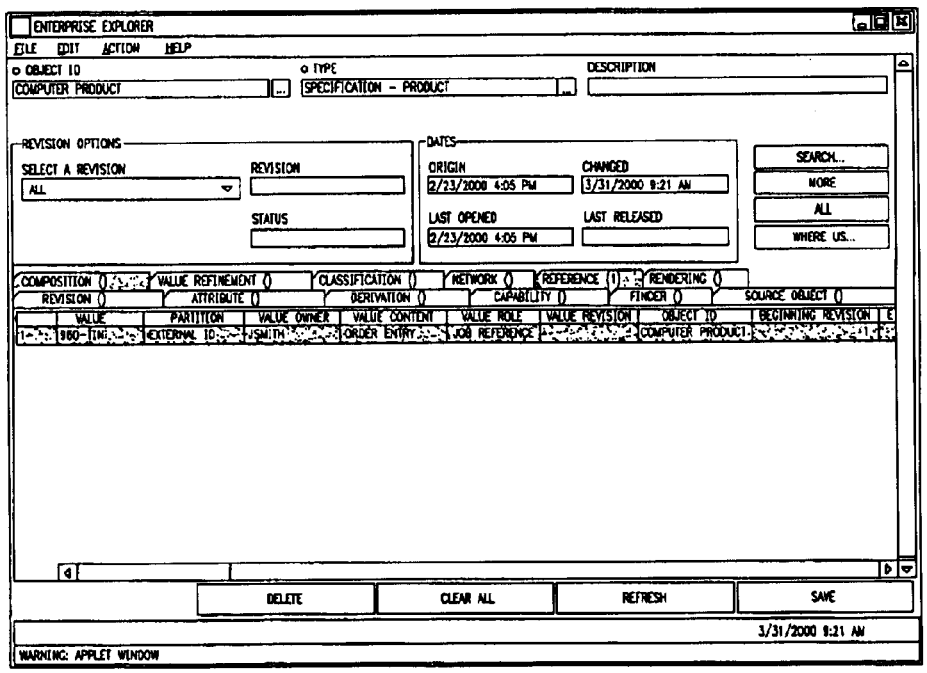
FIG. 27 shows an external reference for a product.
Figure 28:
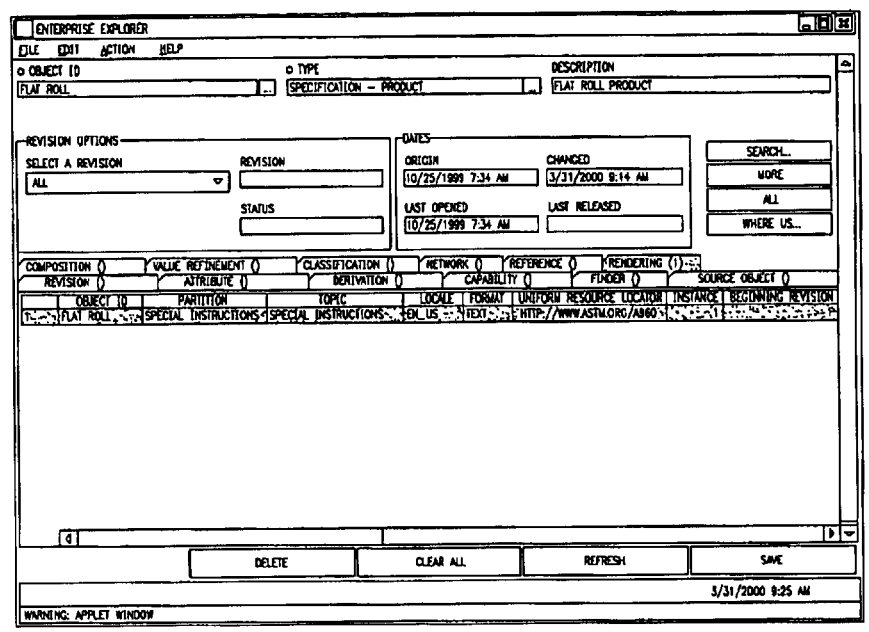
FIG. 28 shows instruction text that has been made part of an object's specification. Note the Uniform Resource Location address for the text document.

"Applicability Objects" are object specifications used to determine the readiness or usefulness of an ingredient object or a set of ingredient objects. The applicability method uses the compare method to determine the current applicability of an ingredient or ingredient set. FIG. 11 graphically depicts an example of the use of specification applicability to determine whether a sub-specification applies.

Capability Assessment Method

This method validates the efficacy of an object specification by determining if its ingrediential content (in total) is within various capability bounds. The capabilities, captured in the form of specifications, most often represent chunks of engineering know-how and manufacturing knowledge. Once a "Capability" is defined it can become a ingredient in one or more models. Objects instantiated from a model inherit capability criterion objects where they are applied on request or as part of that object's release process. The Capability Assessment Method uses the "compare" method. Checking a product for manufacturability is a common application of the capability method.

Figures 1, 37:
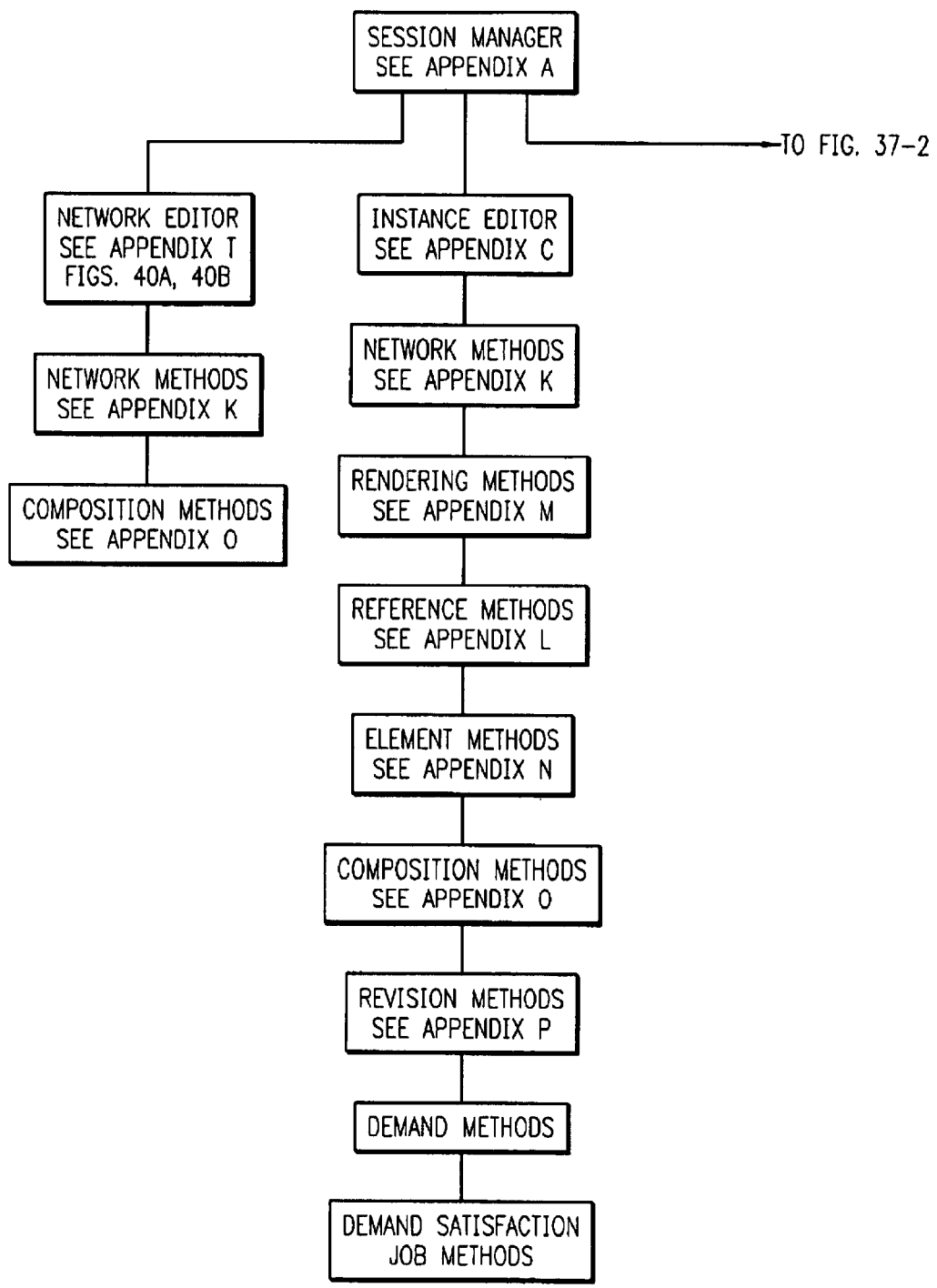
FIG. 37 is a logic software component diagram of a Business Object Definition System ("BODS") in accordance with the present invention.
Figures 2, 37:
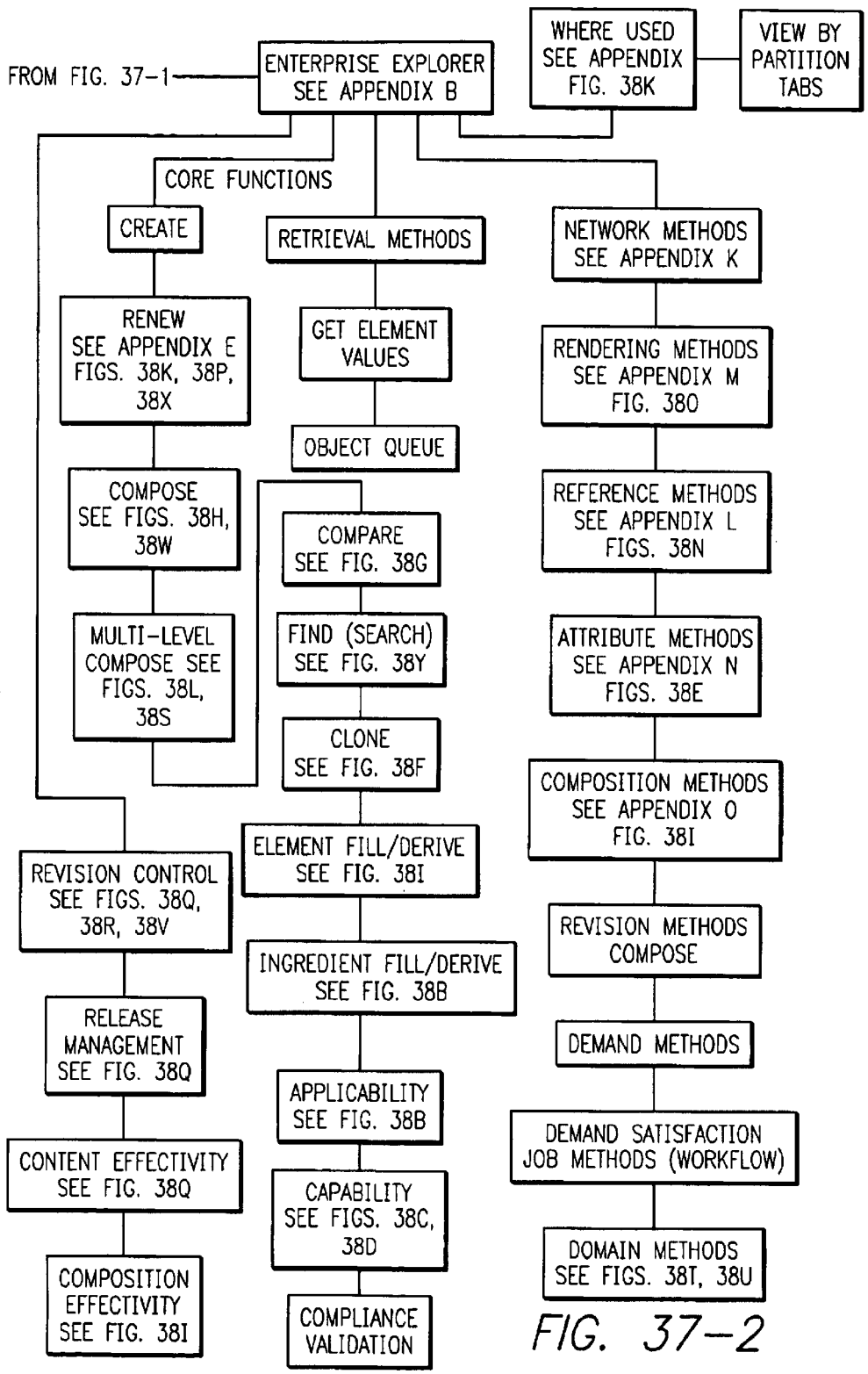

Still referring to FIG. 37, additional core functions or methods of the business object definitions system and method in accordance with the present invention include the following.

Attribute Fill Methods

Attribute dimensions or values can be filled from simple domains, model specific domains (a.k.a. refined domains), by formulas, and from two-dimensional array cells. All "Fill" criteria are preset at the model level for the involved attributes. Each Fill source is managed as an object specification. Fill Methods can be triggered by the user and/or be set for auto derivation.

Derivation via Formula is used to automatically derive an attribute's value or its minnom-max dimensions from one or more other attributes. Derivation rules themselves take the form of object specifications of the type "formula". Formula operands become an ordered list of ingrediential objects within the formula specification. The object containing the attribute to be derived makes use of "applicabilities" to determine if all requisite operands are available and whether the formula or formula set should execute at this time. The user can trigger an attribute's formula or it can be set for auto derivation.

Object definitions consisting of array data are provided with an additional user interface for the loading and viewing of these specifications in a spreadsheet format. Attributes that qualify the use of the array data become part of the two-dimensional array object specification. These applicability attributes are used to dynamically retrieve the appropriate two-dimensional array object given the current attributes of the object seeking to use data from a two-dimensional array. Alternately, the model attribute can be preset to use a specific named two-dimensional array. "Fill" using a two-dimensional array object as the source object functions in both a "user selection" mode and an "auto fill" mode.

Ingredient Fill Methods

The options are to fill an empty ingredient slot from a designated object list or from an explicit list that is dynamically created consistent with applicability criteria specified in the object's model for the ingredient slot being filled. Multi-level compose is also used to fill ingredient slots. "Ingredient Fill" functions in both a user select mode and an auto fill mode.

Ingredient Fill Correlation

"Correlation model" comes in to play during "compose" when two definitions are melded. Example: An optional or non-standard choice of an ingredient made in a product definition needs to fill or overlay an ingredient slot in a supplier bill of manufacture.

"Correlation-model" is an attribute of ingrediential object. For an overlay to take place during compose the base and the supplementing composition ingredient must contain the same correlation model attribute.

Search Templates

"Find" criteria can be maintained as search templates that take the form of object specifications. These specifications consist of the attributes and ingrediential objects that are to be the basis for a search. The search can contain preset ingredient search criterion consisting of values and ranges. Users may dynamically interact with the execution of a search template to modify or set/reset values and ranges. Search Templates can be owned and can be placed in a knowledgebase.

Object Import-Export

The Integration Framework described below provides the components that may be used to synchronize or exchange views with legacy systems and/or standard industry packages.

Collection and Derivation Completeness Method

Collection and Derivation Completeness is a content validation method. It validates compliance with the user input and derivation criterion inherited from the object's model. It is executed as part of the object definition release process. It can also be invoked by a user to check progress anytime during specification content capture.

Ingrediential Object Release Validation Method

An object can not be considered "complete and ready to be used" if any of its ingrediential components are still in a definitional stage. To preclude release of an "incomplete object" the release status of any ingrediential object's revision is checked during object release.

Ingrediential Object Participation Applicability Method

This method gives an ingredient "in" or "out" specification status based on the current attribution values of the object or immediately related objects. Screening between alternate manufacturing facilities for a process step would be a use example. This method is a variation on the applicability method.

Compliance Method

Figure 10:
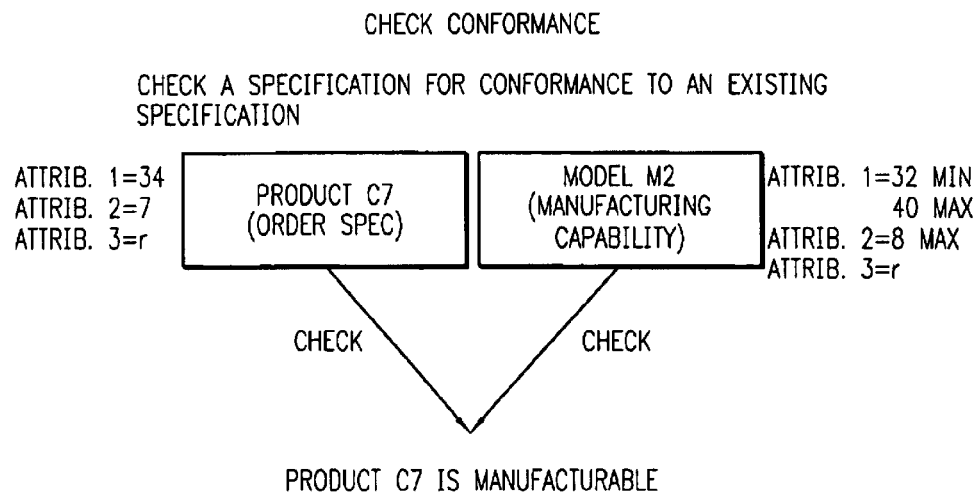
FIG. 10 graphically depicts an example of how the compare method can be used to check a specification for conformance to an existing specification.

The compliance (a.k.a. conformance) method uses the compare method to determine if a given specification is a true subset of another specification. FIG. 10 graphically depicts an example of how the compare method can be used to check a specification for conformance to an existing specification.

Multi-level Compose Method

This method is an elaboration on the compose method. As part of the specification prep process (often during order capture of an attribute-based product) the specification will be automatically prepped from reusable specification chunks. Example: a product model melded to customer manufacturing preferences spec melded to customer delivery preferences melded to previously negotiated commercial terms creates an order specification instance. All of this is set up in the product model using a partition containing Compose-Finders to find the appropriate supplementing specifications and a Compose-Sources partition containing the order list of compose sources. Prompting can occur at intermediate levels in the compose.

Where Used Method

Where Used displays objects whose definitions use a particular ingrediential object. Where used can filter using ingrediential attribution values to create a more refined where used list.

Mass Change Method

This is a method that propagates a change made to a model's content and collection and derivation criterion to all the child instances created from that model. The mechanism automatically opens and releases a new child object revision for specification that is changed for changes that do not require additional input or approval. If the change requires new user input or evaluation, the revision is opened and queued.

Supporting functions and processes include the following:

Derive a Specification

This function derives a new specification from an existing specification. Inputs are a target model for the new specification and a source specification. The compose event is triggered to create the new specification. An application example is a test specification derived from a product definition.

Extensions to the Invention's Base Objects

A user of the base object can independently extend base objects provided with the invention by defining a new model object that provides the content and rules for instantiation of extension specification instances. The extension model will contain those attributes that extend the base object for the user's specific needs or culture.

The user's extension specification object contains those attributes that extend the base object for the user's specific needs or culture. An icon representing the extension specification is associated with the base object. The specification window behind the icon is used for viewing and updating the extension specification.

In using this approach, users of the invention are able to augment the invention's base objects without having to resort to modifying the program source code.

Extensions to Legacy Objects or Records

Definitions of objects or records found in legacy systems can be extended using the invention to provide a specification that contains the requisite extension attributes/fields. A field in the legacy system record named "Extension Record Definition" or some similar title can be implemented to do so. The user also associates the legacy record in update views with an icon or window for exploding to the extension specification, and provides the Business Object Definition System call to invoke the object representing the extended attributes/fields for display and update.

Enterprise Explorer and Instance Editor

Figure 40A:
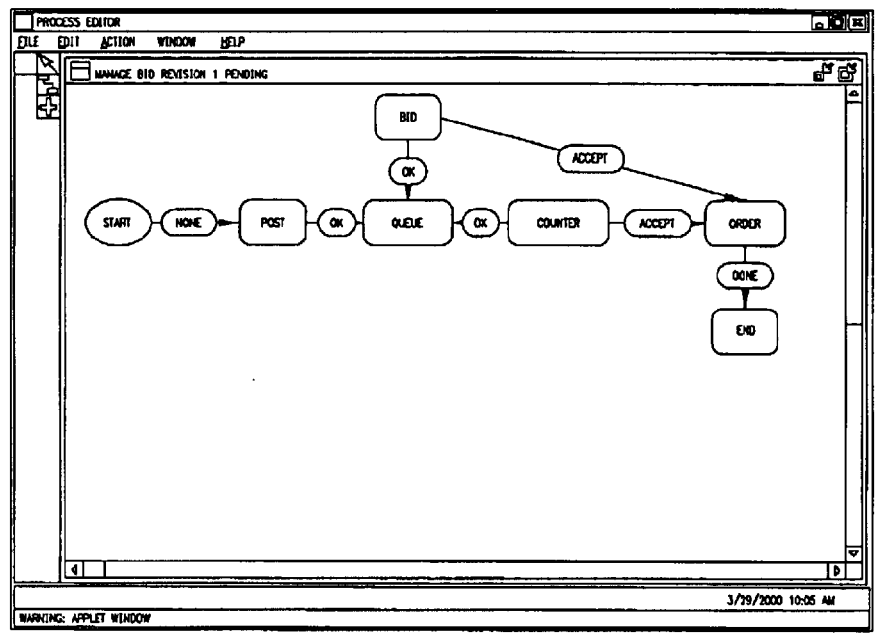
FIGS. 40A and 40B show computer monitor displays depicting examples of the use and features of the network editor of the business object definition system of FIG. 37.
Figure 40B:
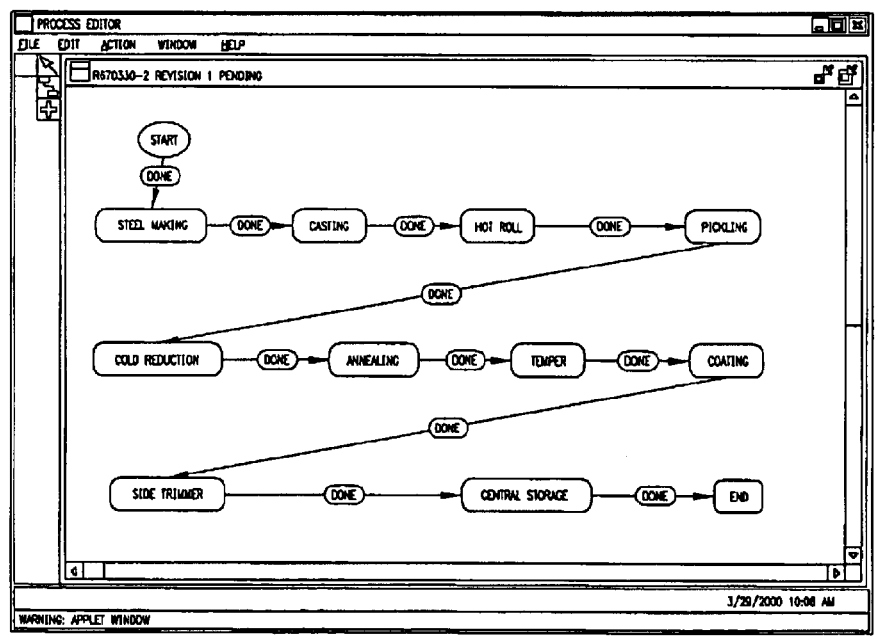

A business object definition system in accordance with the invention manages definitions as processable specifications created in an environment of shared ontologies. FIG. 37 shows a logic component diagram of one embodiment of such a business object definition system. As shown in FIG. 37, the business object definition system includes a Session Manager software component, which can call an Enterprise Explorer software component, an Instance Editor software component and a Network Editor software component. The Explorer and Instance Editor allow a user to view, add, change or delete an instance of object definition. FIGS. 38A through 38Z show exemplary uses of the Enterprise Explorer. FIGS. 39A through 39D show exemplary uses of the Instance Editor. FIGS. 40A and 40B show exemplary uses of the Network Editor. Session managers are well known in the art and therefore will not be discussed in further detail here.

The Enterprise Explorer software component allows a user to all definitional content of an object from one user interface. The user can selectively view the object's revision, composition, attributes, value refinements, classifications, network connections, renderings, or reference information. The user can execute the following revision actions against the selected component: Open, Release, Cancel, Freeze and Unfreeze. The user can also execute the following functions against the selected component: Create, Clone, Compose, Compare, Applicability Determination, Capability Assessment, Derive, Renew and Delete. A new component can be added (save) and the description can be changed (save) from this user interface.

The Network Editor serves as a tool for graphically creating and maintaining network definition. The Network Editor uses drag and drop tactics for visually organizing the network. The most common use of the Network Editor is in defining business processes and product routings. The Network Editor stores the result as ingrediential objects of the business object definition.

Queues

The Queue function permits system functions and users of the invention to suspend objects for subsequent retrieval or handling by designated individuals or work teams. Queues and queue names are configurable by users of the invention. Objects in a queue can be viewed and reprioritized. The workflow component of the invention uses the Queue to transition between activities when executing a process definition. Users use it to suspend or refer work to others.

Knowledge Representation and Search

Figure 75A:
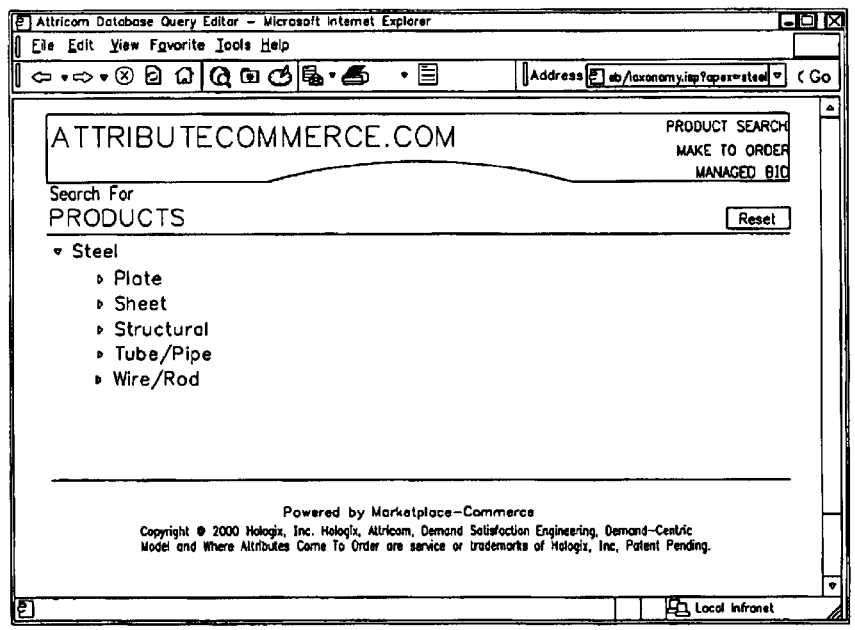
FIGS. 75A through 75C show products at different levels in a knowledge hierarchy.
Figure 75B:
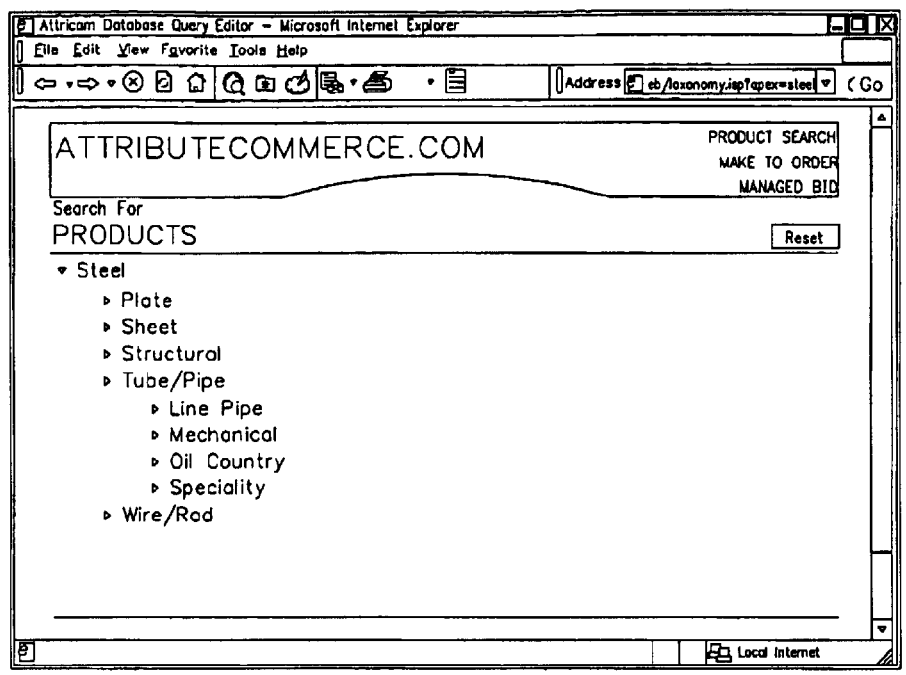
Figure 75C:
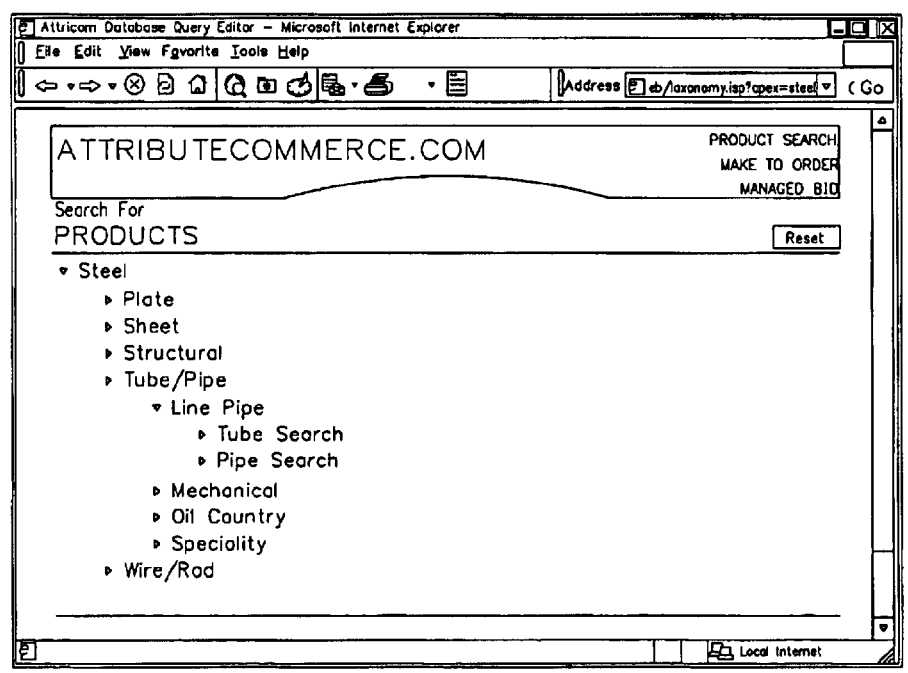
Figures 76, 77A:
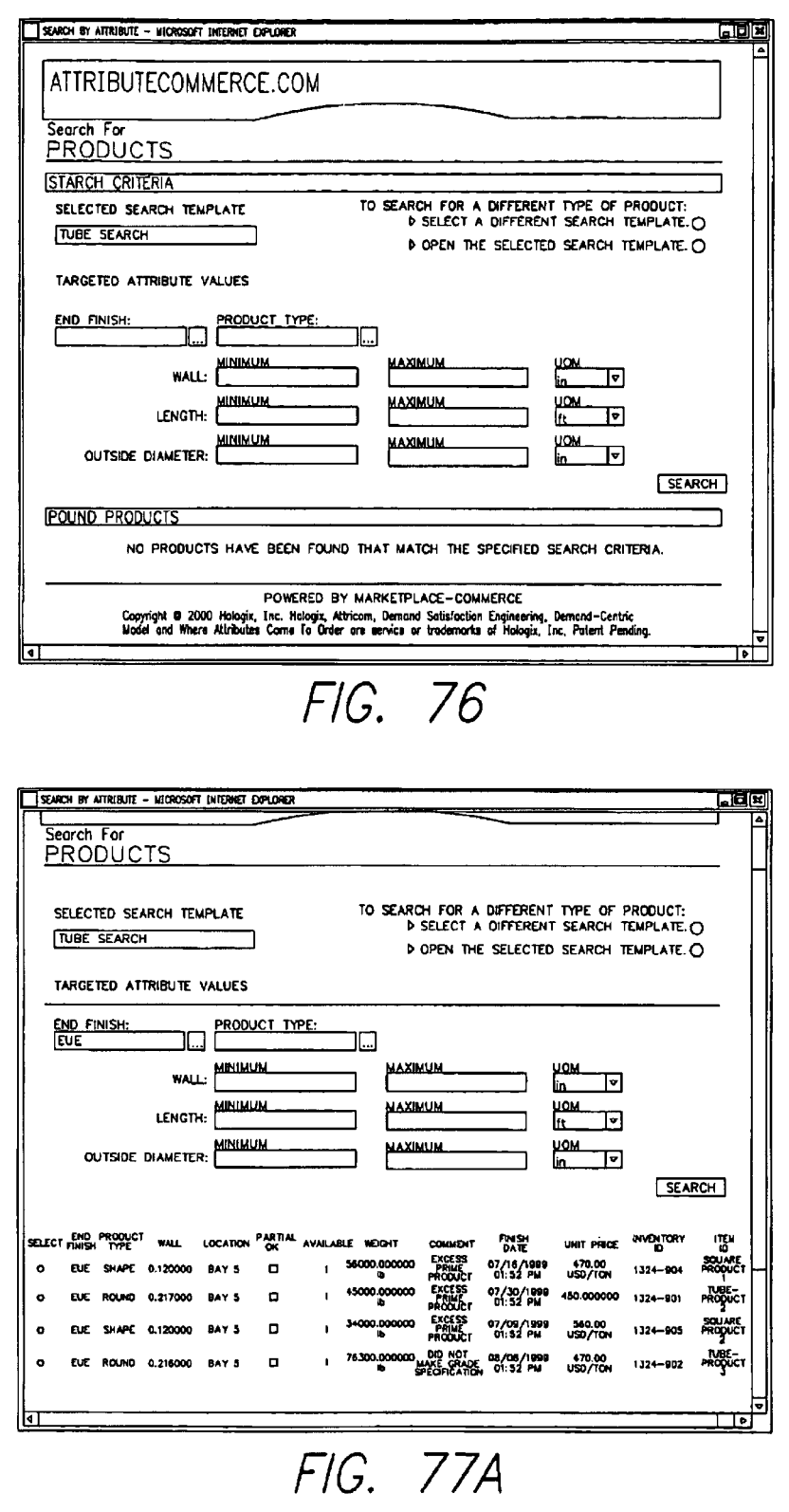

The invention allows use of ingrediential composition to create objects in a tree space of nodes representing knowledge. The usual generic name that is applied is "enterprise knowledgebase". The objects in this tree space can be traversed up and down. They can also be launched, resulting in execution or display of the launched node object. FIGS. 75A through 75C show an example of products at different levels in such a knowledge hierarchy. Some of the nodes in the example knowledge hierarchy are search objects that when launched (e.g., by double clicking with an input mouse) result in a display of a search template, such as the display shown in FIG. 76. At this point, the user may optionally change or further refine the search criteria. The result is a display of conforming objects, as shown in FIG. 77A or 77B.

Model Management

In accordance with the invention, models can be managed in a hierarchy of models. In this arrangement each model inherits content from its parent, then refines and elaborates on this content to form a more definitive model. Models contained in a hierarchy can be located by browsing or by a search that targets the model's attributes. Selection of a model source can also be the result of browsing a knowledge hierarchy to find products or other areas of interest that include nodes that execute as search templates.

Two-Party Collaboration

The invention allows two independent parties to collaborate on the same business object definitions. The invention supports Web based interaction between suppliers and customers using business object definition components and system embodiments. Business object definition components are used to support the evolutionary stages of two party collaboration, including tandem collaboration, customer collaboration and co-development collaboration. Each of these stages of collaboration is described below.

The invention's tandem collaboration functionality allows a supplier to take Internet enabled orders real-time, while a customer watches or verifies the building of the order and the product spec during customer's order entry. Historically, Customer Service Representatives (CSR's) have collaborated with customers via phone. Using the tandem collaboration functionality of the invention, a customer may simultaneously be in communication via phone and via a computer network, such as the Internet.

The next evolutionary stage in two-party collaboration supported by the present invention is customer collaboration. Customer collaboration allows customers to directly interact with the supplier's system to place orders. Using the business object definition system and method of the invention and the order management and Product Composition Systems built upon the business object definition system and method, customers can design or define new products and trace the progress of orders through the entire order management process.

The invention also supports co-development collaboration, whereby suppliers and customers co-develop and evolve new product lines, services, and markets using a Product Composition System embodiment based on the business object definition system of the invention.

Business Rules as Object Definitions

The invention provides for the definition of rules as object specifications. The rules are defined using partition contexts of Rule Behavior, Rule Situations, Business Rule Rationale, and Rule Actions.

Rules which themselves are object definitions can be attached to other objects or object definition ingredients using a drag and drop tactic. For example usability and security rules can be attached to objects; effectivity rules can be attached to ingrediential objects; transition rules can be attached to network connection ingredients; and notification rules can be attached to objects. Rules can also be typed. Examples are business policy, resource constraint, and elective option.

Object Definition/Specification Approval

Some object specifications require approval as a matter of configured policy. The requirement to evaluate and/or approve a product/specification takes the form of a Demand on the object. The business process assigned to the Demand takes the form of a process specification managed by the invention. The approval process is executed as a workflow. The approval process allows those user(s) on the appropriate approval list to examine and/or approve a specification. Policy can dictate whether user(s) approval is required as a condition of object revision release.

Those responsible for approvals often produce evaluation notes and recommendations. Each evaluation note is stored as an ingrediential Rendering related to the target spec revision. Evaluations can be queued for review.

Process and Structure Interactions

The invention supports the modeling and viewing of process as structure. The invention also lets one look at an object's structure in terms of its process implications. The schema that supports this interaction of process and structure is contained in "composition ingredient". It is labeled as "resource partition" and comes into play in the definition of a process step specification. FIG. 41 shows the linking of process steps to their specification detail. FIG. 41 also shows how partition context associations lead to the retrieval and applied views of parameters, drawings, input material, etc. needed by a process step.

Invention Schema

The fundamental schema for the preferred embodiment of the invention is as follows:

Object Registration Identifier
  Name/Description
  Object Lifecycle State
Object Revision
  Revision Status
  Revision Lifecycle State
  Revision Author
  Revision Content Owner
Ascribed Locale
  Various Dates
Object Definition Content
  Attributes applying to all forms of Ingrediential Content
  Context Staging:
    Context Partition
    Ingredient Occurrence Instance
    Ingredient Occurrence Instance Alternate
    Partition Context Presentation Sequence
    Ingredient Content Audience Owner
    Locale
  Effectivity:
    Ingredient Object Revision
    Target Object Beginning Effectivity Revision
    Target Object Ending Effectivity Revision
    Ingredient Object Effectivity Rule
    Ingredient Content Owner
    Locale
    Ingredient Correlation Model
    Ingredient Source Specification
  Characterization
    Ingredient Role
    Minimum Value
    Nominal Value
    Maximum Value
    Capture UOM
  Stored UOM
  Ingrediential Elements (a.k.a. Attributes)
    Ingrediential Content Attributes
  Ingrediential Process Composition
    Ingrediential Content Attributes
    Duration
    Resource Partition
  Ingrediential Object Networking
    Selected Ingrediential Content Attributes
    From Object
    From Object Occurrence Instance
    Event
    From Object
    From Object Occurrence Instance
    Business Rule(s)
    Connection Mode
  Ingrediential Renderings
    Ingredient Composition Attributes
    Author
    Format
    Uniform Resource Locator
    Rendering Blob
  Ingrediential References
    Selected Ingrediential Content Attributes
    Reference Value
    Reference Partition
    Reference Owner
    Reference Value Revision
    Reference Value Role
    Reference Target Object ID
    Beginning Target Object Revision
    Ending Target Object Revision
    Reference Status
    Reference Object's Vault Location
    Reference Evaluation Demand ID
Object Demand
  Demand Identifier
  Supplier
  Supplier Agent
  Consumer
  Broker
  Bill Payer
  Various Beginning Dates
  Various Ending Dates
  Demand Initiating Location
  Demand Ending Locations
  Broker Currency and Amounts
  Supplier Currency and Amounts
  Consumer Currency and Amounts
  Demand Process & Revision
  Demanded Item
  Exchange Item
  Supplier Next Release Quantity
  Consumer Item Quantity
Object Deliverable
  Deliverable Item
  Deliverable Supplier
  Deliverable Transfer Agent
  Deliverable Consumer
  Deliverable Release Location
  Deliverable Channel
  Deliverable Completion Location
  Deliverable Release Date and Time
  Deliverable Completion Date and Time
  Deliverable Quantity and UOM by Supplier
  Deliverable Quantity and UOM by Broker
  Deliverable Quantity and UOM by Customer
  Deliverable Amount and UOM by Supplier
  Deliverable Amount and UOM by Broker
  Deliverable Amount and UOM by Customer
  Various Dates
Object Tracking Unit (a.k.a. Job)
  Job Item
  Job Supplier
  Job Transfer Agent
  Job Consumer
  Job Release Location
  Job Current Location
  Job Completion Location
  Job Release Date and Time
  Job Completion Date and Time
  Job Quantity and UOM
  Job Amount and UOM Object Queue
    Queue Name
    Queue Location
    Queue Work Team
    Designated Individual
    Queued Object
    Queued Object Category
    Queue In Date and Time
    Queue Priority
    De-queue Date and Time
    Queue Object Source
Object Rules
    Rules are captured and applied using the BODS Object Definition/Specification capability.
Other Schema
    Additional Attribution of the above object classes can be ascertained from the description herein of the invention.

Implementation of the Preferred System Environment

Figure 29:
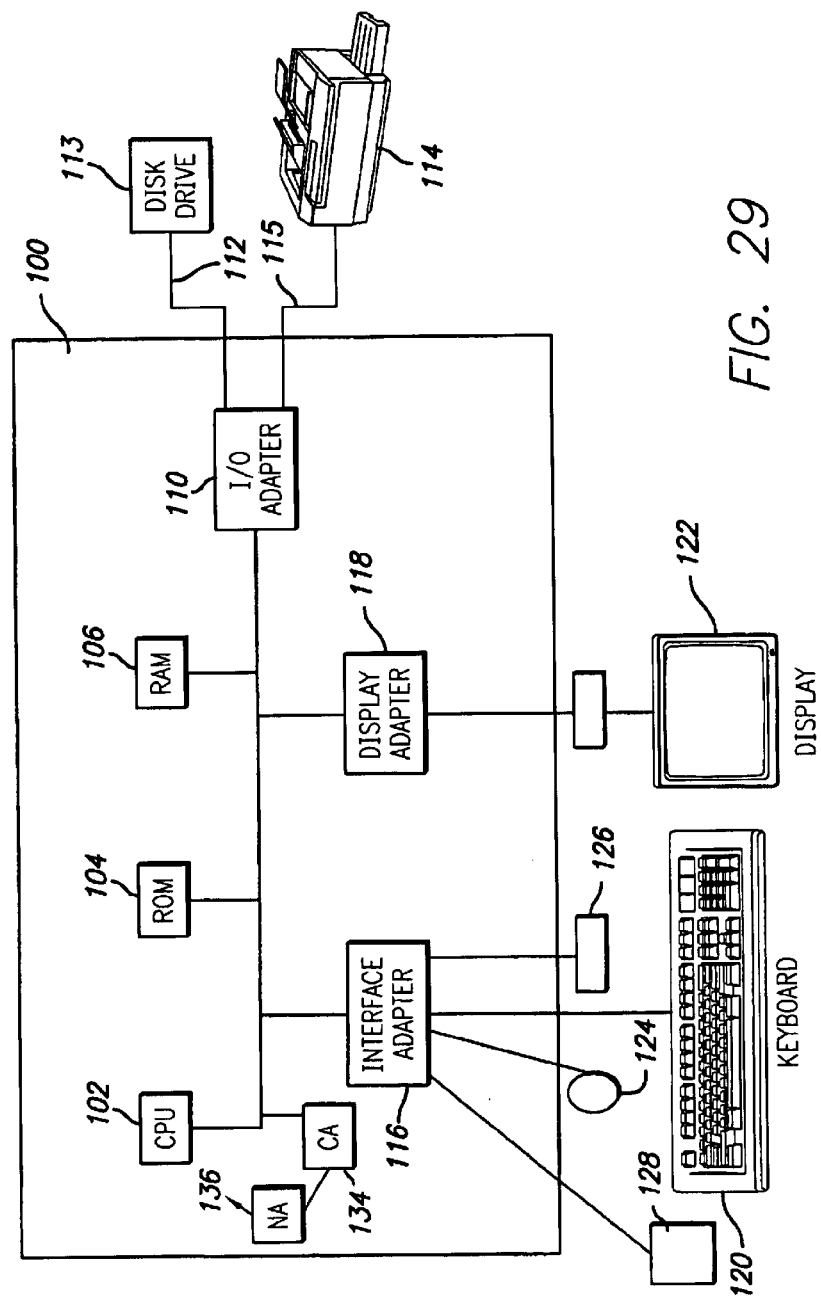
FIG. 29 is a block diagram of a computer workstation environment in which the present invention may be practiced.

FIG. 29 illustrate a typical configuration for a computer system 100 that can be utilized to practice the subject invention. The invention is preferably practiced in the context of a suitable operating system resident on a workstation or desktop computer, such as a SUN, IBM, PS/2, or Apple, Macintosh, computer. FIG. 29 depicts a representative hardware environment. The computer 100 is controlled by a central processing unit 102 (which may be a conventional microprocessor). A number of other units, all interconnected via a system bus 108, are provided to accomplish specific tasks. Although a particular computer may only have some of the units illustrated in FIG. 29, or may have additional components not shown, most computers will include at least the units shown.

Specifically, computer system 100 shown in FIG. 29 includes a random access memory (RAM) 106 for temporary storage of information, a read only memory (ROM) 104 for permanent storage of the computers configuration and basic operating commands and an input/output (I/O) adapter 110 for connecting peripheral devices such as a disk drive unit 113 and printer 114 to the bus 108, via cables 112 and 115, respectively. A user interface adapter 116 is also provided for connecting input devices, such as a keyboard 120, and other known interface devices including a microphone 124, a mouse 126 and a speaker 128, to the bus 108. Visual output is provided by a display device 122, such as a video monitor, which is connected via display adapter 118 to bus 108. Lastly, a communications adapter 134, connected to bus 108, provides access to a communication medium 136, such as an intranet or the Internet.

A preferred embodiment of the present invention will now be discussed with reference to FIGS. 30 through 36. In the preferred embodiment, the present invention is implemented as more than one computer software program. These programs will be used where software applications retrieve data in response to a user's request, optionally perform some type of processing on the retrieved data, and format the data that is to be returned to the user for display. Preferably, the programs are implemented as stand-alone code. The programs will typically execute on a computer functioning as a server, providing services in response to requests from a client using a Web browser connected to the Internet. Alternatively, the connection may be to a corporate intranet (that is, a network owned or managed internally to the user's company) of which the user's computer is a component, where this corporate intranet provides services in a similar manner to the Internet. Use of the term "Internet" herein, when discussing processing associated with the user's request, includes processing that occurs in an intranet, unless otherwise stated.

Software programming code that embodies the present invention is typically accessed by the microprocessor of the workstation from long-term storage media of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory, and accessed by the microprocessor using the bus. The techniques and methods for embodying software programming code in memory, on physical media, and/or distributing software code via networks are well known and will not be further discussed herein.

Figure 30:
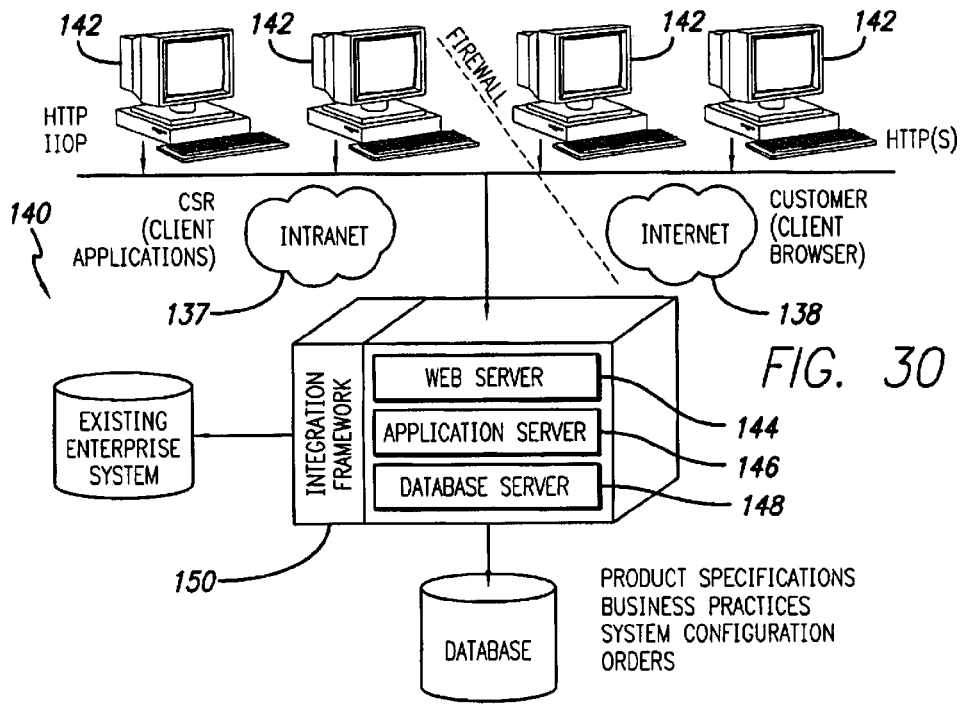
FIG. 30 is a block diagram of a networked computing environment in which the present invention may be practiced.
Figure 31:
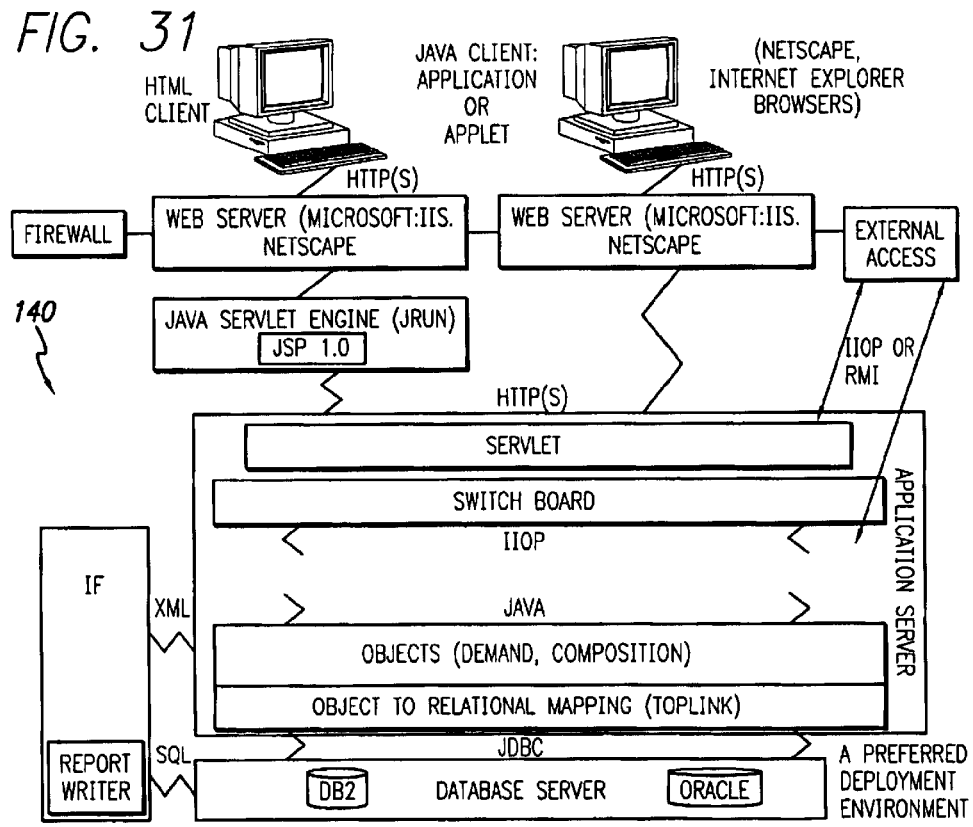
FIG. 31 is a block diagram of a preferred deployment environment in which the present invention may be practiced.

FIGS. 30 and 31 illustrate a client-server model for processing a user's search request. The client software, referred to herein as a browser, resides on the user's client computer, and allows the user to create a search request and send that request into the Internet for processing. The search request reaches a server capable of fulfilling the search request. The manner in which the appropriate server is located, and the manner in which the search request reaches it, are well known in the art and will not be discussed in detail herein. The servers pertinent to the present invention have one or more "servlets" running on the server machine. A servlet is a program typically written in the Java object-oriented programming language. (Java is a trademark of Sun Microsystems, Inc.) A servlet is created in a way that allows it to be easily added to the code already running on a server, and is intended to extend the functionality provided by the server. A servlet typically implements code to perform a specific task, such as retrieving information from a particular type of database.

The client computer 142 again has client software, the browser, installed that allows the user to create a search request and send that request into the Internet for processing. The search request again reaches a server capable of fulfilling the search request, and there are servlets running on the server machine.

In a preferred embodiment, the invention is implemented in the Java programming language, relying substantially on its object-oriented programming techniques. Java is a compiled language, that is, Java based programs are typically written in a human-readable script which script is eventually provided as input to another program called a compiler. The compiler generates a byte code version of the script that can be loaded into, and directly executed by, any computer that contains a Java virtual machine. Java objects are compiled to class files that include bytecodes representative of the original source code program with references to methods and instance variables of the Java objects. The bytecodes are not specific to particular machines or operating systems and don't have to be recompiled or rearranged to run on different hardware/software platforms. Rather, the bytecodes can be run in the Java Virtual Machine or passed to a (JIT) compiler that converts them into native code for a target platform on the fly.

This means that the original Java application or applet bytecode, which isn't specific or native to any one hardware platform or architecture, can be run without recompilation on any hardware or software platform that has a Java Run-Time Environment. In other words, a Java program's native architecture is the Java VM which is or will soon be available in both software and hardware implementations, making Java applications and applets multi-platform capable as long as the target system is Java enabled. As described below, the Java language has certain characteristics which allow a software developer to easily use and reuse programs written by himself or others while still providing a reason for reuse of programs or portions of programs to prevent their destruction or improper use.

Sun's Java language has emerged as an industry-recognized language, not only for "programming the Internet, but also as . . . a serious programming language capable of tackling the most sophisticated business applications." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animation, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution."

Another technology that has function and capability similar to Java is provided by Microsoft and its ActiveX technology, to give developers and Web designers the wherewithal to build dynamic content for the Internet and personal computers. ActiveX runs only the so-called Wintel platform (a combination of a version of Windows and an Intel microprocessor), as contrasted with Java which is a compile once, run anywhere language.

ActiveX includes tools for developing animation, 3-D virtual reality, video and other multimedia content. The tools use Internet standards, work on multiple platforms, and are being supported by over one hundred companies. The group's building blocks are called ActiveX Controls, small, fast components that enable developers to embed parts of software in HTML pages. ActiveX Controls work with a variety of programming languages including Microsoft's Visual C++, Borland's Delphi, Microsoft's Visual Basic programming system and, in the future, Microsoft's development tool for Java, code named "Jakarta." ActiveX Technologies also includes ActiveX Server Framework, allowing developers to create server applications. One of ordinary skill in the art will readily recognize that ActiveX and ActiveX components could be substituted for Java and its components as their use is described herein without undue experimentation to practice the invention.

Further explanation of the Java programming language, its characteristics and advantages is not deemed necessary. Java is now well known and many articles and texts are available which describe the language in great detail. In addition, compilers and development kits are commercially available from several vendors including SunSoft Inc., Borland International, Inc. and Microsoft Corporation. Accordingly, for reasons of brevity and clarity, additional details of the Java language and the operation of the Run-Time Environment or the JIT compilers will not be discussed further in herein since this information can be readily obtained elsewhere. One appropriate source can be found in Gosling, Joy & Steele, The Java Language Specification (1996), the disclosure of which is hereby incorporated by reference. Another source for Java VM information is Sun Microsystems' Java Virtual Machine Specification, Release 1.0 Beta DRAFT (Aug. 21, 1995), the disclosure of which is also hereby incorporated by reference.

A Java application or applet can be run on one or more hardware/software platform combinations. The applets can be obtained, along with the static information (text and/or graphics) of the Web page they are resident on, by either an ordinary Web browser or one that is Java enabled. If the applet is obtained by a non-Java enabled browser, it is passed to the Java Run-Time Environment where the applet code is compiled into Java bytecode class files. The bytecode is then checked for security purposes by the bytecode verifier and then run on the Java VM by the bytecode interpreter to yield Java derived code that can be input to the optional JIT compiler via connection for conversion to platform native code.

Java source is compiled into bytecodes in an intermediate form instead of machine code (like C, C++, Fortran, etc.) to enable and facilitate portability. The bytecodes execute on any machine with a bytecode interpreter. Thus, Java applets and applications can and do run on a variety of client machines. Further, since the bytecodes are compact and designed to transmit efficiently over a network, Java enhances a preferred embodiment with universal clients and server-centric policies.

The output of the JIT compiler is passed to a target platform. The target platform could be, for example, a Windows combination, a Macintosh System 7/PowerPC combination or a Unix/RISC combination. If the Operating System (OS) of the target platform is Java enabled, that is, if it includes its own Java Run-Time environment, then the Environment the target platform avoiding the Java JIT compiler whose services would not be needed.

Alternatively, if an applet is obtained by a Java-enabled browser (such as Sun's HotJava, Netscape's Navigator 3.0 or Microsoft's Internet Explorer 3.0) which includes and has already installed the Java Run-Time Environment on the computer where it resides, there is no need to utilize the separate Environment. Applets so captured are passed through by the Java enabled browser to the Java Environment, where such applets are handled as described above. Lastly, stand-alone Java applications are passed directly to the Java Environment where they are handled and processed in a similar manner to the Java applets. The Java applications do not need to be obtained nor do they work in conjunction with a browser. However, if a Java enabled browser is loaded on the developer's hardware, as is probable, a Java application can be passed directly to the browser and handled in the same manner as an applet would have been.

Figure 32:
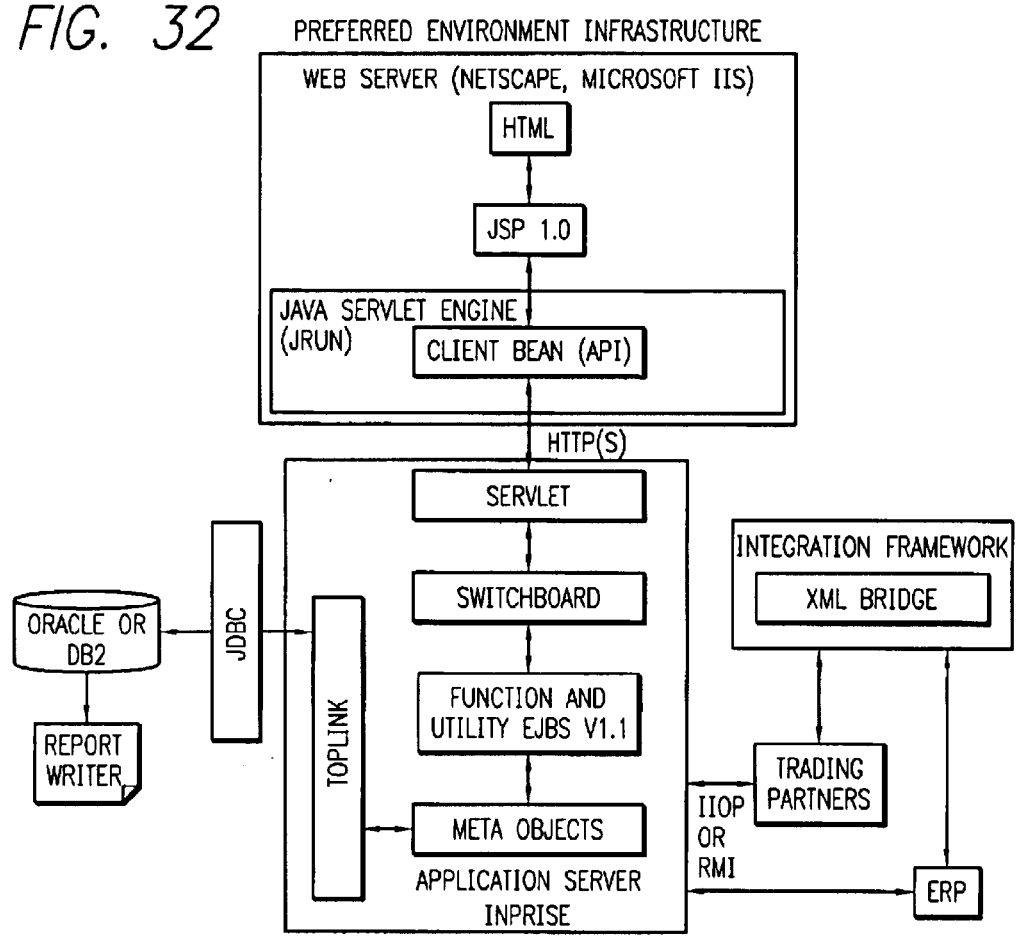
FIG. 32 is another block diagram of a preferred deployment environment in which the present invention may be practiced.
Figure 33:
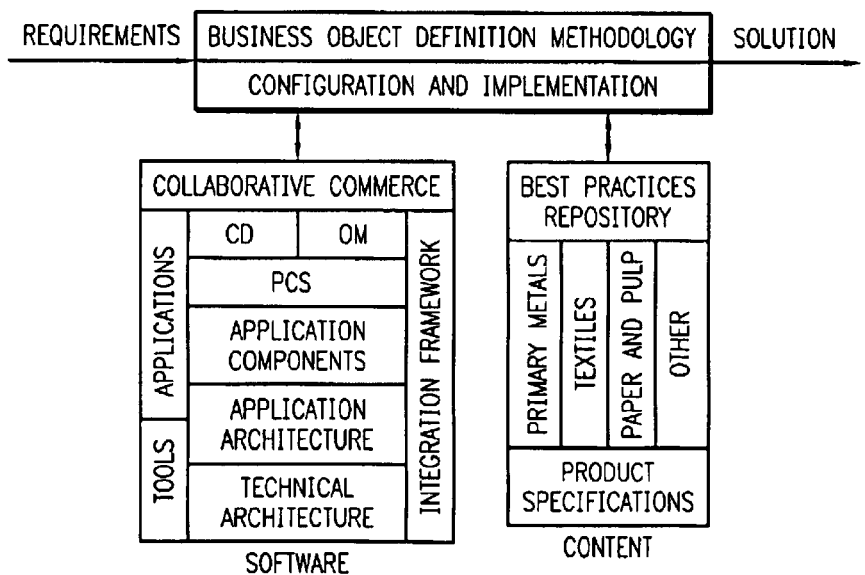
FIG. 33 is a block diagram depicting the software architecture and content of an exemplary embodiment of a business software system that has been implemented using the business object management system in accordance with the invention.
Figure 34:
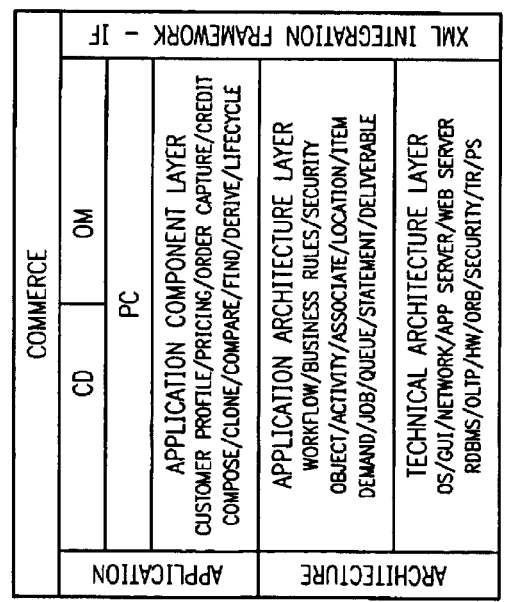
FIG. 34 is a block diagram showing in more detail the software architecture layers of the system of FIG. 33.
Figure 35:
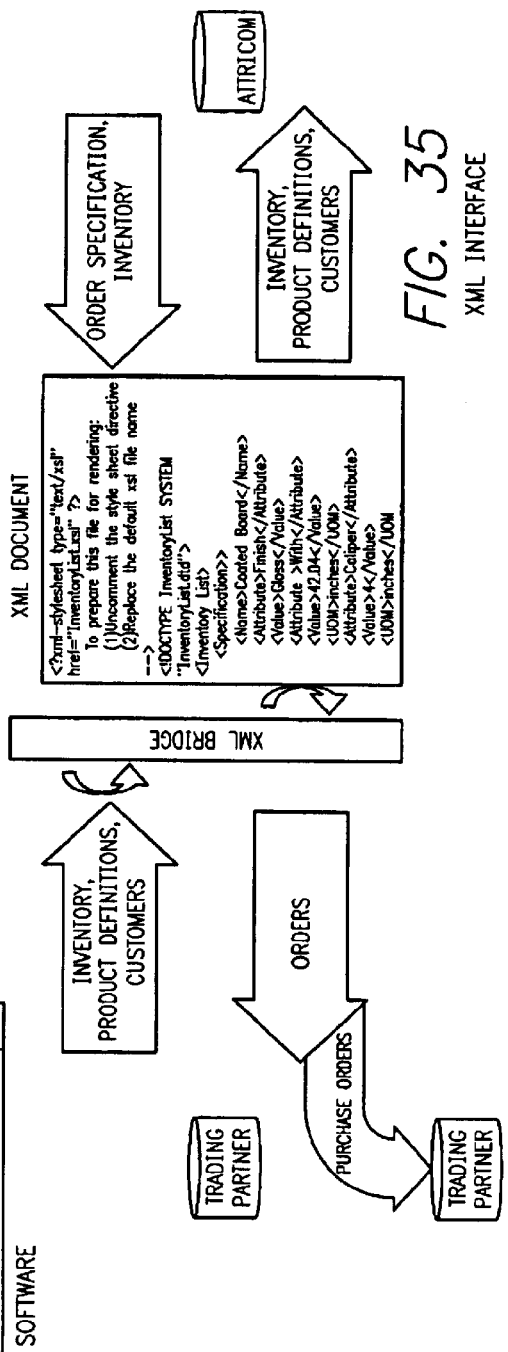
FIG. 35 depicts how an integration framework can be used to provide an interface between the business object definition system (Attricom) and trading partner databases.

FIG. 30 is a block diagram of a networked computing environment in which the present invention may be practiced. FIGS. 31 and 32 show a preferred deployment environment for an exemplary embodiment of a business software system that has been implemented in the networked computing environment of FIG. 30 in accordance with the invention. FIG. 33 is a block diagram depicting the software architecture and content of the business software system. FIG. 34 is a block diagram showing the software architecture layers of the system of FIG. 33 in more detail.

Referring to FIGS. 30 and 31, a data processing network 140 includes a plurality of client computers 142 that are configured to communicate with a web server 144 via the communications medium 136, such as an intranet 137 or the Internet 138. The network also includes an application server 146 and a database server 148. Each of the web server 144, the application server 146 and the database server 148 can exchange data with an existing enterprise system 148 through an integration framework 150.

Preferably, each of the client computers 142 can support stand-alone applications with or without a supported browser. Each of the client computers 142 has resident thereon and its basic operations are controlled and coordinated by operating system software such as the SUN Solaris, Windows/95, Windows NT or the Java OS operating system. In a preferred configuration, the Windows NT operating system is used. As shown in FIG. 30, the client computer 142 can be provided with the Java run time environment and an optional Just-In-Time (JIT) Java compiler. Java 1.1.8. The client computer 142 also has resident thereon a browser, such as Microsoft Corporation's Internet Explorer browser or Netscape Corporation's Communicator browser.

The web server computer 144 has resident thereon and its basic operations are controlled and coordinated by an operating system software such as the SUN Solaris, Windows/95, Windows NT or the Java OS operating system. In a preferred configuration, the Windows NT operating system is used. The web server computer 144 also has resident thereon: Netscape: Enterprise Server v3.6. Microsoft: Internet Information Server v4.0: IBM HTTP Server v2.0 powered by Apache v1.3.3: Firewall: HTTP(s) protocol support; UDP protocol support (needed for collaboration). IBM WebSphere 2.0 Standard Edition or LiveSoftware JRun Pro 23. Internet Information Server (IIS). Microsoft Corporation's Web server that runs on Windows NT platforms. Java servlet engine (Jrun)

The application server computer 146 has resident thereon and its basic operations are controlled and coordinated by an operating system software such as the SUN Solaris, Windows/95, Windows NT or the Java OS operating system. In one suitable configuration, the Windows NT operating system or the Sun Solaris operating system is used. The application server computer 146 also has resident thereon the following software: Java version 1.1.7; Inprise application server with Visibroker version 3.3 object request broker for Java, marketed by Inprise Corporation of Scotts Valley, Calif.; and Tibco version 4.1.3 marketed by Tibco Software, Inc. of Palo Alto, Calif. In another suitable configuration, the application server computer 146 has resident thereon the following software: Sun Solaris Application Server 2.6; Windows NT Application Server 4.0 SP4; and Java 1.1.8. Object-to-relational mapping is provided by middleware, such as Toplinks, which maps between the object definition and relational view. The system of FIGS. 31 and 32 is a message-based system where a single client can communicate to any number of server side components. The switchboard acts as a classic switchboard operator. When a message is sent to it, it routes the message to the appropriate component, and then sends the response back to the initiating client.

The database server computer 146 has resident thereon and its basic operations are controlled and coordinated by an operating system software such as the SUN Solaris, Windows/95, Windows NT or the Java OS operating system. In one suitable embodiment, the database server computer 146 includes an x86, Pentium II, 450 MHz dual processor with 256 megabytes memory and 6 gigabytes of hard disk space, with the Windows NT version 4.0 (service pack level 4) operating system. In another suitable embodiment, the database server computer 146 includes a Sun SPARC 366 MHz single processor, with 256 megabytes of memory per processor, 9 GB hard disk space, and Solaris version 2.6 with a Y2K patch. The database server computer 146 also is configured with a SQL relational database system (RDBMS) for creating and maintaining the database. Suitable RDBMSs include DB2 version 5.2 offered by IBM Corporation and Oracle version 8.0 offered by Oracle Corporation.

Those skilled in the art will recognize that there a many suitable computer configurations that will provide the functionality of the Web server computer, the application server computer and the database server computer. This functionality may be distributed over a different number of suitable computers. For example, the application server computer and database server computer may be the same computer.

Integration Framework

As shown in FIG. 30, the preferred deployment environment includes an integration framework for providing an interface between the business object definition system of the invention and existing enterprise applications. FIGS. 31 and 32 show the relationship of the integration framework to the preferred system environment in more detail. The integration framework enables the business object definition system to receive and distribute data to create a seamless gateway between the business object definition system and existing enterprise systems. Implementing an application using the business object definition system is simplified with the integration framework. There is no need to replace enterprise applications or to perform duplicate data entry into the business object definition system. Once configured, the integration framework provides a flexible connection between the business object definition system and the user's existing enterprise applications.

In a preferred embodiment, the integration framework facilitates data transfer using XML gateways. An inbound XML gateway receives XML text and stores the information in the business object definition system. For example, inbound gateways can receive product, process and customer information required by the Business Object Definition System for order processing and management. An outbound XML gateway distributes XML text for export to existing enterprise applications. Order, product, process and customer data collected and created by the Business Object Definition System is distributed by outbound gateways to existing enterprise applications. This process of data transfer is transparent to the user and business systems One integration framework suitable for use with the Business Object Definition System is described below. The executable code for implementing this integration framework is available from Hologix, Inc. of Phoenix, Arizona. XML describes a class of data objects called XML documents and partially describes the behavior of programs that process these objects. XML is a subset, or restricted form, of SGML (the Standard Generalized Markup Language-ISO 8879). XML provides a number of advantages over HTML. While HTML describes how the data should look, XML also describes what it means. Consequently, a browser can obtain and render information from XML as product, model, dealer, etc without going back to the server. With XML, the user can create his or her own tags allowing customer-side applications to access data sources anywhere on the World Wide Web, in any format.

The integration framework uses the XML format that consists of an XML content document and its describing schema, the Document Type Definition (DTD). The implemented application reads and produces DTD conformant XML files in accordance with its controlling DTD. Having the XML document and its DTD results in a self-describing data transfer system. XML files may be DTD conformant or "well-formed". XML browsers are set up to handle both types of documents based on the presence of a DOCTYPE specification at the beginning of the XML file to identify the name and location of a DTD, such as <!DOCTYPE Order PUBLIC 'Order' "Order.dtd">.

During the transfer, data is automatically validated. XML is validated against a document type definition (DTD) document. Then, during the import process, data dependencies are checked as data is imported into the business object definition system.

The integration framework is based on the open standards protocol defined by the World Wide Web consortia. Adherence to this standard allows applications built on the business object definition system to be shared with any organization supporting the same gateway.

The XML Bridge provides the ability to easily create interface programs that utilize XML. The executable programs can be created for many scenarios, just as long as a flat file output and DTD record layout is available. This provides user with the ability to adopt a common approach to solving many migration, web enablement and general integration issues.

The XML Bridge automates the creation of bidirectional mapping between a fixed record flat file and a DTD conformant XML file. A DTD is updated, used as input for the collection/generation process to generate the XTBuilder Cobol Program, which is then compiled into an executable module on the target platform. The DTD defines the rules, elements and order of elements for the XML documents built. The XML File is DTD conformant and HTML renderable for existing browsers.

Figure 36:
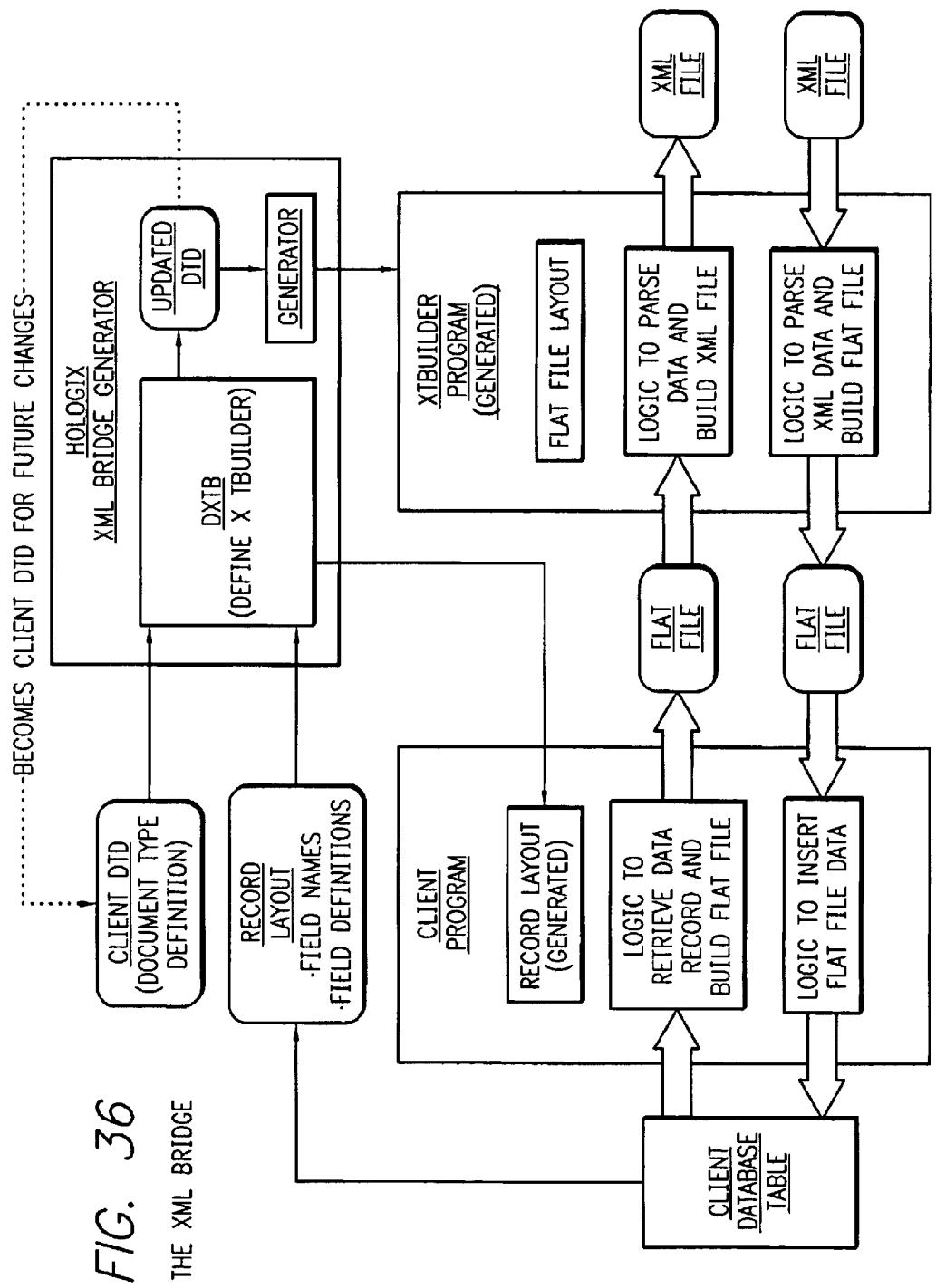
FIG. 36 is a block diagram showing the components of the integration framework.

As shown in FIG. 36, the XML bridge provides bidirectional mapping between a fixed record flat file and a DTD conformant XML file. A DTD (Document Type Definition) is updated with the attributes required to generate a record layout (format type, length, maximum occurrences, etc). This updated DTD is input to a collection/generation process which generates a Cobol program. The Cobol program is then compiled into an executable module on the target platform (such as Windows NT/95/9, Unix or Mainframe.)

The DTD defines the rules for how XML documents are built very similar in nature to an IMS DBD or DB2 DDL specification. The DTD defines the elements and order in which they must appear in the XML document, very similar to a relation layout. DTD attribute syntax (<!ATTRLIST) is used to add the field attributes required to generate a record layout and the mapping program XTBuilder.
Numeric editing characters inserted for numericfields
An example of a customer DTD is as follows:
 <!--Customer.dtd <?xml version='1.0'?>
 ************************************************
 *CustomerList DTD from WSC
 *
 *******************************************<?xml-stylesheet type="text/xsl"href="InventoryList.xsl"?>
 -->
 <!ENTITY %Address SYSTEM "Address.dtd">
 %Address;
 <!ELEMENT Customer (CustomerNumber,
 Name,
 Address,
 Phone*)>
 <!ELEMENT CustomerNumber (#PCDATA)>
 <!ELEMENT Name (#PCDATA)>
 <!ELEMENT Phone (#PCDATA)>
An example of a customer XML file is as follows:
 <Customer>
 <CustomerNumber>1000 </CustomerNumber>
 <Name>Joseph Smith </Name>
 <Address>
 <AddressLine1>1722 E.Ocotillo </AddressLine1>
 <AddressLine2>1515 E.Villa Rita Dr.</AddressLine2>
 <City>Phoenix </City>
 <State>AZ </State>
 <PostalCode>85022 </PostalCode>
 <Country>USA (602)48 </Country>
 </Address>
 <Phone>(602)482-8553 </Phone>
 <EMail>jab@mba.com </EMail>
 </Customer>

Programs reading XML files require parsing logic. For example, to strip out imbedded decimal points and minus signs within amount fields. Programs building XML files will need to be able to supply imbedded decimal points and minus signs for signed fields with negative amounts. Programs will need to maintain element name tables to associate data with XML tags. The example below depicts a very simple XML-to-Legacy mapping. In this example, leading zeros must be added for numeric fields and the decimal point must be removed.
 XML File
 <?xml version="1.0" encoding="UTF-8"?>
 <!DOCTYPE Order PUBLIC 'Order' 'Order.dtd'>
 <Order>
 <OrderID>ORD0001</OrderID>
 <OrderAmt>15.55</OrderAmt>
 <OrderedQuantity>1</OrderedQuantity>
 <OrderedQuantityUOM>Each</OrderedQuantityUOM>
 </Order>
 Legacy File
 Order ID |Order Amtl Ord Qty |UOM|
 ORD0001|000001555|0000001|Each|

Referring to FIG. 36, program XTBUILDER is a fully executable batch program generated from the updated DTD which converts fixed record flat files to XML formatted files and vice versa. The XTBUILDER program operates in one of two modes, i.e. the inbound mode or the outbound mode. In the inbound mode, an XML file is output from the record layout file. In the outbound mode, a record layout file is output from an input XML file. The XTBUILDER program can be generated with single mode capability or double mode where the mode is determined based on a parms file. The XTBUILDER program calls a first subroutine XMBUILD to convert a record layout into XML records and second subroutine XMTRANS to convert XML records into a record layout. Each subroutine manages the XML file for input or output. The following areas are passed to the subroutines:

DTD Element Names Array—names used to generate/identify beginning and ending XML tags.

Element Mapping Array—Array of lengths, offsets, etc for mapping data between XML records and the record layout.

The Record Area Layout—The generated record layout area mapped to or mapped from the XML file.

The DTD is updated with element attribute information using the <!ATTRLIST syntax as shown below. After all of the information has been updated, a Cobol record layout is generated as well as the mapping interface program XTBuilder.

```
<!-- Address.dtd-->
<!ELEMENT Address (AddressLine1?,
AddressLine2?,
City?,
State?,
PostalCode?,
Country?)>
<!ELEMENT AddressLine1 (#PCDATA)>
<!ELEMENT AddressLine2 (#PCDATA)>
<!ELEMENT City (#PCDATA)>
<!ELEMENT State (#PCDATA)>
<IELEMENT PostalCode (#PCDATA)>
<!ELEMENT Country (#PCDATA)>
<!ATTLIST AddressLine1 !----- AddressLine 1 is a character field 25 bytes long
    Address_MAXOCCURS CDATA #FIXED "1",
    Length CDATA #FIXED "25",
    ..............................................
    ..............................................
<!ATTLIST Country
    Address_MAXOCCURS CDATA #FIXED "1",
    Length CDATA #FIXED "2",
    Format CDATA #FIXED "C">
```

The generated record layout for customer programs is as follows:

01 Address-Record-Layout.
    05 AddressLine1 Pic x(25).
    05 AddressLine2 Pic x(25).
    05 City Pic x(25).
    05 State Pic x(2).
    05 PostalCode Pic 9(5).
    05 Country Pic x(2).

The layout is always generated in display format since fields are mapped based on the starting position within the record and the display length.

Example Applications Assembled with the Business Object Definition System

The processes used to satisfy demands, particularly those that exist between buyers and sellers, can be modeled, defined and executed using dynamically definable business objects created and managed using the invention's business object definition components and methods. Examples include Customer Order, Purchase Order, Bids, Awards, Auctions, Contracts, Forecasts and many others. When applied to a specific object environment, the business object definition system will be embodied in one of its assembled application forms. A Product Composition System ("PCS") is one example of such an assembled application when the business object definition system is applied to the environment of products and specifications. Other applications include: Collaborative Design, Managed Negotiation, Engineering Data Control, Product Catalog and Process Directories, Inventory Systems, Material Pedigree Systems, Knowledgebase Management, and any Demand Management System including Purchasing and Order Management. Following are specific application embodiments in accordance with the invention. These embodiments serve to show how the invention uses business objects in the form of processable definitions to assemble innovative, highly-flexible, dynamically-extensible business applications.

Product Composition System (PCS)

A Product Composition System assembled in accordance with the invention provides users with an ability to easily and quickly define new products, dynamically define new attributes, create any required specification or definition, and formalize knowledge known only to key personnel, such as manufacturing know how and facility capabilities. The business object definition system and Product Composition System are especially suited to products and services whose definition and manufacturability depend on the ability to manage a complex set of attributes and processes.

The business object definition system provides the Product Composition System with attribute-based specification definition, composition and revision control for product models, customer product preferences, manufacturing capabilities, and operator instructions among others. The Product Composition System also provides the ability to define specific business capabilities and practices used in determining the "manufacturability" of new products answering such questions as:

Can we make it?
    Have we made it before?
    What are the limits for this design?
    Does this design support the end-use?
    Do we need an outside processor?
    What are our capabilities on this?
    What are the manufacturing limits?
    What changes did we make?

With the Product Composition System, product and manufacturing data is transformed into an integrated consistent form sharable within internal systems and disciplines as well as with external businesses and systems.

FIG. 41 depicts how the Product Composition System can be used to link specification detail to process steps.

Figure 42:
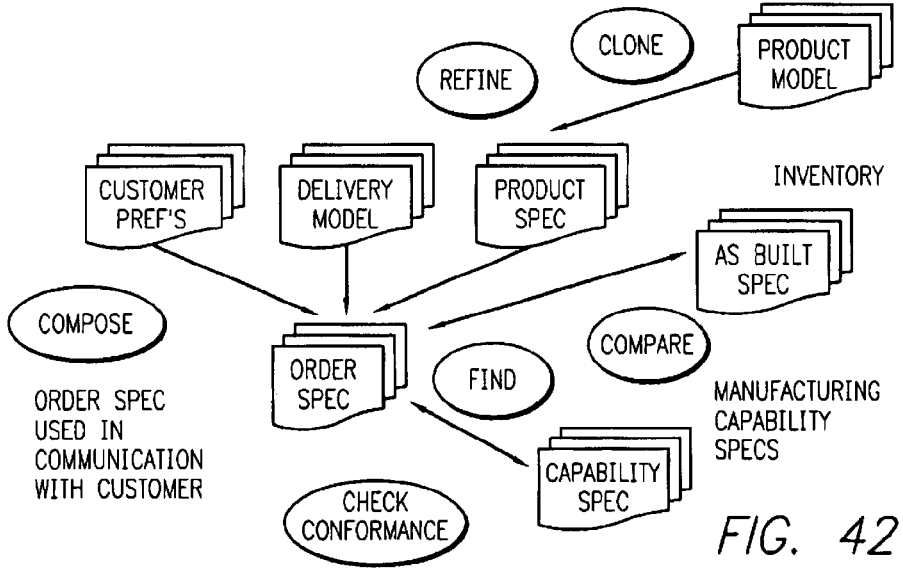
FIG. 42 shows an example of how the Product Composition System can be used to create a typical composite specification configuration.

FIG. 42 shows an example of how the Product Composition System can be used to create a typical composite specification configuration.

Figure 43:
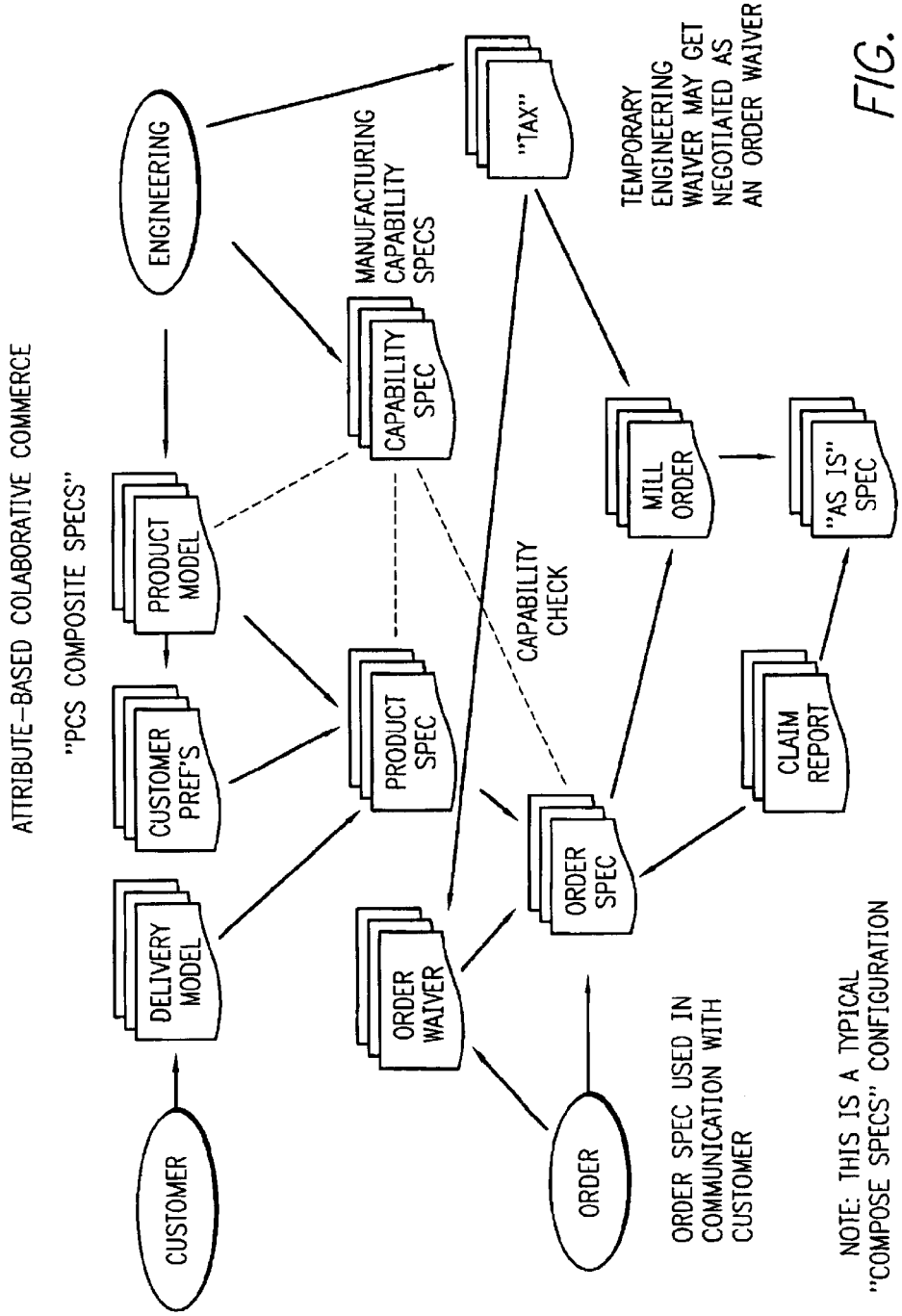
FIG. 43 depicts another example of how the Product Composition System can be used to create a typical composite specification configuration in a distribution chain environment.

FIG. 43 depicts another example of how the Product Composition System can be used to create a typical composite specification configuration in a distribution chain environment.

FIGS. 44A through 44D show rendering examples of the detail of the specifications depicted in FIG. 43.

Figure 45:
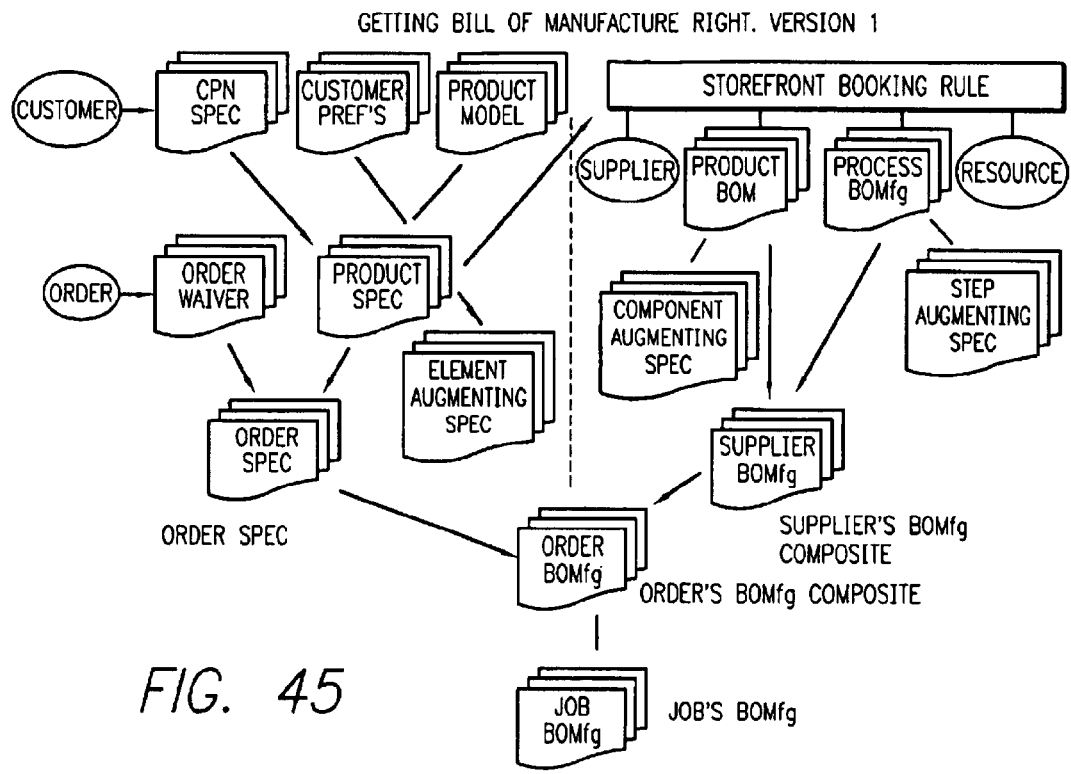
FIG. 45 shows an example of how the Product Composition System can be used to create a composite specification from an order specification and a supplier specification.

FIG. 45 shows an example of how the Product Composition System can be used to create a composite specification from an order specification and a supplier specification.

Figure 46:
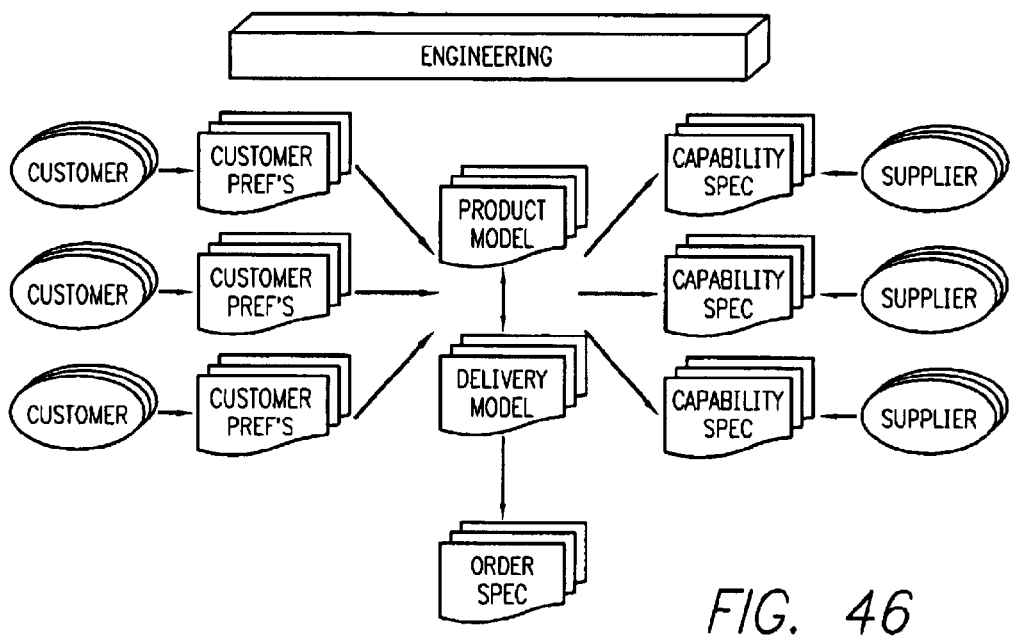
FIG. 46 shows another example of how the Product Composition System can be used to create a composite specification from an order specification and a supplier specification.

FIG. 46 shows another example of how the Product Composition System can be used to create a composite specification from an order specification and a supplier specification.

Figure 47:
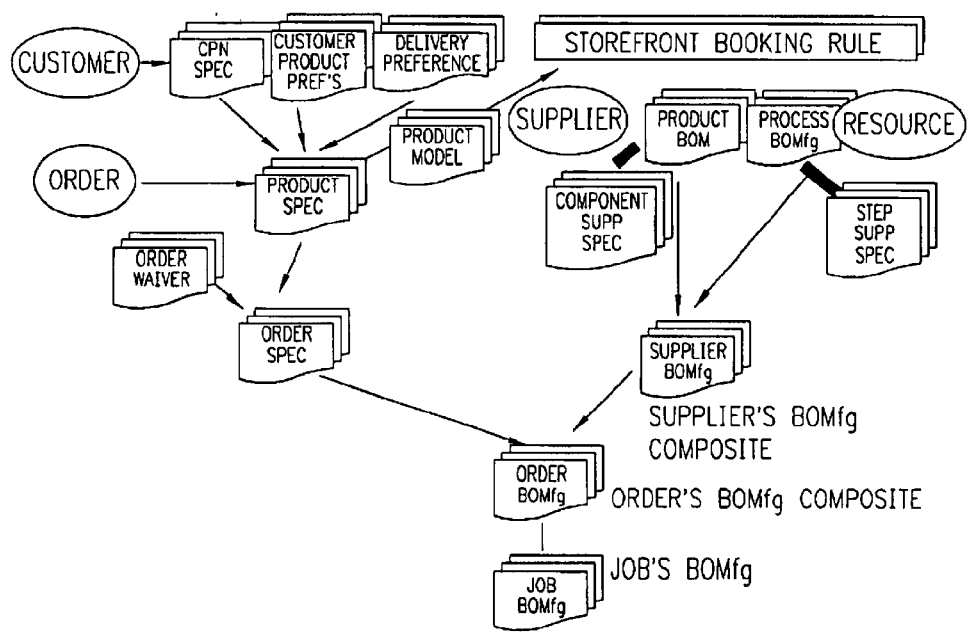
FIG. 47 depicts an example of design collaboration using the Product Composition System.
Figure 48:
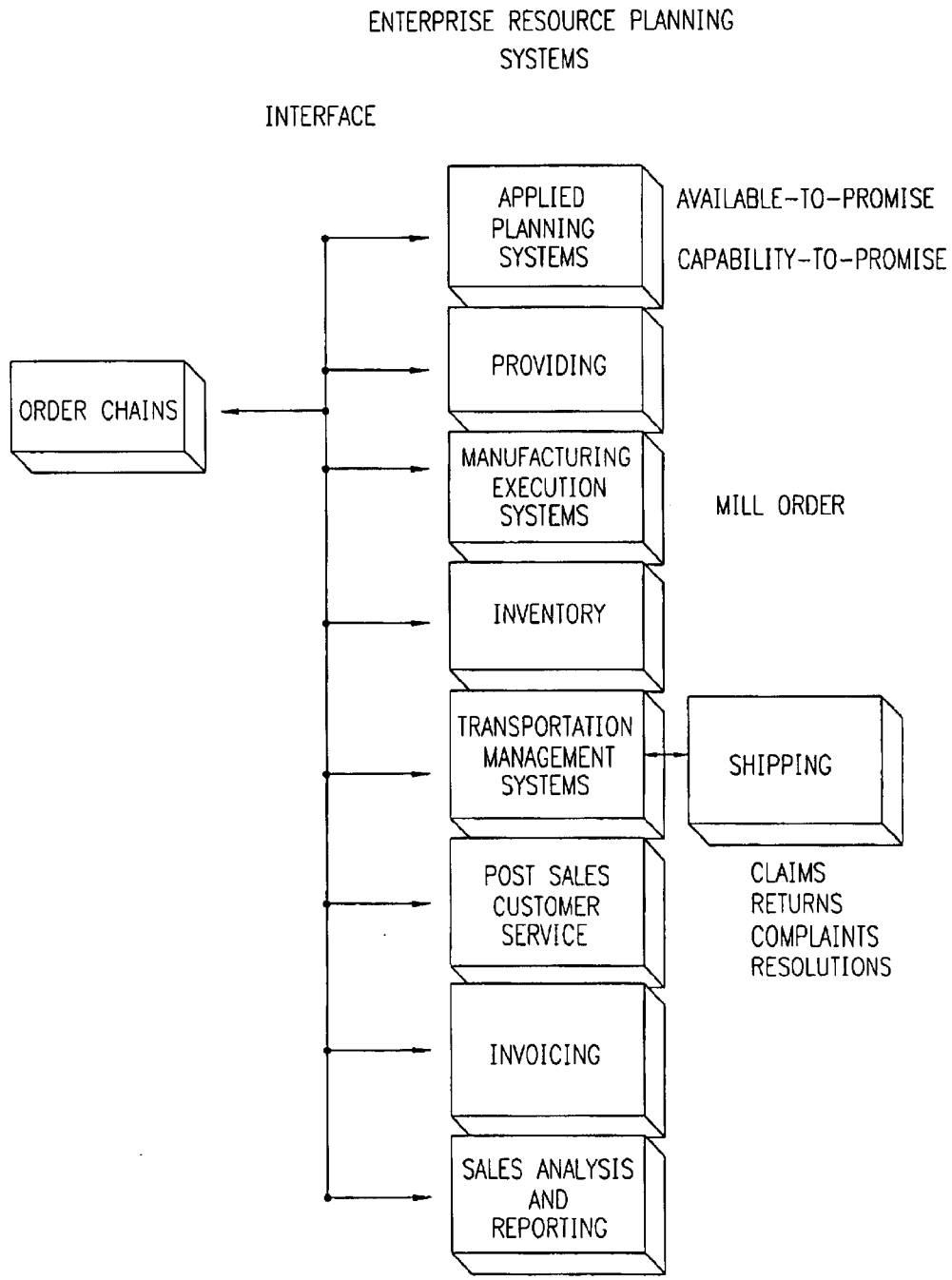
FIG. 48 is a block diagram that shows how an order management system built in accordance with the invention can interface with existing enterprise applications.
Figure 49:
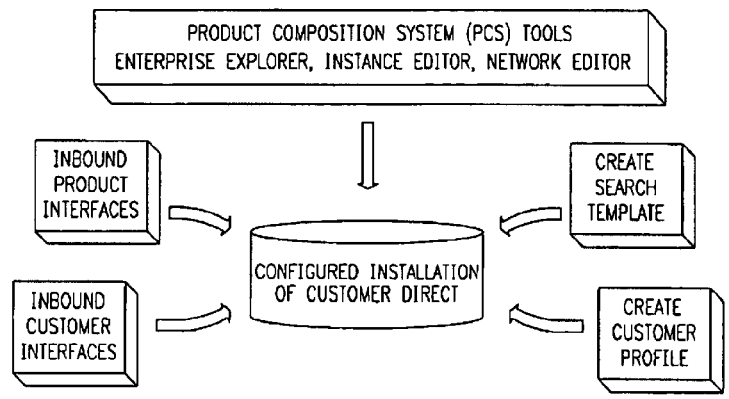
FIG. 49 depicts the setup and configuration of a customer ordering application Enterprise Knowledgebase, which allows a supplier to post its available products on the Internet and to allow its customers access to the system.

FIG. 47 depicts an example of design collaboration using the Product Composition System.

PCS Specification Models

With the Product Composition System, a user creates templates (i.e. models) for the instantiation of different types of specifications. Each template can contain the allowed content along with all the criteria and rules required to create and modify specification instances. All specifications are configurable via their model definitions. The definitions consisting of ingrediential attribute objects and relationship role objects are modeled into user-definable contextual views or logical groupings called "partitions". Partitions serve as user configurable contexts to capture and apply use. Use of the business object definition system guarantees that all specifications regardless of the type will have the same look and feel.

Base Business Object Definition System Methods Applied to PCS

The base business object definition system methods of the Product Composition System are described above. Specifically, these are as follows.

Create: Create is used to instantiate a new specification from a specification model.

Clone: Clone is used to make a new specification by copying an existing one. The rules associated with the source specification are transferred to the new specification. The pedigree of the specification, including the original parentage, is retained within the system.

Compose: Compose is used to meld multiple specifications into one new specification. It combines existing specifications to create a new specification under the control of compose, fill and augment rules.

Compare: Compare is used to compare two specifications for similarities or differences and to highlight attributes and objects that appear in one specification but not in the other.

Find: Find is used to search for specifications by a combination of attributes and their values, and/or objects and their roles in the specifications.

Derive: The Derive method is used to complete the attribution of an object acting in the capacity of an attribute by filling in its value or min, nominal, and/or max range. Usually this involves executing formulas based on conditional statements. This may be as simple as "if field 1 equals A then field 2 equals B," or may involve complex algebraic formulas. Both the conditional statements and the formulas are managed as object definitions in the form of a business object definition specification.

Capability Assessment. This method is used to compare the values of one specification against predefined knowledge including manufacturing capabilities. In the case of a product, it answers the question "Can I make this?" Capabilities take the form of basic object definition specifications.

Applicability Determination: This method determines whether a particular object is usable in a particular context.

Renew: On request, this method can update a specification's format and rules to be consistent with the latest released revision of its source parent model. This ensures consistency and integrity of specification content.

Where Used: This method lets the user enter an attribute or object and receive a list of other object specifications that contains the attribute or object. For example, the user could use this method to find all the specifications that contain the attribute "width."

Revision control: A specification can be in a single state of active, pending release, frozen, pending cancellation or cancelled. Specifications can have multiple active revisions. Revision control is an optional feature useful in maintaining the integrity of a product definition or specification release through its lifecycle.

Multi-level Compose

Multiple specifications representing models, preferences, capabilities and other chunks of knowledge can be melded together using the business object definition system Multi-level Compose method. For example, product model and delivery specifications may be combined to create a specification specific to an order line-item.

By providing the ability to combine separate specifications, the Product Composition System allows common chunks of non-redundant definition to be reused across many products or order specifications. Compose results are referred to as composite specifications.

Model Hierarchies

Models and templates used to create specifications can be maintained within a model hierarchy whose leaves are specification instances instantiated from models. Specification instances inherit content and rules from their parent model specifications. For a user, such as an engineer, this ensures that all the rules applicable to one product model apply to all of its product children.

Specification Preparation

The Basic Object Definition System components for Demand Management can be applied to the preparation and management of specifications. Typical demand management types include specification preparation request, customer specification evaluation, product vetting, engineering change proposal, engineering change order, product design and prototype build.

Specification Exchange

The Product Composition System can use the integration framework described above to exchange definitions and other forms of data with legacy and external systems.

Search Templates

Search Templates are object specifications used to find corresponding objects. Search Templates are often positioned as nodes in a knowledge hierarchy. When encountered, they can be can be executed. During execution a user can interact with the search template to refine or reset the pre-set search criteria.

Order Management System (OM) Example

An Order Management System has been constructed using the Business Object Definition System previously described. The Order Management System can provide order management capabilities for any type of product or service, especially those that fail in the category of complex, attribute-based products and complex processes. The Order Management System can function as a "make-from-inventory" as well as a "buy-from-inventory" system.

In a preferred embodiment, the Order Management System components from the Basic Object Definition System previously described, the Product Composition System previously described and the Customer Direct System described below. The Order Management System uses the Integration Framework previously described to link and collaborate with both internal and external systems.

FIG. 33 shows the Order Management System (OM) as an Internet-enabled order management system for complex, attribute-based products and business processes that are managed as business object definitions in accordance with the invention. As shown, the Order Management System includes uses the previously described Product Composition System (PCS) as one of its components. The Product Composition System component provides for the creation and manipulation of product specifications and other order-related business objects. It also makes use of prompted specification capture during order entry. The Order Management System functionality (which is founded on the Business Object Definition System functionality) includes order management, product composition, pricing, credit check, customer management, and session security.

As shown in FIGS. 33 and 34, the software architecture of the Order Management System includes a technical architecture layer, an application architecture layer, an application components layer, a Product Composition System component, an order management make-to-order component and a customer direct buy-from-inventory component.

In accordance with the invention, the Order Management System business processes are configurable. A configurable business process can control how and when an order is priced, promised, or credit reviewed. The system routes orders to appropriate personnel when human interaction is required. The entire workflow is dynamic and controlled as a process specification of Business Object Definition System previously described.

Order captured specifications can be verified against production capabilities, at the time of order entry, to answer the question "Can you make it?"

The Product Composition System component is used to collect customer-specific information on products, delivery locations and seasonal requirements. The Order Management System selects and applies customer preferences at the time of order entry, providing pre-defined defaults for product attributes appearing in the composed order specification. Pre-defined customer preferences can simplify the order entry process. Customer preferences also personalize attribute labels and provide validity checks.

Basic Components of the Order Management System

In a preferred embodiment, the Order Management System includes the following basic components and functions.

Attribute-Based Search—Products and orders can be found using the Product Composition System component given any subset of product attributes and order attributes.

Pricing and Costing—The Order Management System supports attribute-based pricing and SKU pricing.

Attribute-Based Pricing—Attribute-based prices are built up from applicable price components. Price components are business objects representing a plus or minus increment of price whose applicability depends on some pattern of product attributes. Price components appearing in a composition can be manually set or dynamically derived using a formula business object. Price components are typed as base charge, extra charge, surcharge, discount, and any other category that a user may want to configure.

Price Instruments—A composition of price components can be associated with a price instrument. Price instruments are configurable business objects that are used to manage and document prices. Typical examples include Price Authorization, Quotation, Price List, Price Book, Price Agreement, and Term Purchase Agreement.

Quantity Break Pricing—The Order Management System pricing can support traditional quantity break pricing and quantity group pricing.

Order Profitability—Attribute-based standard costs can be managed in a manner similar to attribute-based prices. Order Management System determines the profitably of the specification at the time of order entry taking the difference between the price and cost.

Specification Support—The Order Management System, through its Product Composition System component, provides customers and suppliers with the capability to dynamically create product specifications during the order capture process. The product specifications used in Order Management System can include customer preference specifications, delivery specifications, capability specifications, technical standards, terms and conditions, and order waivers among others. Customer preference specifications are used to provide defaults for product attributes, delivery locations and seasonal shipping attributes. Delivery specifications describe attributes associated with the delivery requirements of the product. Capability specifications describe the manufacturing capabilities of specific production facilities. Once a product specification is instantiated from the appropriate model, a user can clone, compare and compose and modify specifications to further define the specific product they want produced.

Customer Profile Maintenance—Customer Management is an Order Management System component that enables a supplier to configure the system to store customer information as a dynamically maintained business object specification.

Credit Check—Credit checking is provided. Alternately, an adapter can be used to accommodate an external credit system.

Definable Workflows—Order headers and their individual line items have the ability to run to a lifecycle process. Such processes are defined as business objects using a graphical user interface. Processes may include activities such as automatic routing to treasury for credit approval. Activities can be manually or automatically queued to either an individual user or an entire workgroup within the system. For example, instead of routing the order to a scheduler for manual promising, the system can perform it automatically. The work flow execution method is driven by the work flow process specification assigned to the type of order or type of order and customer.

Prompted Order Entry by Specification—The Order Management System can prompt for product specification information not supplied via the customer preference specification. The product modeler determines the display format for the prompting of the attributes.

Change an order line item—When attributes about an order change, the system can highlight information that does not match the customer preference specification.

Order Defaults—A Product Composition System added to the Order Management System in accordance with the invention allows creation and manipulation of a supplier's product specifications and/or customer-defined specifications. Customers have normal terms, methods of shipping, seasonal delivery options, etc. all of which are handled as business object specifications by the PCS component. These specifications become part of the customer profile business object for application at time of order entry.

Order Content Validation—Input completeness and derivation along with specification efficacy assessment is a prerequisite to specification release. Release edits may be performed in the middle of prompted order entry.

Document Distribution—The integration framework discussed above can be used to dispatch any document created by the system according to customer preferences and distribution lists maintained as revision controlled specifications.

Personalization and Internationalization—Standardized Internationalization (I18N) can be applied, which enables the configuration of product and other specifications according to language and location.

Integration—The Order Management System can be configured to communicate with existing enterprise applications such as Manufacturing Execution Systems, Credit Systems, Warehouse Management Systems, and Advanced Planning Systems. These interfaces take place at the level of a work flow step and/or at an object import-export level. Adapters can make use of object definitions in enabling plug and play functionality between supported ERP systems. In the preferred embodiment, the Integration Framework previously described is used to provide the interface with the existing enterprise applications. The Integration Framework enables the Order Management System to receive and distribute information. Information exchanged (the entry and exit points) can be records, messages, events or a combination of the three. These entry and exit points are published, maintained, secure and reliable. Inbound events occur when an external program is invoked from within an Order Management System process. The event notification is inbound to the Order Management workflow engine router.

Customer Buy-from-Inventory System (CD) Example

A Customer Buy-from-Inventory System can be built using the previously-described Business Object Definition System and Product Composition System in accordance with the invention. It provides a "buy-from-inventory" web based demand management system that allows product suppliers to make their inventory available to their customers over a global computer network, such as the Internet. The Customer Buy-from-Inventory System can provide a system for self-service order management. With the Customer Buy-from-Inventory System, product suppliers can post their product catalog on the Internet, making it directly available to their customers. Those customers can then use the Internet to browse or search through posted inventory and create orders for selected products.

The Customer Buy-from-lnventory System provides the ability to order complex, attribute-based products allowing customers to browse and search for products based upon any attribute or combination of attributes that define the supplier's products. Customers can customize and save search templates. The search template is a list of attributes that the customer defines. The system can dynamically create a user interface based on the attributes within a search template. Customers can save multiple search templates, which are available only to them, and can access, change and delete them as needed. The customer application prompts the customer to fill in the template with specific product attribute values, allowing the customer to easily and quickly find and select products.

Customers can collect a list of products they are interested in purchasing or in reviewing further. This list allows a customer to analyze and compare multiple products in an easy to review user interface. Selected products can be made available beyond the time the customer is logged into the system. They can be available until they are unselected or sold. After the customer orders the products they want to purchase, the Customer Buy-from-Inventory System can provide on-line confirmation of the order and verification of the order via email.

The Customer Buy-from-lnventory System provides to customers the ability to search for and order complex products, easily access a product catalog via Internet browsers and review complete details of the product.

Customer Buy-from-Inventory System Components and Features The Customer Buy-from-lnvent6ry System includes the following components and features.

Figure 52:
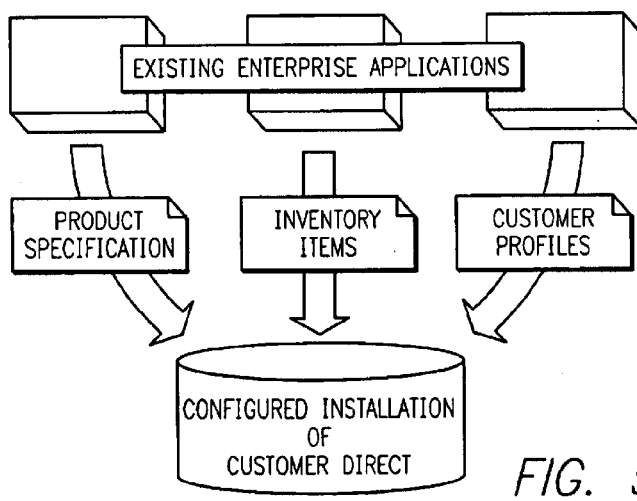
FIG. 52 is a diagram showing the inbound interfaces between existing enterprise applications and the customer direct sales system.
Figures 53, 54, 55:
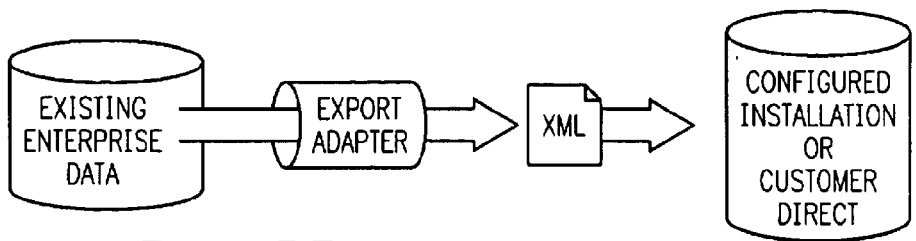
FIG. 53 shows how an export adapter can be used to translate information stored in existing enterprise applications to XML text files for use by the system.
FIG. 54 shows a Maintain Customer Profile screen that can be used to maintain information about customers.
FIG. 55 shows a public user function that can be made accessible from the Maintain Customer Profile screen of FIG. 54.
Figure 56:
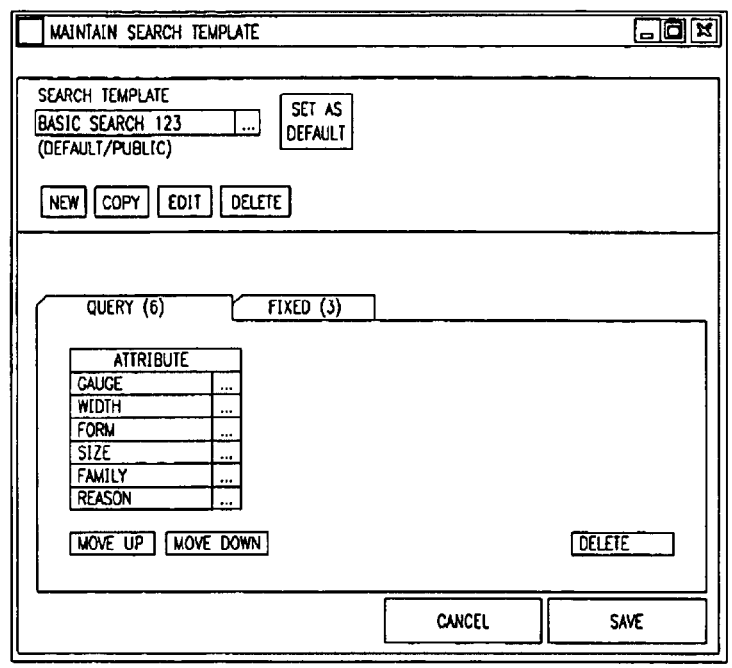
FIG. 56 shows the Maintain Search Template screen.
Figure 57:
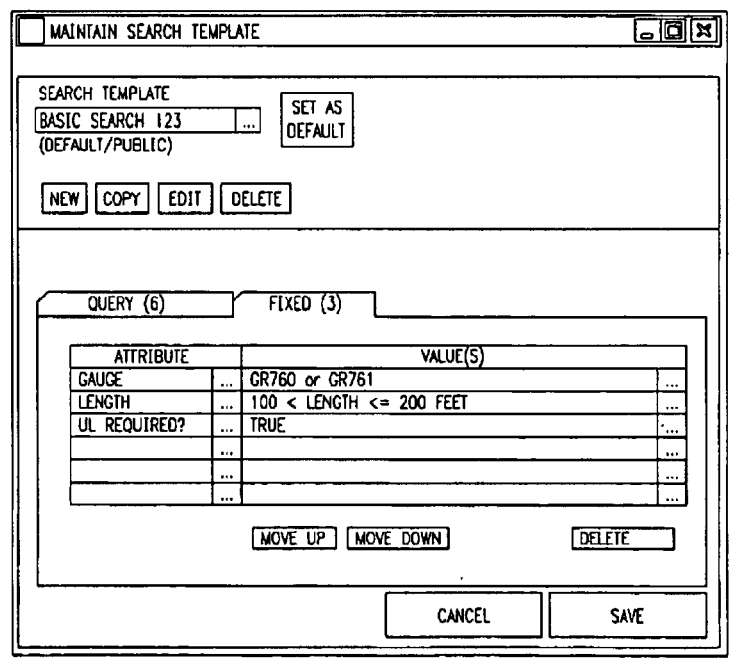
FIG. 57 depicts the Advanced Search tab, which allows the user to specify fixed-value attributes.
Figures 58, 59, 60:
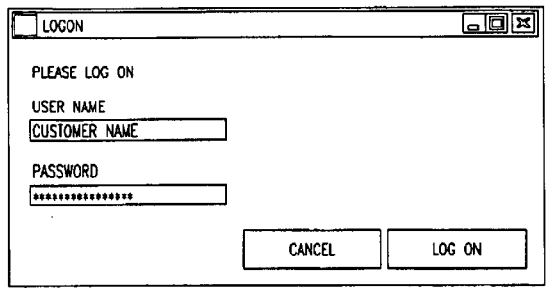
FIG. 58 depicts how customer logs onto the system using the Logon screen.
FIG. 59 shows the Search By Attribute screen.
FIG. 60 shows the Search Template and Quick Search Panes in more detail.
Figure 63:
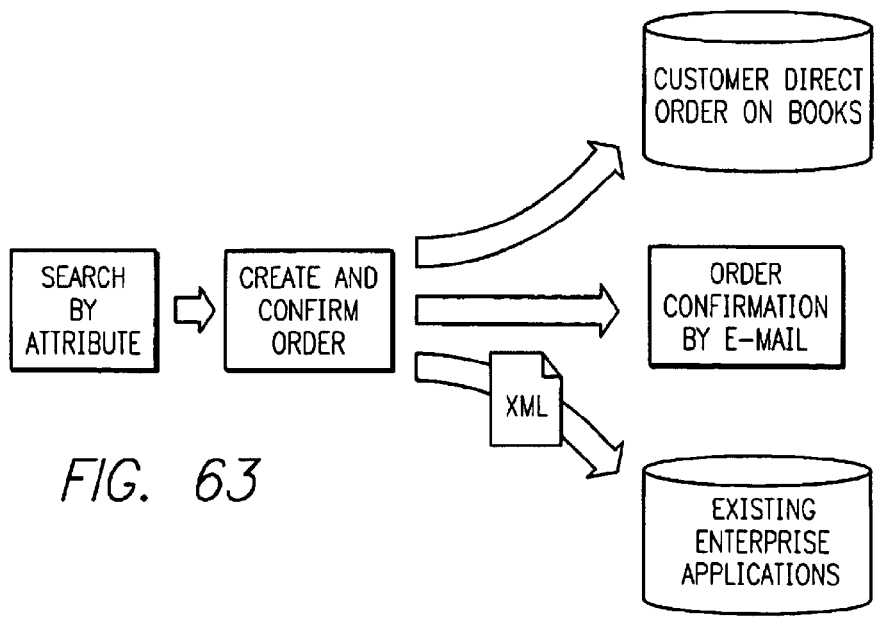
FIG. 63 shows an example of the use of the customer direct sales system for accepting a customer order.
Figure 64A:
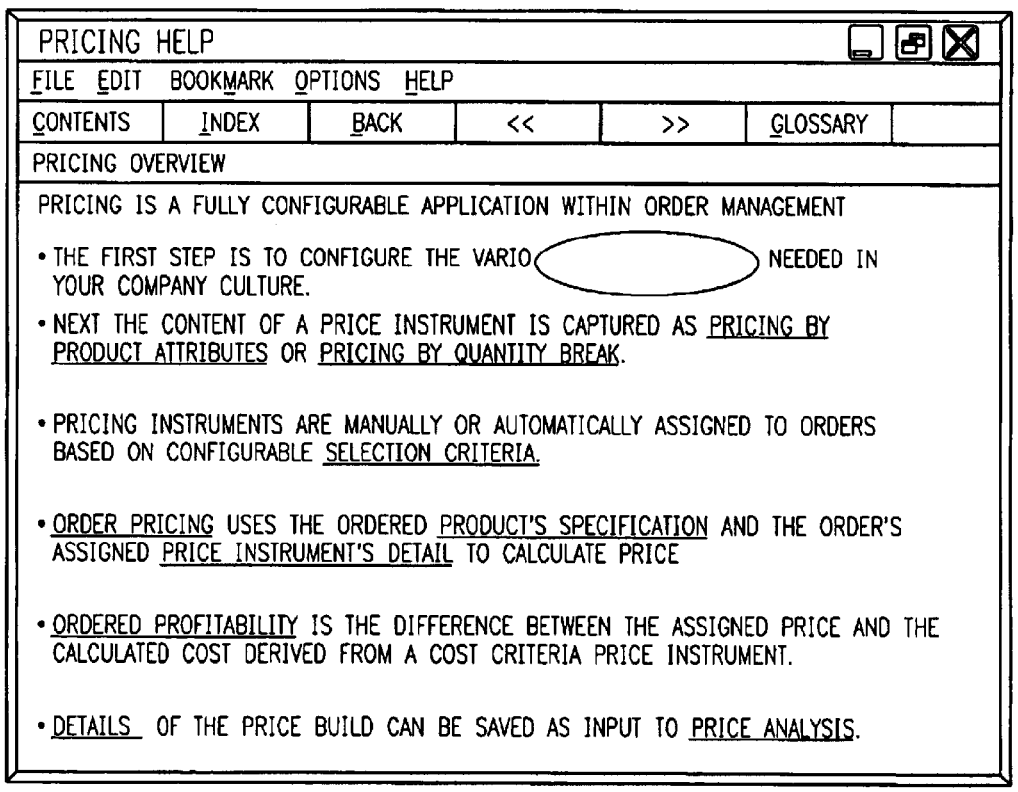
FIGS. 64A and 64B show an example of how the order management system can be configured to utilize attribute-based pricing.
Figure 64B:
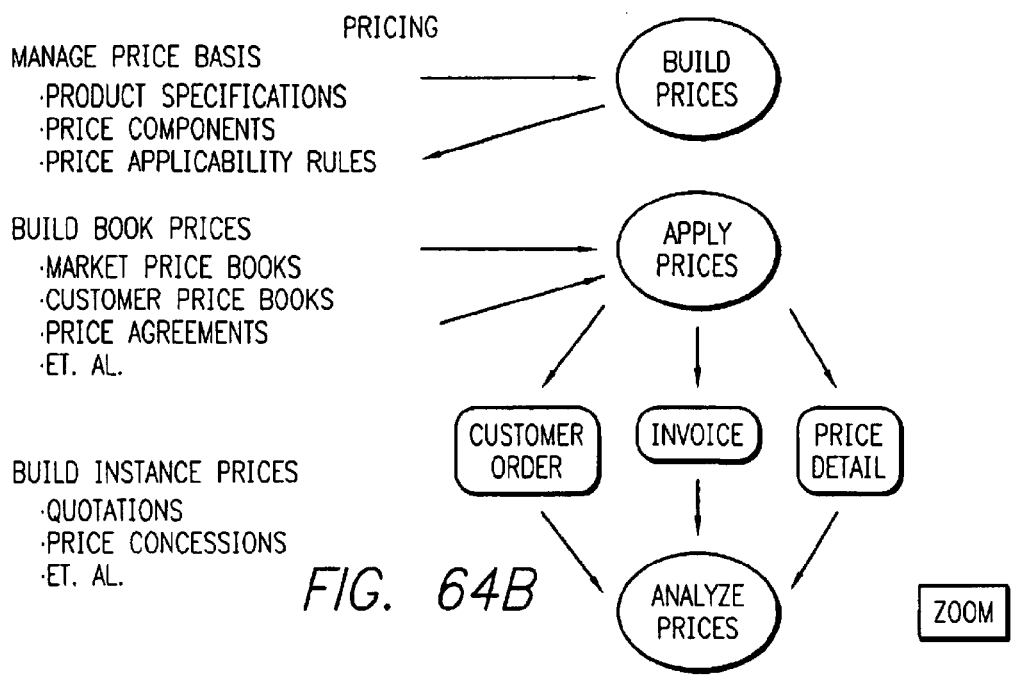
Figure 65:
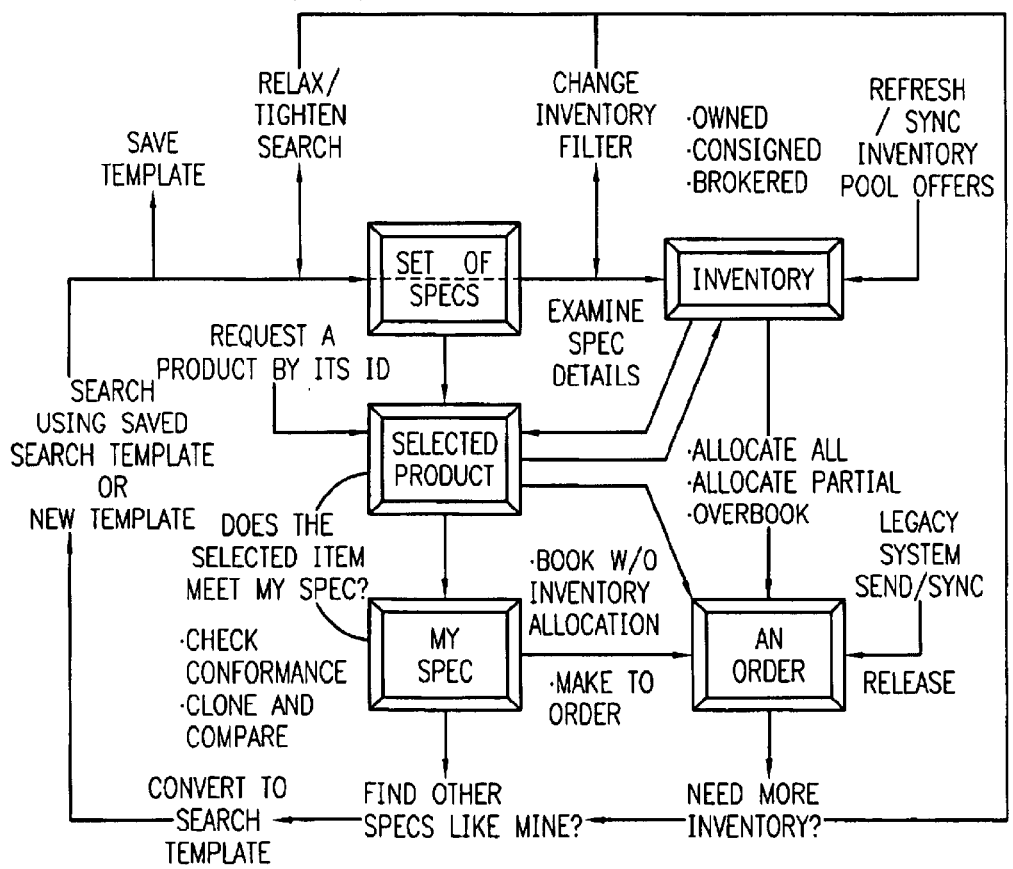
FIG. 65 shows the interacting elements of a Customer Direct Sales system, an Order Management System and a Product Composition System assembled in accordance with the invention in a Customer Direct System setting.
Figure 67B:
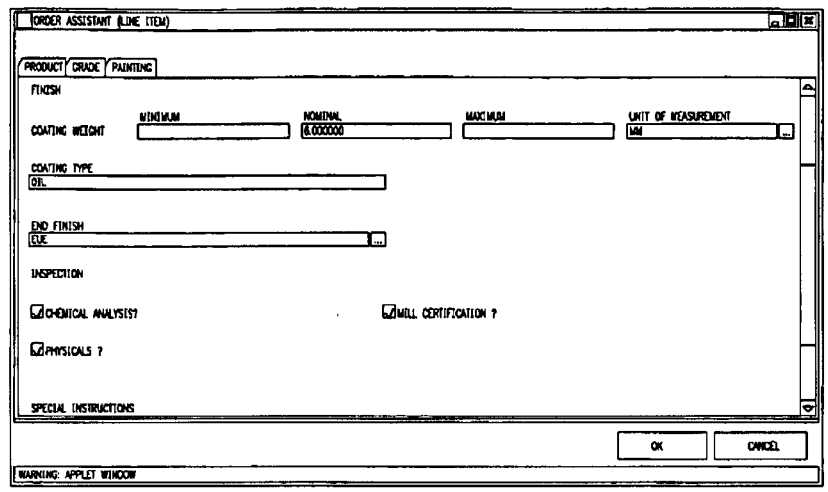
Figure 67C:
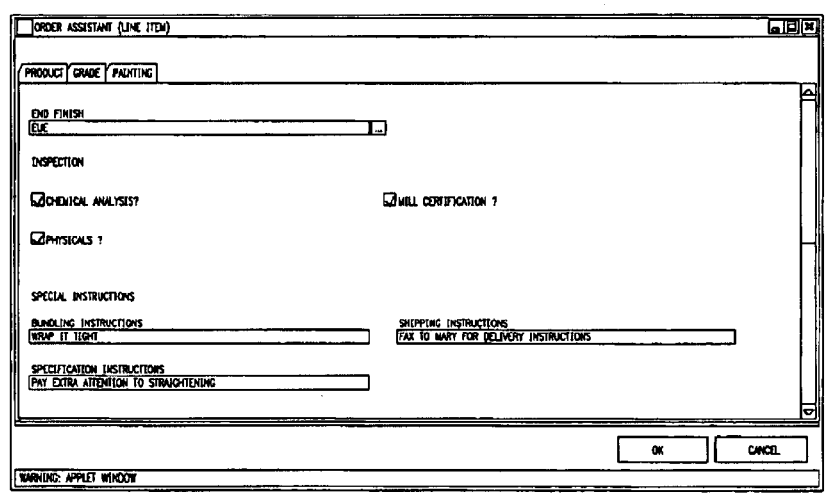
Figure 67D:
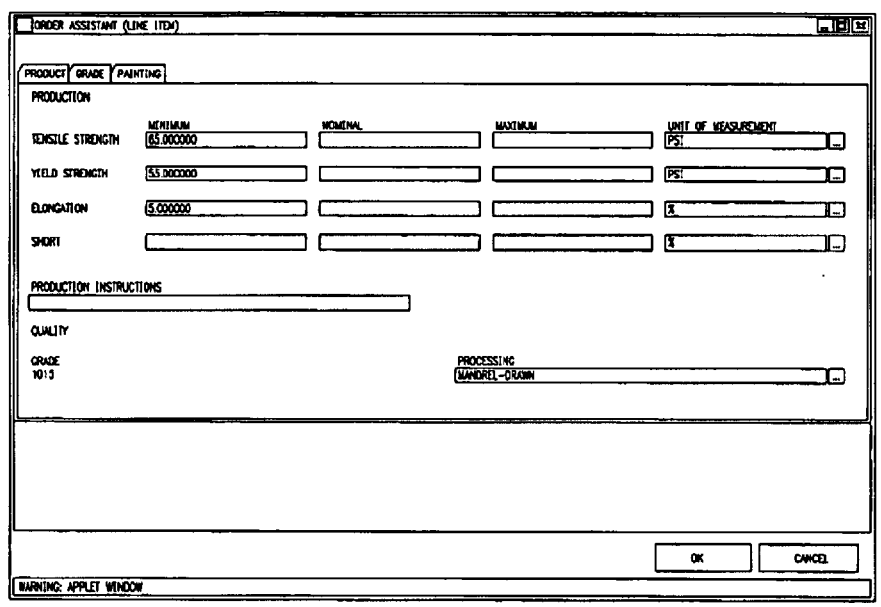

The Customer Buy-from-Inventory System uses the Business Object Definition System and the Product Composition System previously discussed to provide for the creation and manipulation of any object in a Customer Buy-from-Inventory System knowledgebase. FIGS. 52 and 53 depict the setup and configuration of the knowledgebase of the Customer Buy-from-lnventory System, allowing a supplier to post its available products on the Internet and the supplier's customers to have access to the system.

Inbound Interfaces—Inbound interfaces provide for the automatic importing of customer and product information, including available inventory from existing enterprise applications. The inbound customer interfaces provide for management and the importing of customer information from existing enterprise applications.

Outbound Interfaces—In addition to inbound interfaces, the Customer Buy-from-Inventory System also includes an outbound interface used to transmit customer orders to the supplier's existing ordering system. FIG. 53 shows that the supplier can create an export adapter, which takes information stored in existing enterprise applications and translates it to XML text files. As with product specifications, the Customer Buy-from-Inventory System includes inbound interfaces that allow suppliers to import specifications from their existing enterprise applications.

Customer Profile Creation—The Customer Buy-from-Inventory System provides a user interface that allows suppliers to specify information about their customers. These customer specifications are called customer profiles. Each customer profile can include multiple contacts and multiple delivery locations. Customer profiles are managed as business object definitions.

Inventory—Inventory maintained in a legacy system can be loaded as available units of inventory in the Customer Buy-from-Inventory System. Inventory information can be incrementally adjusted and refreshed when appropriate.

Searching—CD allows product suppliers to make their product inventory available to their customers over the Internet. Using the customer ordering application, customers are able to log on to the order management system and search for available inventory by defining specific attributes of a product. CD allows customers to search by attribute—that is, to specify attribute values (or ranges of attribute values) and then search through the available inventory to find matching products. To facilitate these searches, CD can provide search templates. Search templates can be public—that is, provided by the supplier for all their customers to use—or private—that is, created by a customer for that customer's use only.

Collecting Products and Inventory Units—During a search, CD finds products that match specified attribute values. Upon completion of a search, CD displays the matching products for the customer in a found products bin. The customer can then select products from this list, which marks the selected items by moving them to a selected products bin. From this bin, the customer can select products to order, which prepares the items for a pending order.

Ordering Line Items—Once a customer has collected products of interest into a pending order, the customer can begin the actual ordering process. First, a customer can specify additional order information; then, the customer can examine the order a final time before performing order confirmation.

Order Acknowledgment—When a customer has completed an order, CD can automatically respond in a number of ways. Order confirmation allows CD to send e-mail to the customer to acknowledge the order. The outbound order interface allows CD to export the order into the supplier's existing enterprise applications. Finally, the order on books feature allows CD to store the order into the Order Management System for Where it can be priced and promised.

Figure 50:
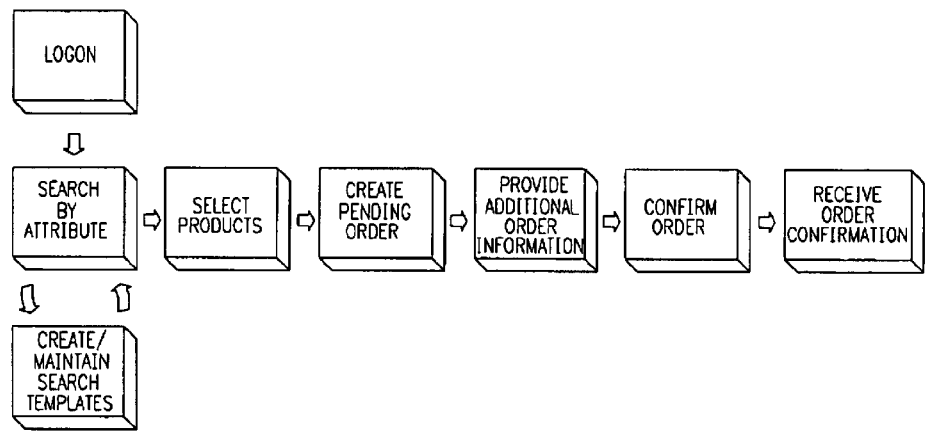
FIG. 50 is a block diagram depicting a typical customer order process using system.
Figure 51:
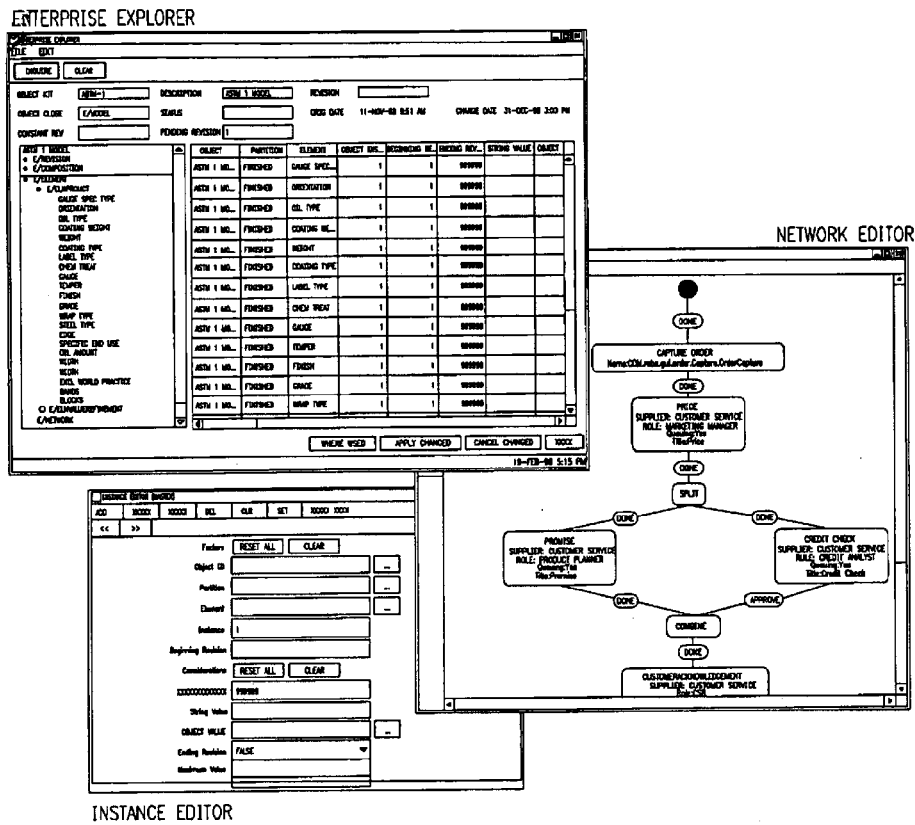
FIG. 51 depicts one example of screen displays which by which a user can access the enterprise explorer, the instance editor and the network editor to navigate the system.

FIG. 50 is a flow diagram showing an example of a customer's typicall use of the Customer Buy-from-Inventory System.

Managed Negotiation System (MN) Example

A Managed Negotiation System has been built using the Business Object Definition System and the Product Composition System in accordance with the invention. The Managed Negotiation System enables a buyer and seller to negotiate the contents of a requirement, taking the form of a specification, in a sequence of offers and counters.

The Managed Negotiation System comprises a comprehensive set of functional objects accessed via API's focusing on creating postings, bidding on postings, and countering these bids. The Managed Negotiation System enables buyers and sellers to speak in the language they understand—defining what they want, or what they have to sell, in terms of product attributes, rather than item numbers. The Managed Negotiation System enables buyers and sellers to haggle for products or services over a computer network, such as the Internet.

Unlike other solutions, the Managed Negotiation System does not limit the negotiable terms (i.e. the attributes). Attributes pertain to the characteristics of the product or service being offered. This includes the characteristics of the delivery logistics and finical settlement. The buyer or seller determines which attributes are negotiable during the creation of a posting. A posting is in the eye of the beholders. To a buyer it is a request. On the other hand, a seller views a posting as a product offering. The features and functions within Managed Negotiation System and the Business Object Definition System are context independent and can be utilized from either perspective.

An exchange includes two participants; buyers and sellers. Buyers of an exchange can use the Managed Negotiation System to post product inquiries and send these to one seller, a list of sellers of their choice, or to all sellers on the exchange. Sellers can respond to the inquiry by stating their conditions and price. Sellers, on the other hand, can post product offers consisting of any number of attributes, make the offer available to one buyer, a list of buyers of their choice, or to all buyers on the exchange. Buyers can respond to the offer and negotiate any of the associated attributes by "pushing" postings to participants. In reverse, participants can "pull" postings from the exchange. This is accomplished by searching the virtual public market place using any attribute of any posting. The poster has the option of excluding participants from finding their posting. Postings can be included in private, public, or both types of exchange. Postings, bids, or counter offers have the option of being anonymous once found.

Using the Managed Negotiation System, a participant can bid on postings. The participant can bid as many times on as many postings as they want. . After a participant creates and submits a bid, it is sent back to the originator's in-box. The next time the originator logs into the system, the originator will see the bid. The Managed Negotiation System also can notify participants of events in the exchange through external functions. (e.g., e-mail). The originator has the option to accept, reject, or counter the bid. A counter offer is sent back to the creator of the bid. This negotiation thread bounces back and forth as many times as necessary. Any one posting can maintain any number of negotiation threads with any number of participants. Any component of a negotiation thread (posting, bid, or counter) contains an expiration date and time.

During a negotiation thread, participants may find it necessary to compare postings to bids to counter offers. The Business Object Definition System has the ability to compare any of these components as well as any history associated with the negotiation thread. The Business Object Definition System provides the ability to change which attributes are negotiable for a particular negotiation thread. In essence, different negotiation threads for a single posting can have different negotiable attributes.

A posting closes when a participant accepts a bid or counter offer. Posting can be set up to accept partial quantity bids or multiple partial bids from different bidders. These types of postings have the option to automatically close when the quantity of the bids accepted matches the quantity of the posting. After accepting a bid or counter offer, the system creates an order and distributes it via the Integration Framework using XML. This order can then be used in the backend for financial needs of the exchange.

Managed Negotiation System Features

In the preferred embodiment of the Managed Negotiation System, the features described below are available to an exchange. The owner of the exchange has the ability to make or not make features available within their own exchange.

Overall Features

Logon with Roles—The Managed Negotiation System provides user level security for business functions. The exchange controls what can be seen by a user based on their role, company, and/or other factors available within the system.

User definition—The account management features provide administrators functions to view, add, change, or delete attributes related to a user. These include the company information, roles, phone numbers, and addresses. Sets of convenience methods are available to the administrator for getting and setting this information.

Product Lists—The invention returns a list of all products that are available to post against. A post represents a request from a buyer or a product offering from a seller. This is a list of user definable templates configured within the invention's Product Composition System. The features and functions of the Product Composition System and Business Object Definition System are available.

Convenience Methods—Convenience methods have been provided through the published API. These include lists of companies, users, and negotiation threads. The Managed Negotiation System also includes the ability to create a workspace for the user logged into the system.

Dynamic Attribution (Boolean, Simple, Domain, Range)—The Invention Product Composition includes the ability to create attributes for any product. These attributes have been sub-classed into the following four distinct types:
  Boolean: A yes or no decision.
  Simple: Free form text.
  Domain: A set list of values.
  Range: A range of values, which can be used for date and numeric attributes.

Specification Management—The Product Composition System includes features that make it easy to manage specifications and ontology. Refer to the Product Composition System and Business Object Definition System components for a full set of features and functions.

Summary Views—An ontology modeler has the ability to create multiple summary views for any specification. For example, these summary views may be used to display parts of a specification within a table or to give the user a quick look at the most important data about a specification.

Buyer Support Features

Create Request—Buyers can create requests for any product model accessible to them from the Product Composition System. Information on the request is control through dynamic attribution within the invention. Attributes have different settings, i.e. editable, required or negotiable. Attributes are grouped into partitions and partitions are grouped into tabs.

Submit Request—When submitting a request, buyers have the ability to set different options. These options include:

Audience—public verse private, included verse excluded individuals or companies

Expiration Dates and Time

Partial Quantity Bids

Automatic Closure of Bids by Quantity

Review Details for Request, Product Offer, Bid, Counter—The Product Configuration System previously described includes all attributes associated with a request, product offering, bid, or counter. Because the method and system of the invention treats each of these as specifications, all features and functions available for specification management are available for these objects. Administrators have the ability to create summary views by posting.

Review Bids against Request—The Managed Negotiation System can quickly retrieve a negotiation thread for any request. Negotiation threads exist for each seller who has bid against this request. In the thread, all history of the bids and counters are saved and retrievable out of the system.

Counter Bid against Request—Buyers have the ability to counter any bid made against a request. All features available for creating a request are available for creating a counter. For example, a buyer may choose to make fewer attributes negotiable while creating the counter offer.

Search Public Market for Product Offers—A buyer has the ability to search the public market place for any posting (requests or product offers) by any attribute that describes the posting. Postings that have been excluded from the buyer's company or the buyer as an individual are not found.

Create Bid against Product Offer—Buyers also have the ability to bid on product offers submitted from a seller. These product offers may show up within a buyer's in-box (pushed) or can be found using any attribute of the product offering (pulled).

Accept a Bid or Counter—Buyers can accept bids against request or counters against product offers. The Managed Negotiation System does not impose a business process. This allows the exchange to make the decision. Some exchanges may choose to allow users to accept counter offers others do not.

Compare any Request to any Bid to any Counter including History—Buyers need to compare their requests to bids and counters made against these requests within a negotiation thread. In accordance with the invention, the system supports comparing anything to anything. The Managed Negotiation System can return different information based on how it needs to be displayed, e.g., as a ist of the different attributes, a list of all the attributes marking which are different, or a history of requests, bids, and counters and comparing historical data.

Compare any Product Offer to any Bid to any Counter including History—Buyers also need the ability to compare product offers to bids and counters made against these requests within a negotiation thread. The present invention also supports comparing product offers to other product offers in the system whether they exist in the public or private market place.

Request, Bid, Counter Anonymity—A buyer may want to disguise requests from competitors and/or current suppliers. When a request is created the buyer decides whether or not the request is anonymous. They also decided whether or not this request accepts anonymous bids. Buyers have the same ability when bidding on a seller's product offering if the product offering accepts anonymous bids.

User Selection of Negotiable Attributes for Request, Bid, or Counter—Any trading partner (buyer or seller) has the ability to set those attributes that are negotiable and those that are not. Buyers set negotiable attributes on requests, bids on product offers, and counters.

Request, Bid, Counter History—Every request, bid, and counter includes a complete history of changes within the negotiation. This history can be displayed and compared to any other historical data.

Withdrawal Request, Bid, or Counter—A buyer withdraws a request, bid, or counter before it expires within the system. Withdrawing a request closes all negotiation threads associated with the request. Withdrawing a bid or counter reverts the negotiation thread back to its previous state. For example, a buyer counters a bid from a seller. Before the seller has responded to the counter, the buyer withdraws the counter offer. The negotiation thread reverts back to the seller's bid in the buyer's in-box as the most recent activity and the buyer has the option to act upon the bid. The status of the counter changes to "withdrawn."

Delete Request, Bid, or Counter—A buyer deletes a request, bid, or counter after it expires within the system. The deleted item does not show within the buyer's view of requests, bids, or counters.

Reject a Bid or Counter—A buyer can reject a bid against a request or counter against a product offering. The status of the bid or counter changes to "rejected" and the negotiation thread reverts back to its previous state.

Automatic Expiration—Through a configurable event, the system expires all postings, bids, and counters that have expiration dates and times greater than the system date and time. The status of the postings, bids, and counters changes to "expired."

Filter views—A user has the ability to filter the views by any attribute related to a posting. These include but are not limited to the status, expiration date, audience, and product information.

Seller Support Features

Create Product Offer—Sellers can create product offers for any product model accessible to them from the Product Composition System. Information on the product offer is control through dynamic attribution in accordance within the present invention. Attributes have different settings, i.e., editable, required or negotiable. Attributes are grouped into partitions and partitions are grouped into tabs.

Submit Product Offer—When submitting a product offer, sellers have the ability to set different options. These options include:

Audience—public verse private, included verse excluded individuals or companies

Expiration Dates and Time

Partial Quantity Bids

Automatic Closure of Bids by Quantity

Review Details for Product Offer, Request, Bid, Counter—The product configuration contains all attributes associated with a product offer, request, bid, or counter. Because these are treated as specifications in accordance with the invention, all features and functions available for specification management are available for these objects. Administrators have the ability to create summary views by posting.

Review Bids against Product Offer—The Managed Negotiation System can quickly retrieve a negotiation thread for any product offer. Negotiation threads exist for each buyer who has bid against this product offer. In the thread, all history of the bids and counters are saved and retrievable out of the system.

Counter Bid against Product Offer—Sellers have the ability to counter any bid made against a product offer. All features available for creating a product offer are available for creating a counter. For example, a seller may choose to make fewer attributes negotiable while creating the counter offer.

Search Public Market for Requests—A seller has the ability to search the public market place for any posting (product offers or requests) by any attribute that describes the posting. Posting that have been excluded from the seller's company or the seller as an individual are not found.

Create Bid against Request—Sellers also have the ability to bid on requests submitted from a seller. These requests may show up within a seller's in-box (pushed) or can be found using any attribute of the request (pulled).

Accept a Bid or Counter—Sellers accept bids against product offer or counters against requests. The Managed Negotiation System does not impose a business process. This allows the exchange to make the decision. Some exchanges allow users to accept counter offers others do not.

Compare any Product Offer to any Bid to any Counter including History—Sellers need to compare their product offers to bids and counters made against these product offers within a negotiation thread. The invention supports comparing anything to anything. The system returns different information based on how it needs to be displayed, e.g., as a list of the different attributes, a list of all the attributes marking which are different or as a history of product offers, bids, and counters and comparing historical data.

Compare any Request to any Bid to any Counter including History—Sellers also need the ability to compare requests to bids and counters made against these requests within a negotiation thread. The invention also supports comparing requests to other requests in the system whether they exist in the public or private market place.

Product Offer, Bid, Counter Anonymity—A seller may want to disguise product offers from competitors and/or current buyers. When a product offer is created the seller can decide whether or not the product offer is anonymous. The seller can also decide whether or not this product offer accepts anonymous bids. Sellers have the same ability when bidding on a buyer's request if the request accepts anonymous bids.

User Selection of Negotiable Attributes for Product Offer, Bid, or Counter—Any trading partner (buyer or seller) has the ability to set which attributes are negotiable and which are not. Sellers can set negotiable attributes on product offers, bids on requests, and counters.

Product Offer, Bid, Counter History—Every product offer, bid, and counter contains a complete history of changes within the negotiation. This history can be displayed and compared to any other historical data.

Withdrawal Product Offer, Bid, or Counter—A Seller can withdraw a product offer, bid, or counter before it expires within the system. Withdrawing a product offer closes all negotiation threads associated with the product offer. Withdrawing a bid or counter reverts the negotiation thread back to its previous state. For example, a seller counters a bid from a buyer. Before the buyer has responded to the counter, the seller withdraws the counter offer. The negotiation thread reverts back to the buyer's bid in the seller's in-box as the most recent activity and the seller has the option to act upon the bid. The status of the counter changes to "withdrawn."

Delete Product Offer, Bid, or Counter—A seller can delete a product offer, bid, or counter after it expires within the system. The deleted item does not show within the seller's view of requests, bids, or counters.

Reject a Bid or Counter—A seller can reject a bid against a product offer or counter against a product offering. The status of the bid or counter changes to "rejected" and the negotiation thread reverts back to its previous state.

Automatic Expiration—Through a configurable event, the system can expire all postings, bids, and counters that have expiration dates and times greater than the system date and time. The status of the postings, bids, and counters changes to "expired." Filter views—A user has the ability to filter the views by any attribute related to a posting. These include but are not limited to the status, expiration date, audience, and product information.

Order Processing Features

Order Creation—The system can automatically create an order at the time of acceptance of a bid or counter. This order contains the agreement between the buyer and seller.

Order Interface—At the time the order generates, the system can create an XML message containing all the order and product information. The XML outbound order is used to integrate with ERP and legacy systems as previously discussed.

Order Changes—After an order is created, it still has the ability to be changed within the system.

Additional Features

By using the Business Object Definition System in accordance with the invention, the Negotiated Management System can be configured with additional features. For example, a customer or customer's broker can simultaneously negotiate with multiple suppliers, each making counter offers without having to create new RFQ's and new Specification ID's for the product or service being bid. Both the "Customer" and the "Supplier" can use Revisions for requirements "counters" to tighten or relax requirements. The customer or broker can restrict specification revision content to a particular audience. A "content audience filter" can be provided to let the customer or the customer's broker focus on specifications particulars involved with a particular supplier audience.

As another example, a feature can be provided for a supplier making counters. To implement this feature, each supplier would have only one Specification Counter ID for any independent bid that they may be making. The supplier would use Revisions to tighten or relax requirements for a particular bid. The supplier (making a bid) would occasionally execute the option of resetting his/her counter specification content with the exact content of the current customer demanded item revision appearing in the latest RFQ revision. This would be executed at any time as a new starting basis, or to close the counter (within the supplier's own system) as being in agreement with the current RFQ demanded item revision.

In addition to the above, users of the invention can create for their particular environment any appropriate mix of demands (RFOs, Offers, Postings, Bids, Awards, etc.) and the threads relating demands. Notification subscriptions associated with a product or demand can be configured to alert interested parties.

Business-to-Business Commerce System Example

A business-to-business system can be assembled using the business object definition system in accordance with the invention. Global electronic commerce is an economic revolution that is happening now. It is estimated that by 2004 as much as 13% of global economic transactions will occur in some manner over Internet-based electronic channels. This percentage will continue to grow for the next several years. New ways of conducting inter-enterprise commerce may improve productivity by as much as 35% or more in a wide variety of industries and verticals. Thus, the potential value to the global consumer community is in the many trillions of dollars in recurring cost savings.

To fully realize this potential value requires seamless global electronic commerce that fully automates the many interactions between buyers and sellers of all products and services. This new paradigm requires new technologies that encode the language of commerce in computer systems such that all commerce processes can be conducted by computer systems with minimal human intervention. This requires that all commerce transactions and the underlying commerce ontologies that support them must be capable of being dynamically defined to and executed by computer systems. A business-to-business system constructed in accordance with the invention can satisfy these requirements by providing an attribute-based specification management system for defining the actors that participate in commerce processes, with rich functions that operate on those specifications, and a generalized computer model that defines and implements how those actors interact in those processes.

Figure 70:
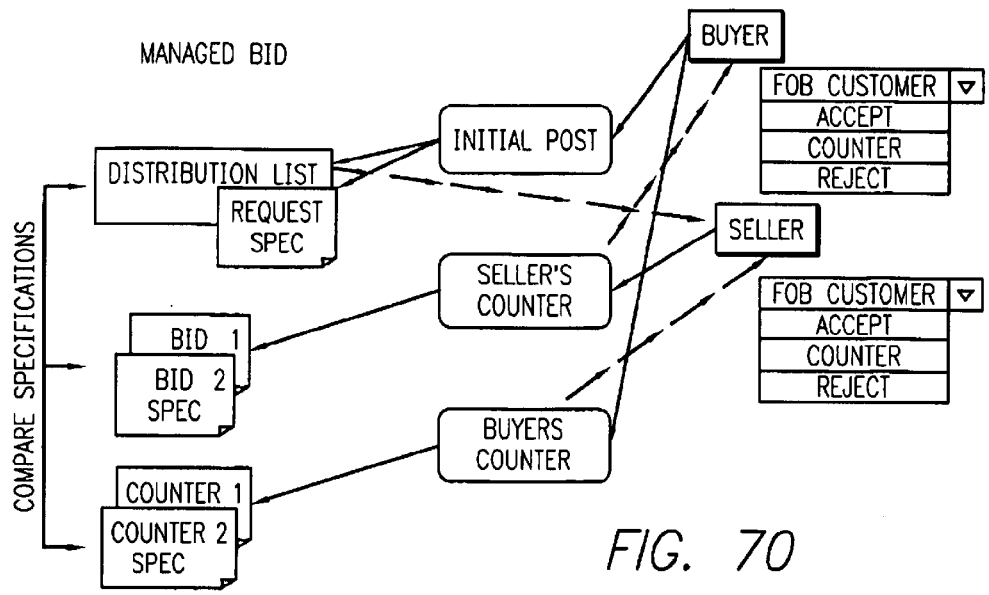
Figure 71:
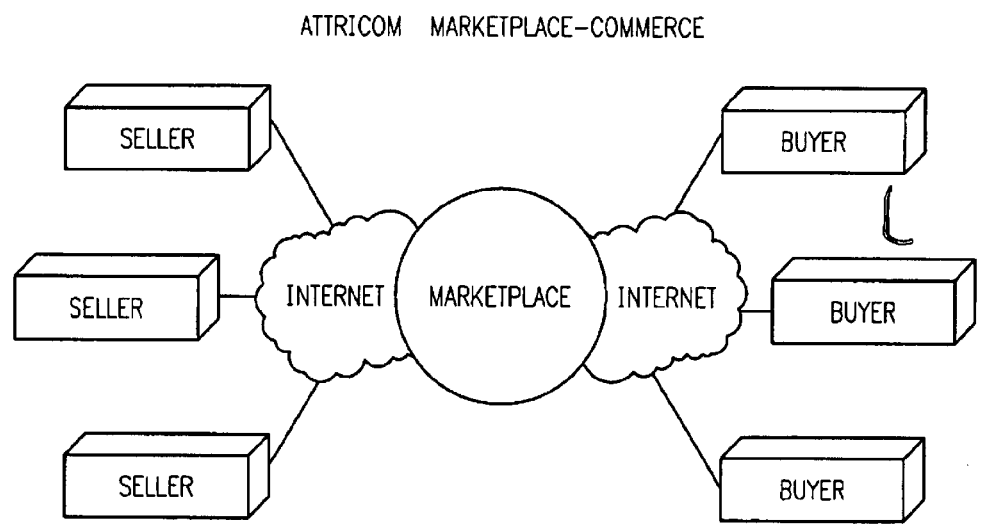
FIG. 71 depicts web based business-to-business market commerce provides the setting for business-to-business commerce.
Figures 72, 73:
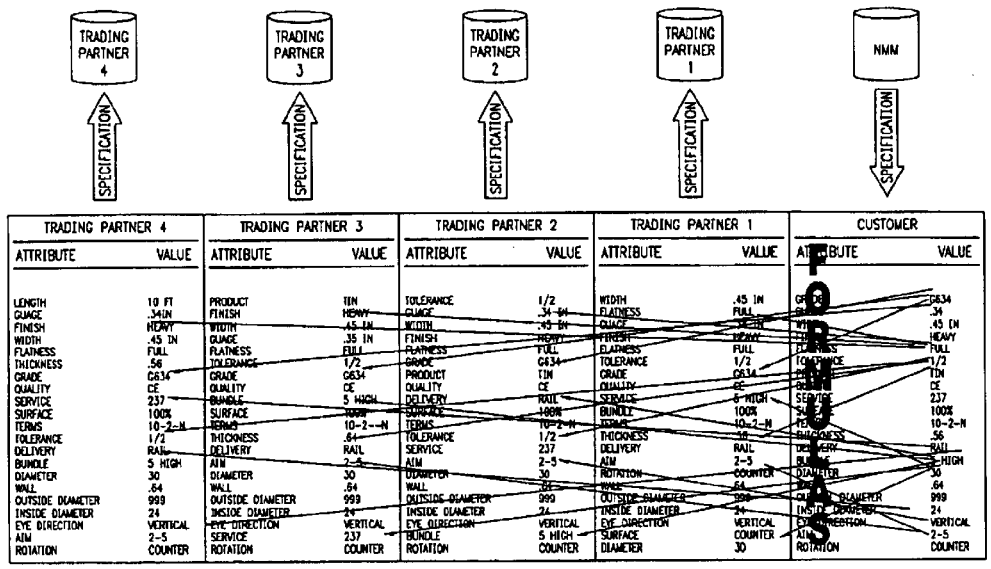
FIG. 72 shows the derivation of the different views by trading partners by the BODS Derivation engine.
FIG. 73 shows a typical user interface that provides comparison of an original RFQ with a Counter Offer to the last Negotiation Offer of a bidding supplier
Figure 74:
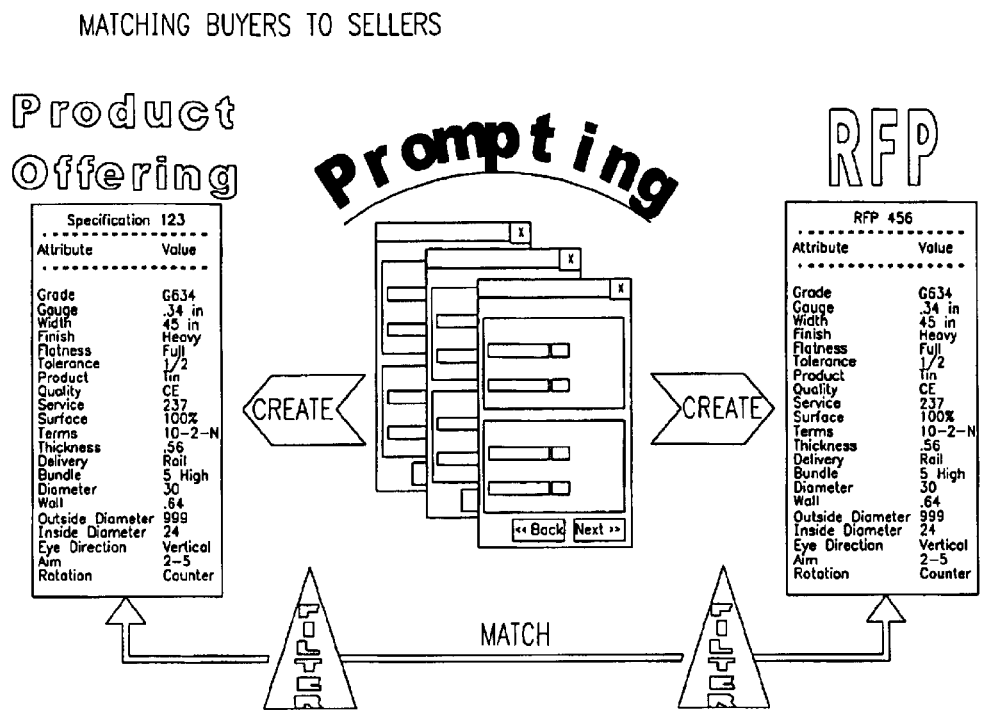
FIG. 74 shows the use of BODS components in prompting to complete RFQ and product requirement definitions.

One such business-to-business system includes all of the functionality of the Product Composition System, the Order Management System, and the Negotiation Management System previously described. FIG. 71 provides the setting for business-to-business commerce. FIGS. 69 and 70 show the Business Object Definition System components used in the Negotiated Bid and Negotiation Management System that are also part of the business-to-business system. FIG. 74 shows the use of business object definition system components in prompting to complete RFQ and product requirement definitions. FIG. B2B1 shows a typical user interface. FIG. B2B5 shows the derivation of the different views by trading partners by the business object definition system Derivation engine. Last, FIG. B2B6 shows a typical user interface that provides comparison of an original RFQ with a Counter Offer to the last Negotiation Offer of a bidding supplier.

Knowledge Management System Example

A Knowledge Management System can be built using the previously described Business Object Definition System in accordance with the invention. Objects representing knowledge can be placed in a composition of objects forming a tree space of alternate nodes. The objects can represent anything from a definition of capabilities, products, processes, organizational structure, pictures, diagrams, ad infinitum. The Business Object Definition System provides the ability to form a hierarchical semantic network of knowledge nodes. The objects present at these nodes may take the form of object definitions according to the invention. Nodes in the hierarchy can include mental dynamics (e.g., answering a node question), manual activities (e.g., reading displayed up-sell script), and automated activities (e.g., executable objects). The extent to which these objects are defined (attributes, object relationships, external references, etc.) determines the ability to locate them with a knowledge search. Predefined knowledge searches may also be defined in object definition form and included as nodes of knowledge. The invention can provide the functions to traverse this network and to examine the objects and definitions associated with a knowledge node. The methods include: auto node insertion; traverse knowledge nodes; search for specific knowledge by creating search objects (general to specific refinements), execute searches and view detail behind a knowledge node.

Ontology Management System Example

An Ontology Management System can be constructed using business object definition system components in accordance with the invention to formally manage company and industry ontologies. Companies often collaborate at the level of their definitions (inputs-outputs). In general, definition and specification have been an independent adjunct to an object's fulfillment processes. This contributes to omissions, misunderstanding of requirements, cycle delays, and added cost. All of this motivates companies to seek a shared ontology permitting product definitions and other business objects to be located, compared, composed, negotiated, etc.

The business object definition system can be used to build an ontology by collecting the appropriate attributes and object relationships existing within a target ontology body of knowledge. Terms and their use within a body of knowledge for the most part already exist within the language of a given business. Those that have not been formalized as objects can be given a definition using the Basic Object Definition System. Context and Role objects can also be given definitions using the Basic Object Definition System. Context can define how the ontology terms are used within the target body of knowledge. Role can define the nature of the ontology ingredient and its behavior. As each ingrediential object (term) is added to the ontology, it is placed within one or more such Contexts and one or more such Roles. Tabs can be provided for further partitioning of ontology content into taxonomic areas of activity, product families, etc., thereby facilitating the understanding and application of the ontology. Once defined, an ontology provides the basis for formulating new business object models.

The constructed ontology can be applied as follows. As discussed above, in accordance with the present invention business objects are managed as processable specifications instantiated from models. The role of the ontology specification is to be the "palette" for creating business object models. A drag and drop function can be used to apply selected objects from the ontology to formulate the model. The shared ontology models can then be made available to instantiate consistent business objects.

Collaborative Design System Example

A Collaborative Design System can be assembled using the business object definition system components in accordance with the invention. Such a Collaborative Design System will allow multiple parties participate in the design and specification of a business object.

The Collaborative Design System makes specific use of components of the Product Composition System and Managed Negotiation System described above to handle design proposals and counters. Design content can be revision controlled with instances of ingrediential content optionally given content ownership. A user, such as a design project manager, can use content ownership in conjunction with an audience filter method to control the public and collaborative views of the design.

Business Wizard Example

A Business Wizard can be used to create a new business application function using the business object definition system in accordance with the present invention. Using the business object definition system, one can view a business process (e.g., Engineering Change Order, Change Approval, Specification Preparation, Order Management, Negotiated Bid, etc) as a set of components that can include the following: Demands, Objects of Activity, Demand Satisfaction Processes

- (1) A Demand to Assign Responsibility, Schedule, Etc: Demands representing formalized requirements for activity acting on some demanded object can be managed as business objects in the form of specifications. Sometimes a new type of demand needs to be created. In accordance with the invention, the new demand can be composed of a base specification and an extension specification that contains the extra attributes for the specific kind of demand being set up.
- (2) An Object of Activity: Sometimes there is a need to register a new Object of Activity (i.e., a demanded item) or a new Registration Type, both of which can be done dynamically in accordance with the invention.
- (3) A Demand Satisfaction Process: Requirements for activity addressing satisfaction of a demand can be formalized as workflows. The invention can be used to create a process to direct and control workflow carried out in the satisfaction of the demand. This process definition can take the form of a business object definition system specification created using the invention's graphical editor. business object definition system workflow definitions can be used to track and execute the satisfaction of demand.
- (4) A set of parameters (attributes) to support/drive execution of the process. These can take the form of a model-based extension specification and prompted specification collection.
- (5) Business Rules to customize the behavior of the Object or its process. These Business Rules can be managed as object definitions.
- (6) A GUI screen to associate Demand, Workflow, and other components such as the extension specification pop-up to collect the requisite parameters.

Business Object Management System Example

Components of the business object definition system described above may be used to create systems or subsystems to manage specific kinds of business objects used in a company's operational systems. This includes the complete definition and capture of information about a business object, including its display and collection and derivation rules. Typical operational business objects include customers, locations, activities, statements, invoices, receivables, and payables.

Such a business object management system can be assembled by creating business object models that can be used to define the content and collection and derivation criterion and rules that apply. The object models become the basis for instantiating the needed instances of business objects. FIGS. 54 and 55 represent management of customer profile information.

Conclusion

From the foregoing, it will be seen that the present invention meets the previously mentioned goals. Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A method for creating a computer-processable definition of a business object, the method comprising:
    naming the business object;
    defining one or more ingrediential objects within a specification construct including revision control for providing content effectivity and composition effectivity; and
    relating each of the ingrediential objects to the business object to define the business object.

2. The method according to claim 1 wherein the step of relating each of the ingrediential objects to the business object comprises:
    selecting an ingrediential object context to be used in the business object definition for the ingrediential object;
    placing the ingrediential object within the selected ingrediential object context;
    assigning a relationship role to the ingrediential object; and
    assigning one or more attributing values to the ingrediential object in its relationship role.

3. The method according to claim 2 wherein the step of selecting the ingrediential object context comprises selecting an ingrediential object context partition for providing the context under which the ingrediential object participates in the object definition and for allowing associative grouping of ingrediential objects.

4. The method according to claim 3 wherein the step of assigning one or more attributing values to the ingrediential object includes assigning a context partition slot and a context partition slot position.

5. The method according to claim 4 wherein the step of assigning a context partition slot position comprises assigning a slot position having a use of a priority sequence, an alternate choice, a set processing sequence, or a multi-valued attribute.

6. The method according to claim 4 further comprising processing the ingrediential objects as an ordered list using the context partition, the context partition slot and the context partition slot position.

7. The method according to claim 6 wherein the step of processing the ingrediential objects as an ordered list comprises processing the ingrediential objects using the relationship role assigned to each of the ingrediential objects within the context partition.

8. The method according to claim 3 further comprising:
    selecting one or more additional context partitions, thereby resulting in a plurality of context partitions; and
    dynamically defining an ordered list presentation of the context partitions in the plurality of context partitions.

9. The method according to claim 3 further including assigning the context partition a normal presentation sequence for display comprising:
    selecting a parent model template; and
    specifying in the parent model template a normal context partition presentation sequence for business objects instantiated from the selected parent model.

10. The method according to claim 9 wherein the sequence presentation of an object's ingrediential object definition content within a partition is dynamically controlled by a user, the method further comprising:

assigning a sequence of ingrediential objects within a context partition.

11. The method according to claim 2 wherein the step of assigning a relationship role to the ingrediential object comprises assigning a role for defining the nature of the relationship between the ingrediential object and the business object.

12. The method according to claim 11 wherein the step of assigning a role for defining the nature of the relationship between the ingrediential object and the business object comprises further attributing the ingrediential object.

13. The method according to claim 12 wherein the step of further attributing the ingrediential object comprises assigning one or more attributing values selected, depending on the ingrediential object's type, from the group including Object Identifier, Big Decimal, Integer, Time Stamped, Date, Time, Currency, Boolean, Derivation Expression, String, URL, Big Text, and Blob.

14. The method according to claim 13 wherein the step of assigning one or more attributing values comprises assigning a Boolean value that is restricted to true or false or undecided.

15. The method according to claim 13 wherein:
the step of assigning one or more attributing values comprises using numeric values to capture date values and time values as part of ingrediential object attribution as appropriate; and
the method further comprises presetting in the parent model template or accepting user entry of one or more of a minimum date, a minimum time, a nominal date, a nominal time, a maximum date and a maximum time.

16. The method according to claim 15 further comprising supporting the attributed ingrediential object's date, time, and timestamp values with an edit mask definition within the parent model template for restricting storage of the values to a format specified by the edit mask definition.

17. The method according to claim 13 wherein numeric values are used to capture currency amounts using minimum, nominal, and maximum numeric fields in conjunction with an entered or preset currency and a storage currency, the method further comprising as appropriate the steps of:
presetting in the parent model template or accepting user entry of a minimum amount, a nominal amount, a maximum amount, a currency and currency unit of measure;
automatically converting the entered or preset amounts to their corresponding storage amounts; and
automatically converting the entered or preset currency and its currency unit of measure to their corresponding storage currency and storage currency unit of measure.

18. The method according to claim 17 wherein currency values are stored in their entered unit of measure and concurrently dynamically converted and stored in a user's pre-selected standard currency unit of measure.

19. The method according to claim 13 further comprising assigning to the attributed ingrediential object an ingrediential object logical operator for allowing ingrediential objects to participate in derivations or validations of ingrediential object values.

20. The method of claim 19 wherein the logical operator is selected from the group of AND, OR, NOT and =.

21. The method according to claim 13 further comprising including an ingrediential object value operator for making comparisons of the ingrediential object value to a string value as part of participating in a proposition or a formula.

22. The method of claim 21 wherein the value operator is selected from the group of <, >, =, >=, <=, <>.

23. The method according to claim 13 wherein the ingrediential object have a string value for participating in a proposition or formula or derivation.

24. The method of claim 23 wherein the string value is selected from the group of If, Then; Else; Endif; For; Until; Endfor; and Next; plus Constrain, error; Assign; Expression; Exists; Hide; NoEntry; NoPrompt; Required; Table; Table, row, col, cell; Find, where; Join, With, Identifier; And; Or; Null; Min; Max; Nom; Value; Uom; Currency; Returning, objects; True, false.

25. The method of claim 13 wherein the ingrediential object's value can be a derivation expressed as a combination of a logical expression and a SQL query expressed using conventional mathematical syntax and SQL syntax and tailored to cope with the use of context partition and attribute and attribute's numerical value representations, the method comprising:
expressing the logic derivation expression in textual form following derivation syntax;
selecting the specification that is to use the derivation;
storing it as the value of an ingrediential object; and
using context partition and attribute names and roles that correspond with any business object specification that is to use or be involved in the derivation.

26. The method of claim 25 wherein the native derivation expression syntax supports constraints, efficacy checks, validations, formulas, attribute search and where used functions.

27. The method according to claim 25 wherein one or more specification objects or attribute objects or attribute object values participate in or are derived by the specification manipulation language derivation expression.

28. The method of claim 25 wherein the assigned value is a derivation expression within the specification manipulation language for creating custom rules and behaviors is comprised of:
string values;
variables used to refer to values in the list of source objects;
source objects optionally qualified by Context Partition, Role, and Instance Occurrence;
comments;
formulas;
conditional statements;
find statements;
with and where clauses
return clauses
source objects made up of any specification known to prompting in the current prompting session or retrieved during the session;
operators; and
derivation syntax.

29. The method of claim 25 wherein the native derivation syntax include a method selected from a group including Create, Clone, Compose, Compare, Combine, and Comply methods.

30. The method according to claim 25 further comprising attributing one or more ingrediential objects in an object specification template as executable logic expressions by the steps including:
selecting a template specification;
naming a context partition;

naming an instance of the context partition and an instance alternate;

entering the ingrediential object as a derivation expression;

assigning an appropriate role to the ingrediential object; and releasing the specification for use.

31. The method according to claim 25 wherein an ingrediential object's value is dynamically filled by a derivation object inherited from a specification object's parent model template during business object specification content collection prompting.

32. The method of claim 25 further comprising parsing the native form derivation in memory for dynamic execution.

33. The method in accordance with claim 25 wherein a refined ingrediential domain member is further refined by attributing it with governing dimensions, the method further comprising:

selecting the refined attribute ingrediential object whose dimensions are to be bounded; and providing the bounded limits using the minimum and maximum dimensional attributes and their operators.

34. The method in accordance with claim 33 wherein the values within a refined domain bounds equate to a modulus such that the only valid domain values are those that are the product of stated modulus increment times an integer where the product remains within the range.

35. The method in accordance with claim 33 wherein the specific and normally inclusive Lower Domain Value limit and/or the specific normally inclusive Upper Domain Value limit are excluded from the domain range from the domain range comprises Optionally assigning an Exclude Lower Bound Value option to the refined domain ingrediential attribute object's minimum value; and/or Optionally assigning an Exclude Upper Bound Value option to the refined domain ingrediential attribute object's maximum value.

36. The method of claim 25 wherein individual logic aspects of the derivation are collected and stored as individual ingrediential object logic expressions within a set.

37. The method according to claim 25 wherein the component parts of a proposition, constraint, validation, derivation or formula can be stored as individual ingrediential logic expressions, the method comprising the steps of:

using numerical operators as appropriate;

using value operators as appropriate;

using a logical operator;

using an object identifier value; and using a Boolean value.

38. The method according to claim 37 wherein the object processing set includes, in combination, one or more of:

set processing applicabilities;

constraint expressions;

logic expressions;

formula specifications;

capability bounds;

efficacy bounds; and other purposes configured by a user.

39. The method of claim 13 wherein the derivation expression expressed in its native syntactical form is stored in a single ingrediential object in textual form.

40. The method according to claim 13 wherein assignable rules control the visualization of attributes and their attribution and their behavior, the assignable rules being selected from the group comprising radio button versus select list threshold;

partition sequence and page breaks;

attribute presentation sequence;

display control type, the control type being selected from the group including:

check box, select list, radio button, or multi select;

override display name;

max entry length;

initial value;

require entry;

hide attribute;

disallow entry;

disallow label;

disallow duplicates;

disallow multiples;

bypass prompting; and enforce domains.

41. The method according to claim 40 wherein assignable visualization rules are applied to the entry of minimum and/or nominal or and/or maximum numeric values.

42. The claim according to claim 13 wherein optional tolerances are configured for numeric values, the optional tolerances being selected from the group comprising:

require minus tolerance;

require plus tolerance;

display minus tolerance;

display plus tolerance;

hide minus tolerance;

hide plus tolerance; and disallow separate tolerances.

43. The method according to claim 13 wherein derivation expressions are used to dynamically alter attribute object visualization rules during a prompting session.

44. The method according to claim 13 wherein the display form for an ingrediential object's values is dynamically defined by a user, the method further comprising the steps of:

selecting an appropriate model template specification;

selecting an appropriate ingrediential object; and selecting the display form for the ingrediential object's values.

45. A method according to claim 13 for capturing two dimensional array data as an object specification, the method further comprising:

registering a new two dimensional array object specification;

using a rows context partition and context partition slot to identify and capture row entries;

using a columns context partition and context partition slot position to identify and capture column entries; and using a cell context partition and context partition slot and slot position to identify and capture cell entries.

46. The method according to claim 45 wherein two-dimensional array data is presented in table form in support of update and display.

47. The method according to claim 45 wherein two dimensional array data stored as an object specification is converted to a conventional spreadsheet view usable as both the display and the entry view.

48. A method according to claim 45 wherein the step of capturing two dimensional array data in object specification form is qualified as to its use, the method further comprising the steps of:
adding one or more additional context partitions with ingrediential object values for qualifying the use, hence applicability, of the two dimensional array data for a specific business use; and
using the attributes at time of retrieval to determine applicability, hence a this time usability, of the two dimensional array object specification.

49. A method according to claim 45 wherein the ingrediential attribute objects that provide the qualification data are used to represent "n" dimensional array data allowing an object specification of type Two Dimension Array Specification to be an "n" Dimension Array Specification, the method further comprising the steps of:
naming and instantiating a two dimensional specification;
capturing the final two dimensions as Two Dimensional Array Data;
selecting the specification designated control Partition;
adding the remaining "n" dimension data not represented in the Two-Dimensional Array as ingrediential objects in the control Partition;
attributing the ingrediential objects with data values; and
qualifying the data values with other appropriate qualifying attribution.

50. A method according to claim 45 wherein multi-tiered search specifications are used to dynamically retrieve data contained in "n" dimensional object specifications.

51. A method according to claim 45 wherein derivation expressions are used to dynamically retrieve data contained in "n" dimensional object specifications.

52. A method according to claim 45 for providing for a dynamic constraint check of an Ingrediential object value where the constraint values are contained in a two dimensional array specification, the method further comprising the steps of:
configuring an ingrediential object processing set to include the conditions under which the constraint applies and the logic in the form of attributed ingrediential objects that will apply the constraint; and
specifying a method of triggering execution of the constraint.

53. A method according to claim 45 further comprising using the two dimensional array data cell to store a capability limit.

54. The method according to claim 45 further comprising filling an ingrediential object value by selecting a value from values contained in the two dimensional array specification object.

55. The method according to claim 45 wherein multiple values stored in a cell are returned from a cell.

56. The method according to claim 13 wherein new object role behavior is dynamically defined and configured by users, as derivation expressions following the syntax of the specification manipulation language for formulating derivation expressions.

57. The method according to claim 2 wherein the step of assigning a relationship role to the ingrediential object comprises assigning a role for defining the behavior of the ingrediential object in relation to the business object.

58. The method according to claim 2 wherein one or more interactions between definitions of structure and process are defined, the method comprising the steps of:
selecting a process object or a process step object;
selecting or creating a context partition to act as a resource utilization context partition for the process or process step;
populating the utilized resources partition with one or more context partitions from an ontology having ingrediential object content that provides structural ingrediential objects and other resources to the process object; and
using the one or more ingrediential object context partitions as context partition views in each item or each process specification that is to provide structural and other resources to the process step.

59. The method of claim 58 wherein a context partition preexisting in a product or item or the parent process specification that contains ingrediential objects representing structural and other ingrediential object content needed by the process object is added to the process object's utilized resources partition, the method further comprising:
selecting the process specification;
selecting the process specification's utilized resources partition; and
adding a product or item or parent process context partition for providing resources for the process object to its utilized resources context partition.

60. The method according to claim 58 wherein a process or process step retrieves or displays structural and process data needed from the item being acted upon by the process step, the method further comprising:
identifying the item that the process is acting on;
using each process step's resource utilization context partition name to retrieve the relevant ingrediential resource content, if any, that the item provides to the step;
using each process step's resource utilization context partition name to retrieve the relevant ingrediential content, if any, that the process step's parent process definition provides to the step;
using each process step's resource utilization context partition name to retrieve the relevant ingrediential content, if any, that the process step specification itself provides to the step; and
listing the retrieved resources.

61. The method according to claim 58 wherein the retrieved ingrediential structural and process data for the step is displayed by context partition and ingrediential role name and other sequences made possible by the set's ordered list and presentation sequence attributes.

62. The method according to claim 1 further comprising specifying the business object definition for use as a model template for instantiating instances of the defined business object including adding instantiation rules, specification content collection rules and derivation rules.

63. The method according to claim 62 wherein content of the object definition is preset in a parent model template to be inherited by objects instantiated from the parent model template.

64. The method according to claim 63 further comprising:
specifying the ingrediential object as user derivable in the parent model definition;
displaying a derive button next to any instantiated object's displayed ingrediential object when "user derivable" is true; and
invoking the ingrediential object or ingrediential object set processing method when the button is activated by a user;

whereby execution of the ingrediential object or the object processing set is invoked by a derive button associated with the ingrediential object.

65. The method according to claim 63 wherein during update an instantiated object dynamically refers to its parent model for current collection and derivation rules.

66. The method according to claim 63 wherein an instantiated object physically inherits its collection and derivation rules from the parent model at the time of the object's instantiation.

67. The method in accordance with claim 63 wherein dynamic definition and modification of specification content and content rules is preset in derivation expressions inherited from a specification model and executed when encountered during prompting and maintenance of specifications.

68. The method according to claim 62 wherein the model template is configured to the benefit of the model's future instantiated objects to use a tiered search method to dynamically locate and append additional salient ingrediential content, the method comprising:

selecting an object model template;
formulating an ingrediential object derivation expression to use a tiered search to dynamically locate and append additional salient ingrediential object content;
using named preset and derived attributes and prompted attributes as finders to support the tiered search;
naming common attributes of the tiered search;
naming attributes that constrain each level of the tiered search;
adding two or more search templates to the ingrediential object derivation expressions; and
providing for triggering of the ingrediential object expression that dynamically appends content to an object.

69. The method according to claim 62 wherein the step of specifying the business object definition for use as an object model template, the method further comprising the steps of:

registering the business object as an object model template;
optionally enabling revision control for the object model template;
formulating ingrediential objects for the object model template;
providing instantiation rules including collection rules and derivation rules for the ingrediential objects; and
releasing the object model template for use.

70. The method of claim 62 wherein the step of providing collection rules and derivation rules for the ingrediential objects comprises specifying collection rules and derivation rules for each ingrediential object that will appear in objects instantiated from the object model template.

71. The method of claim 62 wherein ordered list and other presentation criteria configured in the model template are specified for an ingrediential object that will appear in objects instantiated from the model template.

72. A method according to claim 62 wherein a leaf model in a model hierarchy is given model template status allowing it to be used to instantiate business object instances that conform to the instantiation criteria of the model template.

73. A method according to claim 72 wherein a business object stored in a hierarchy of business objects can be selected and launched while traversing the hierarchy.

74. A method in accordance with claim 62 for creating a business object specification from a parent model template, the method comprising:

selecting the parent model template;
naming a new business object specification;
prompting for content missing from the new business object;
adding or modifying ingrediential objects to the business object;
running the content and derivation completeness checks inherited from parent model template;
running one or more efficacy checks inherited from the parent model template; and
releasing the business object for use.

75. The method according to claim 62 wherein a new sub-model template definition is created using the create method, the method further comprising:

selecting an existing model template object;
providing an identifier for the new model template object;
executing the create method to instantiate the new model bypassing content that is specific to the source model;
automatically capturing model parentage;
making modifications and additions to the instantiated model's ingrediential content; and
releasing the new model template object.

76. The method according to claim 62 applied for instantiating a new object model template definition, the method further comprising:

selecting an existing model template object;
providing an identifier for the new model template object;
executing the clone method to create a copy of the model using the new identifier while bypassing content that is specific to the source model;
automatically copying the source model's parentage;
making modifications and additions to the cloned model's ingrediential content; and
releasing the new model template object.

77. A method according to claim 62 for storing an object model template and an object model sub-template in a hierarchy of object model templates, the method comprising:

opening a pending revision of the sub template model object;
setting the object model's model parent; and
releasing the object model template.

78. A method according to claim 162 for instantiating a new business object from an object model template, the method further comprising:

providing an identifier for the new business object;
selecting the object model template;
executing a create method for instantiating the new business object with ingrediential objects and rules for capturing and deriving ingrediential object content and ingrediential object content values inherited by the created object;
initializing revision control for the created object;
completing registration of the new business object in a prompting session; and
releasing the business object specification for use.

79. The method according to claim 178 wherein some ingrediential objects represent model template specific data and therefore are not considered when instantiating an object instance's ingrediential object content during the create event.

80. A method for creating a search template according to claim 62 comprising:

registering a new business object;

typing the new business object as a search template;

specifying search criteria as bounded ingrediential objects;

optionally providing additional ingrediential objects for locating and managing the search template; and releasing the business object.

81. A method according to claim 80 for converting a business object to a search template object, the method comprising:

selecting the business object to be converted;

providing an identifier for the new search template object;

cloning the business object to instantiate the new search template object;

converting any attribute nominal values in the instantiated search template object having plus or minus tolerances to range limit values;

adding Boolean criteria to the search template ingrediential objects as required for the search; and releasing the search template object.

82. The method according to claim 1 wherein the step of relating each of the ingrediential objects to the business object comprises relating the ingrediential object acting in the capacity of one or more of an attribute object, a relationship role object, a rendering object, a network connection between the business object's ingrediential role objects, a reference object, and a proposition or derivation expression or SQL find or formula component.

83. The method according to claim 82 wherein:

the step of relating the ingrediential object comprises relating the ingrediential object to act in the capacity of an attribute object or a relationship object; and the method further comprises attributing the ingrediential object by assigning an object identifier value.

84. The method according to claim 82 applied for defining a network of ingrediential objects, the method further comprising:

selecting the business object;

selecting a decomposition context consistent with the type of the network being defined for decomposing the business object into constituent ingrediential objects;

decomposing the business object into the constituent ingrediential objects;

entering the constituent ingrediential objects as ingrediential objects within a selected decomposition context partition;

attributing each ingrediential object as appropriate for use in the network;

then selecting or creating a network context partition; and forming network connections within the selected network context partition;

whereby the ingrediential objects are connected to form the network.

85. The method according to claim 1 wherein a set of attributes collaborate to produce a behavior to the definitional benefit of the business object, the method further comprising:

selecting the business object definition that is to include the set of attributes;

selecting a set of attributes to be processed individually or as a set to achieve the behavior;

assigning the attributes to a context partition slot;

sequencing the attributes using presentation sequence;

assigning a role to each attribute;

assigning values to complete each attribute's role in the processing set, the values being selected from the group of values including object values, object value operators, minimum numerical values, nominal numerical values and maximum numerical values and corresponding numeric value operators, Boolean values, string values, derivation expressions, and attribute logical operators; and providing a rule or rules where needed triggering their execution.

86. The method according to claim 85 wherein:

the step of assigning one or more attributing values comprises assigning attributing values of Integer and Big Decimal for providing dimensional physical relatum; and the method further comprises providing a unit of measure and entering one or more of a minimum numeric value, a nominal numeric value and a maximum numeric value.

87. The method according to claim 86 further comprising:

optionally assigning a numeric value operator to each of the ingrediential object attribute's minimum numeric value, nominal numeric value and maximum numeric value;

optionally entering one or more of the minimum numeric value operator, the nominal numeric value operator and the maximum numeric value operator; and using each of the ingrediential object's entered numeric values and unit of measure and its corresponding numeric value operator to participate in dimensional descriptions and logical expressions.

88. The method according to claim 86 further comprising supporting the unit of measure and numeric values with a definition of precision for Big Decimal.

89. The method according to claim 86 wherein numeric values can be represented as decimal values or fractional mixed numbers in ingrediential attribution and in derivation logic expressions.

90. The method according to claim 86 further comprising dynamically converting at time of entry each of the entered minimum numeric value, the entered nominal numeric value, the entered maximum numeric value and the entered unit of measure to corresponding preset converted storage values.

91. The method according to claim 86 wherein numeric values are stored in their entered unit of measure and concurrently dynamically converted and stored in a user's pre-selected standard unit of measure.

92. The method according to claim 86 further comprising making available to the nominal numeric value a Standard Tolerance UOM, a Tolerance UOM Operator, and a Standard Tolerance Operator provided there is no use of minimum or maximum numeric values.

93. The method according to claim 92 wherein new ingrediential object derivation rules for creating attribute objects and their values are accomplished dynamically without user regard for disparate units of measure that exist for the various values used in a derivation.

94. The method according to claim 86 wherein no nominal numeric value is used and an additional tolerance operator is provided for one or both of a minimum numeric value or a maximum numeric value to support plus/minus variations on one or both of the minimum numeric value and the maximum numeric value.

95. The method according to claim 86 wherein currency conversion rules are dynamically created and extended in support of automatic data conversion.

96. The method according to claim 86 wherein Unit of Measure and tolerance representation rules are dynamically created and extended in support of automatic data conversion.

97. A method according to claim 85 wherein an object efficacy criterion is captured as a specification, the method further comprising the steps of:
registering a new business object;
assigning the new business object an object type of efficacy specification;
selecting and using appropriate efficacy context partitions from ontology context partition names and ingrediential object terms that correspond to those used in object specifications that invoke the efficacy specification;
formulating the ordered set of attributed ingrediential objects that set the efficacy bounds criteria; and
releasing the specification for use.

98. The methods claim 97 wherein the step of executing the requisite validations, including collection and completeness validation or specification efficacy conformance validation or ingrediential network connection efficacy or ingrediential object participation applicability, is performed in response to a user request or an application function or as a validation sub-method within specification revision release.

99. A method according to claim 97 for listing one or more efficacy object specifications for execution by the specification release method to ascertain whether or not the business object specification's content allows it to meet its intended purpose, the method further comprising the steps of:
selecting the model template;
selecting or creating appropriate efficacy objects; and
listing the efficacy objects in a context partition named release validation checks.

100. The method according to claim 97 for using collection and derivation rules inherited from a parent model template to ascertain collection and derivation completeness for the business object specification, the method further comprising:
applying the rules for collection and derivation inherited from the parent template model to the business object's ingrediential content; and
setting the result to a state of pass or fail depending on the conformance of the business object's ingrediential content to the inherited collection and derivation rules.

101. The method according to claim 97 wherein the step of executing the efficacy check or the manufacturing capability assessment method is performed in response to a user request or an application function or a specification release event.

102. The method according to claim 97 wherein an efficacy specification is formulated with a role of manufacturing capability, the method further comprising the steps of:
instantiating an object of type manufacturing capability using the create method;
formulating the manufacturing capability object following the conventions for creating and applying efficacy specifications.

103. The method according to claim 97 wherein a manufacturing capability specification object is used in an ingrediential object processing set to check the manufacturability of the business object specification in which the ingrediential object processing set appears.

104. The method according to claim 85 wherein an ingrediential object's value is dynamically validated as to its efficacy by one or more efficacy objects inherited from a specification object's parent model template comprising the steps of:
selecting the appropriate model template;
selecting or creating one or more efficacy object specifications to be used to dynamically check the efficacy of the business object specification including as appropriate its attribute and relationship object identifier values;
selecting or creating one or more efficacy derivation expressions to be used to dynamically check the efficacy of the business object specification including as appropriate its attribute and relationship object identifier values;
adding the efficacy object specifications and derivation expressions to the model template specification;
setting the derivation ingrediential objects to be inherited during create; and
setting the rules to dynamically trigger execution of the efficacy checking derivation expressions.

105. The method of claim 85 wherein the efficacy specification when applied as an ingrediential object in another specification fulfills a role of constraint check.

106. The method according to claim 85 wherein the Efficacy Bounds criteria takes the form of a single ingrediential object derivation expression within the object specification or within other object specifications known to the object.

107. A method in accordance with claim 85 for creating an applicability object specification for capturing object applicability bounds criteria, the method comprising:
instantiating a new object;
assigning the new object an object type of applicability specification;
using in the new object appropriate context partition names and ingrediential object terms that correspond to context partition names and ingrediential object terms used in object specifications that invoke the applicability specification;
formulating an ordered set of attributed ingrediential objects that set the applicability bounds criteria; and
releasing the specification for use.

108. The method according to claim 85 wherein the Applicability criteria takes the form of a single ingrediential object derivation expression.

109. The method according to claim 85 for providing a type specific extension to an existing model template object, the method further comprising:
Selecting or creating the type specific extension as a model template object;
typing it as an extension template object model;
selecting the existing model to be augmented;
opening a new revision of the existing base model;
making the new extension template object an ingrediential object of the model that it extends;
giving it a role of extension template; and
releasing the newly augmented template object model.

110. A method in accordance with claim 109 wherein the instantiation of a new business object from a model currently augmented with an extension object model template automatically instantiates a consonant instance of extension business object specification object, the method further comprising:
selecting a source model;
running the create method to instantiate a new business object;

observing the existence of an extension model;

running the create method to instantiate an instance of the extension specification; and replacing the ingrediential extension model ID in the newly created business object with the newly created instance of extension specification ID.

111. The method according to claim 110 further comprising providing for the automatic display of an extension specification icon for any business object that has an extension specification.

112. A method according to claim 110 further comprising the step of providing for display of a consonant extension specification comprising:

displaying the extension specification for viewing or updating when the user initiates the display by clicking on a displayed extension specification icon contained within the base specification display.

113. A method according to claim 110 for providing for the automatic display of a consonant extension specification, the method further comprising:

automatically detecting the existence of an extension specification; and automatically providing a window for viewing or updating the extension specification.

114. The method according to claim 110 for providing augmenting type specific content, the method further comprising the additional steps of setting content owner to system or a named system content provider or the installation's standard lexicon equivalent; and setting the role to system owned object extension specification or the installation's standard lexicon equivalent.

115. The method according to claim 110 for creating an additional extension specification model object that is owned and used by a user to extend system-provided base specification content, the method further comprising:

setting content owner to user's company; and setting the role to company owned object extension specification.

116. The method according to claim 85 wherein the ingrediential object itself is another independently managed reusable specification that is appended as an ingrediential object to the business object with an assigned role of sub-specification or similarly behaving role.

117. The method of claim 85 for controlling format and content consistency of business objects of a specified object type, the method further comprising setting a rule for the object type requiring that business objects of the object type must be instantiated from a model template.

118. The method according to claim 1 wherein:

the step of relating each of the ingrediential objects to the business object comprises referencing the object's relationship with an external object identifier; and the step of referencing the ingrediential object's relationship with an external object identifier comprises:

selecting the business object to be referenced;

creating a reference object;

selecting a reference type for the reference object;

selecting or providing a reference context partition for a reference value;

entering the reference value;

entering a reference owner for the reference value;

entering a role for the reference value with respect to the referenced business object;

entering a reference revision for the reference value, when appropriate; and automatically providing a beginning content effectivity revision for the reference and automatically initializing an ending content effectivity revision for the reference for defining a range of revisions.

119. The method according to claim 118 further comprising closing out the applicability of the reference revision to a current range of revisions of the referenced object, the step of closing out the applicability comprising:

selecting the reference object; and setting the reference's referenced object's ending content effectivity revision to the last released revision that is to apply.

120. The method according to claim 118 wherein the step of selecting a reference type for the reference object comprises providing an alias role for specifying the reference object for alias processing.

121. The method according to claim 118 wherein step of selecting a reference type for the reference object comprises providing a topical reference role for processing the reference type as a topical reference.

122. The method according to claim 118 wherein step of selecting a reference type for the reference object comprises providing an index role for processing the reference type as a referential index.

123. The method according to claim 118 further comprising recording a physical location in response to the receipt of a physical manifestation of the reference object.

124. The method according to claim 1 wherein business object definitions are dynamically created or modified by a user without any requirement for intervention or assistance of a programmer or database administrator.

125. The method according to claim 1 wherein any needed definition objects including attributes and context partitions and ingrediential object roles are dynamically created as object definition specifications using a create event.

126. A method according to claim 1 for providing revision control for a computer-processable business object definition, whether the object definition is for an object model template, an object instantiated from an object model template, or an object cloned from an existing object, the method further comprising:

naming the business object;

enabling the revision control;

opening a next revision of the business object;

defining one or more ingrediential objects within a specification construct;

relating each of the ingrediential objects to the business object to define the business object;

making additions or modifications to the open revision of the business object; and releasing the open revision of the business object for use.

127. The method according to claim 126 for optionally enabling the business object's formal participation in revision control at any time in the object's life cycle, the method further comprising:

providing an ingrediential attribute in the specification for setting the enablement of revision control, the attribute including an affirmative state and a negative state;

selecting an enable revision control event for the business object at any time in the business object's life cycle;

setting an ingrediential attribute in the specification for setting the enablement of revision control, the attribute including an affirmative state and a negative state;

setting a revision control parameter to a state for activating use of an open next revision event and a release definition revision event; and activating the display of a latest released revision legend and a pending revision legend for the business object.

128. The method according to claim 126 for reverting a business object currently participating in revision control to a user perceived state of not being under revision control, the method further comprising:

selecting a disable revision control event for the business object;

setting a revision control parameter to a state for deactivating use of an open next revision event and a release definition revision event;

automatically opening a pending revision to receive changes and additions to the definition in the event that there is currently no pending revision in existence; and optionally disabling the display of a latest released revision legend and a pending revision legend for the object.

129. The method according to claim 126 for opening a new revision of the business object under revision control for updates, the method further comprising:

selecting the business object;

selecting an open new revision event;

optionally providing an override release date and time;

automatically validating that the business object is under revision control;

instantiating the new revision;

attributing the new revision with salient revision data including an open revision date and time and release agent; and setting the now open revision to a pending state.

130. A method according to claim 126 for allowing user change of an object revision's revision status, the method further comprising:

selecting the business object;

selecting the business object revision;

selecting a revision event;

executing the event;

validating the ability to change the status; and setting or resetting revision status as appropriate; and sending a lifecycle state change event to the object.

131. The method according to claim 126 further comprising automatically setting an object's revision status by another event, the other event being from a group including an open new revision event or a release revision event.

132. The method according to claim 126 for releasing for use an instantiated business object using revision control, the method further comprising:

selecting the release event;

optionally providing a release date and time;

validating that approvals have been completed;

automatically attributing the revision with release history attributes including a release date, a release time and a release agent;

moving the pending release number to the latest released revision in the registration record;

clearing the pending release number in the registration record; and setting the revision status to the active state.

133. The method according to claim 126 further comprising, upon releasing a revision, executing a definition content validation and an efficacy check comprising:

executing each definition validation and efficacy check method listed, in a content validation and efficacy check partition inherited from the object instance's parent model template;

executing each definition validation and efficacy check method listed in a content validation and efficacy check partition added to the object during its lifecycle prior to the release; and providing an appropriate response should a validation or efficacy check method fail to validate the definition revision for release.

134. The method according to claim 126 wherein a user invokes definition content completeness validation or efficacy and manufacturing capability checks to assess current completeness of the process of capturing and deriving object specification definition content, the method further comprising:

selecting the object to be validated;

selecting the object revision;

selecting a content validation event; and providing in a user format the result of the user executed validation method.

135. The method according to claim 126 further comprising canceling a pending revision and resetting the object definition to its previous state.

136. The method of claim 135 wherein the canceled revision was a pending revision resulting in the physical deletion of its ingrediential object definition content effective for the pending revision.

137. The method of claim 135 wherein the canceled revision causes an ingrediential object participating in the immediately preceding released revision to have its previous ingrediential revision content ending effectivity reset to its previous value.

138. The method of claim 135 wherein the step of canceling a pending revision of comprises physically deleting the object if the object has no previous released revision.

139. The method of claim 135 wherein a previously released revision is cancelled resulting in a new revision status of canceled attributed with author and a time stamp.

140. The method of claim 135 wherein the step of canceling the object comprises using a cancel revision method that cancels each of the object's revisions in reverse succession, with the latest revision being canceled first.

141. A method according to claim 135 for tracking the participation of an ingrediential object and its attributed content in an object definition by specification revision, the method further comprising the:

selecting the object to be updated;

opening a pending revision unless there is already a pending revision ready to accept updates;

adding or modifying ingrediential object definition content;

attributing the ingrediential object addition or modification with a beginning content effectivity revision corresponding to the pending revision and an ending content effectivity revision corresponding to infinity.

142. The method according to claim 135 further comprising the step of terminating the participation of an ingrediential object in an object definition comprising:

selecting the object;

selecting the ingrediential object;

opening a pending revision of the object unless there is already a pending revision ready to accept updates;

selecting the pending revision applying the delete event to the ingrediential object thereby physically deleting any ingrediential object content applying to the pending revision from the object definition; and setting an ending content effectivity revision for any immediately preceding released revision to the current pending revision number minus one in the event that the ingrediential object has a previous released revision.

143. The method according to claim 135 wherein an ingrediential object is given a specific stipulated revision that is to be effective for a range of object revisions beginning with the current open revision, the method further comprising:
selecting the object to be updated;
opening a pending revision unless there is already a pending revision ready to accept content definition data;
selecting the ingrediential object;
providing the ingrediential object with a specific ingrediential object revision;
setting beginning content effectivity revision to the pending revision; and
setting ending content effectivity to a value corresponding to infinity.

144. The method according to claim 143 wherein a stipulated ingrediential object revision is modified or cleared for future revisions, further comprising the steps of:
selecting the object to be updated;
opening a pending revision unless there is already a pending revision ready to accept updates;
selecting the ingrediential object; and
changing the ingrediential object's revision.

145. The method according to claim 143 wherein the ingrediential object revision is managed as a range of revisions that is effective for a range of revisions of the object being defined.

146. A method according to claim 135 wherein specification to specification operations of Create, Clone, Compose, Combine, and Renew automatically initialize or reinitialize revision control in the target specification.

147. The method according to claim 146 wherein the business object is revision controlled and the specification to specification method automatically opens a new revision of the target business object to accept object content and content rules.

148. The method according to claim 146 further comprising allowing a user to request that the automatically opened revision of the business object be automatically released at the conclusion of the specification to specification method.

149. The method according to claim 146 wherein using an application function to run the specification to specification method will automatically release the pending revision provided the application function automatically opened the pending revision.

150. A method according to claim 135 wherein future objects instantiated from a given business object specification template will be automatically placed under revision control, the method further comprising:
providing an ingrediential attribute in the specification template for setting the enablement of revision control for objects instantiated from the model template object, the attribute including an affirmative state and a negative state;
selecting the business object template specification; and
presetting the attribute state to affirmative for enablement of revision control for each object subsequently instantiated from the model template object.

151. A method according to claim 126 wherein future business objects instantiated from a given business object specification template will not be automatically placed under revision control, the method further comprising:
providing an ingrediential attribute in the specification template for setting the enablement of revision control for objects instantiated from the model template object, the attribute including an affirmative state and a negative state;
selecting the business object template specification; and
presetting the attribute state to the negative for enablement of revision control for each object subsequently instantiated from the model template object.

152. A method according to claim 1 for instantiating a new business object from an existing source business object, the method further comprising:
providing an identifier for the new business object;
naming as a source object a business object specification or a model template object specification;
executing a clone method for instantiating the new business object from the source object by copying the source object ingrediential objects with its rules for capturing and deriving ingrediential object content and ingrediential object content values;
copying parent model heritage and/or compose heritage if any;
initializing revision control for the cloned object; and
automatically releasing the new business object specification for use.

153. The method according to claim 152 wherein some ingrediential objects represent object specific data and thereby are not considered by the clone event.

154. The method according to claim 1 wherein the execution of functions and methods in support of this claim are performed in response to a user request.

155. The method according to claim 1 wherein the execution of methods in support of this claim is performed in response to an application function.

156. A method for constraining values of an object by a domain, the method comprising:
providing a domain;
attaching the domain to an object to domain the object; and
automatically performing an object value domain check wherever the domained object is used in a capacity of attribute object.

157. The method of claim 156 wherein the step of providing a domain specification is comprised of:
creating an object;
typing the object as a domain specification;
selecting a context partition;
adding domain values as ingrediential objects;
giving each ingrediential object a role; and
releasing the specification for use.

158. The method of claim 156 wherein the step of providing a named partition and a named role uses specific partition names and role names that allow the specified domain values to be specific to specification attributes having those context and/or role assignments.

159. The method of claim 156 wherein the step of providing domain values takes the form of attribution refinements.

160. The method in accordance with claim 156 wherein providing the domain includes naming an external domain taking the form of a relational table.

161. A method according to claim 156 using an object specification to use a refined subset of an object's domain values, further comprising:

selecting the object that is to use the refined subset of domain values;

selecting the subset of the refined object domain values that are to used;

giving each added domain refinement value a context partition;

giving each added domain refinement value a role;

adding the subset of domain values as refinement ingrediential objects; and releasing the specification for use.

162. The method according to claim 161 wherein the same attribute within another context can be given a different subset of domain values.

163. The method according to claim 161 wherein the same attribute within another role can be given a different subset of domain values.

164. A method according to claim 161 wherein an attribute's value is matched to refinement domain values through a sequence of choices, the method further comprising:

running a scan of the domain refinements for
a match on context partition and role;
a match on context partition and a role of "Any Role"
a match on role and a context of "Any Partition";
a match on "Any Partition", the "Generic Attribute" and "Any Role";

stopping the scan at any time that a match is made and using the refinement domain; and returning a "domain non-match" when the scan fails to find a match.

165. The method according to claim 156 further comprising the step of associating a domain object with a specification attribute, the step of associating comprising:

selecting the object specification;

selecting the ingrediential attribute object that is to be domained; and assigning the domain object to the object's specification attribute via its attribution record.

166. The method according to claim 156 wherein a superset of domain values can be shared across multiple roles and contexts and in different specifications while specific values in the domain superset are excluded based on named context or role or specification, the method further comprising:

selecting the specification that requires a subset of an existing domain;

selecting the attribute that requires the domain;

assigning the domain specification to the attribute;

adding a refined domain ingrediential attribute object for the domain value that is to be excluded;

setting the added refined domain's Exclude Value to "Yes" or "True".

167. The method according to claim 156 wherein the set of finite contiguous domain values can be represented by a single refined domain ingrediential attribute object comprising the steps of selecting the specification that requires the bounded enumerated domain;

adding a refined domain ingrediential attribute object;

setting the added attribute object's minimum value with the lower bounds of the enumerated domain; and setting the added attribute object's maximum value with the upper bounds of the enumerated domain.

168. The method according to claim 156 further comprising associating a domain query box with the ingrediential object to be domained for facilitating user selection of a valid domain value.

169. The method according to claim 156 wherein a domain value listed in a domain specification is generalized In order to provide the same domain to an attribute that exists in multiple partitions or with multiple roles, the method further comprising the steps of:

Selecting the domain specification;

Selecting the domain value whose use is to be generalized;

Using "Any" as a reserved word for a Partition to signify a Partition that will match every Partition name to which it is compared;

Using "Any" as a reserved word for a Role to signify a Role that will match every Role name to which it is compared;

Releasing the domain specification for use.

170. The method according to claim 156 wherein a domain value listed in a domain specification is generalized in order to provide the same domain to an attribute that has name variations all of which share a domain, further comprising:

specifying a generic attribute in a class to value rule for a primitive class; and providing the rule with a unique default attribute class unique for the primitive class to facilitate a match with every attribute of that type to which it is compared.

171. The method according to claim 156 wherein an object has assigned to it a combination of domains consisting of domains maintained for objects used as specification attribute objects and/or domain specifications assigned to an attribute object in a specification as part of the attribute object's attribution including taxonomy domains, and/or domain refinements maintained in the specification itself.

172. The method according to claim 156 wherein the integrity of the domain process is assured by requiring that any external domain attached to an ingrediential attribute object be a subset of the object domain and that any domain refinements should they exist be a subset of the external domain should it exist and should it not exist they must be a subset of the attribute object's domain should it exist.

173. The method according to claim 156 wherein domains for different but related attributes are organized in a hierarchy of domains further comprising:

instantiating a specification of type domain hierarchy;

laying out the hierarchy of attribute domains;

assigning each of the ingrediential attribute objects a unique number;

entering the attributes and their values as specification ingrediential attribute objects;

using the unique attribute numbers as the ingrediential attribute slot instance numbers for their respective attributes;

giving each attribute a hierarchical parent by using the selected attribute parent's unique number as the ingrediential attribute object's slot alternate instance number;

repeating the previous step until all attributes except the apex attribute have hierarchical parents; and releasing the specification for use.

174. The method according to claim 156 wherein a taxonomic domain specification conforming to a selected taxonomy domain hierarchy is populated with domain values, the method further comprising:

instantiating a specification of type taxonomy domain;

using the selected hierarchy domain as the assigned taxonomy domain hierarchy;

selecting an attribute domain within the taxonomy hierarchy to load;

selecting its parent attribute's unique instance number from the taxonomy domain hierarchy specification loading attribute values using the next available Taxonomy Domain Specification Instance Number and the parent attribute's unique instance number as the alternate slot instance number;

repeating the previous three steps until there are no more attribute domain values to load; and releasing the specification for use.

175. The method according to claim 174 wherein a taxonomy domain contains a singular attribute domain that when used works in concert with the domain hierarchy specification that it references.

176. The method according to claim 174 wherein a taxonomic domain specification is applied to specification attributes to govern valid attribute value to attribute value combinations, the method further comprising:

selecting a specification whose attribute values are to be governed by attribute values within the taxonomic domain specification;

attaching the taxonomic domain specification to each attribute object that is to use the taxonomic domain.

177. The method according to claim 176 wherein user selection of any taxonomy domain value in a transaction is limited to values contained within the controlling taxonomic domain specification.

178. The method according to claim 174 wherein attributes and attribute values participating in a taxonomic domain specification are displayed for user consideration during transaction processing comprising the steps of providing a drop down control for each attribute participating in the taxonomic domain specification;

displaying all attribute values in the drop down control list;

highlighting values in the drop down that are no longer usable given the complement of other user entries that were previously made; and sorting domain values such that values that are valid based on current attribute selections are shown at the top of the drop down lists and values that are not valid are shown at the end of the list with prefix of "x" or other means of highlighting these values as invalid; and displaying each attribute's current attribute value if any with its validity highlighting if any in its control box.

179. The method according to claim 174 wherein taxonomic domain validation is triggered by user selection of a value from a taxonomy domain drop box, the method further comprising:

initializing each of the taxonomic domain drop lists;

accepting a domain value for validation;

verifying its existence in the appropriate taxonomic domain drop list;

marking the selected domain value as "valid";

using the governing taxonomic domain hierarchy proceed to the drop list representing the immediate next higher parent domain specified in the domain hierarchy specification;

marking each value found at this level as "valid" if the immediate preceding sub level contains a "valid" child for the parent value;

repeating the previous two steps until the apex domain has been processed;

beginning at the apex, processing each sub node drop list moving from top to bottom in the taxonomy domain hierarchy marking each value at a lower child level as "invalid" if it has a parent domain value marked as "invalid" and "valid" if it has a parent marked as "valid";

returning the processed domain value drop lists with all temporarily invalidated domain values identified to the user display.

180. The method according to claim 156 wherein the selection of the applicable domain value from the set of possible domain specifications is derived at run time via a priority sequence consideration of sources, the method further comprising:

first looking at the current specification for value refinements for the attribute;

if any are found that are inclusive at any level of generalization, stopping the search and using the domain;

if any exclude refinements are encountered, accumulating them;

then giving consideration to a domain specification assigned to the attribute object as part of its attribution record;

if an external domain specification is found, searching across all levels of generalization;

if any inclusive refinements are encountered, stopping the search and apply accumulated excludes;

if there are no inclusive refinements, accumulating any exclude refinements encountered;

if the domain has not been resolved on the external specification, making a search for a refinement specification on the attribute object itself;

if there is a refinement specification on the attribute, retrieving and searching across all levels of generalization;

whereby all inclusive refinements will have the excludes removed to form the domain that is used.

181. A method for composing a new business object from a base object and a supplementing object, the method further comprising:

selecting the base object;

selecting the supplementing object;

providing an identifier for the new business object;

selecting a fill rule for causing an ingrediential object in the supplementing object that matches a corresponding ingrediential object in the base object to fill the base ingrediential object's attribution with the supplementing object's attribution;

optionally setting an augmentation rule to cause ingrediential objects in the supplementing object that do not appear in the base object to be added to the new business object;

executing a compose method against the base object and the supplementing object for composing the new business object using the fill rule and the augmentation rule;

initializing revision control for the cloned object; and automatically releasing the new object specification for use.

182. The method according to claim 181 wherein the fill rule overlays or combines the base object's ingrediential object attribution values and rules with the supplementing object's ingrediential object attribution values and rules.

183. The method according to claim 181 wherein the fill rule replaces the base object's attribution with the supplementing object's attribution.

184. The method according to claim 181 wherein the fill rule fills the base object's numeric attribution with a tightest value of the attribution numeric values of the base object and the supplementing object.

185. The method according to claim 181 wherein the fill rule fills the base object's numeric attribution with a loosest numeric value of the attribution numeric values of the base object and the supplementing object.

186. The method according to claim 181 wherein the fill rule combines non-numeric attribution of the base object and a non-numeric attribution of the supplementing object resulting in an additional ingrediential object values in the base object.

187. The method according to claim 181 wherein the new business object specification is the base object specification.

188. The method according to claim 181 wherein a multi-level compose method is used for composing a plurality of business objects together in one event to produce a result specification, the method further comprising:
  selecting a base object;
  selecting or creating an ordered list of supplementing compose objects for composing into the base object to produce the result specification;
  naming or selecting the result specification; and
  executing a multi-compose method for composing the result specification.

189. The method of claim 188 wherein the ordered list of supplementing compose objects comprises a partition set of ingrediential objects appearing in the base object specification.

190. The multi-level compose method of claim 188 wherein one or more ingredients in the ordered list comprises a sequence of tiered search templates used by the multi-level compose method to dynamically locate multiple objects that provide the additional plurality of business objects that are to augment the base object.

191. The multi-level compose method of claim 188 wherein the ordered list of supplementing compose objects comprises one or more logic expressions each given a role in providing or retrieving the supplementing compose objects.

192. The multi-level compose method of claim 188 wherein the ordered list of supplementing compose objects comprise one or more logic expressions each given a role in providing or retrieving the supplementing compose objects.

193. The multi-level compose method of claim 188 wherein at least one of the ingrediential objects configured in the ingrediential object ordered list comprises an attribute used as a finder by search template objects that follow the finder in the ingrediential object set.

194. The multi-level compose method of claim 188 wherein an ingrediential object ordered list configured as part of a parent model template of the base object includes criteria required for running the multi-level object compose method.

195. The multi-level compose method according to claim 188 wherein the ingrediential object ordered list includes an ingrediential object filling the role of search template finder that requires dynamic user prompting to collect its object values.

196. The multi-level compose method of claim 188 wherein one or more ingrediential objects sequenced at the beginning of the ingrediential object ordered list are used to dynamically determine the appropriateness of using any subsequent compose sources included in the ingrediential object processing set.

197. The multi-level compose method according to claim 188 wherein ingrediential objects in the ingrediential object ordered list filling a role of set applicability attribute requires dynamic user prompting to collect its object values.

198. The method of claim 188 wherein the step of executing the multi-level compose method is triggered during user specification content capture prompting.

199. A method for combining two business object specifications to obtain a result specification that causes matching ingrediential objects having numeric values to have a minimum and a maximum but no nominal values where the minimum is the least of the minimum and the nominal values and the maximum is the greatest of the maximum and nominal values, and wherein matching ingrediential object non-numeric valued objects are both included in the result specification as multi instance ingredients; and wherein non matched ingrediential objects from the base and the supplement specification together are included in the result specification, the method comprising the steps of:
  identifying a specification as the base object;
  identifying a specification as the supplementing object;
  selecting the combine event; and
  executing the combine method.

200. A method for comparing a first business object definition with a second business object definition to ascertain differences or similarities between the first business object definition and the second business object definition, the method comprising the steps of:
  selecting the first business object definition;
  selecting the second business object definition;
  setting comparison rules for comparing attributes and attribute values of the first business object definition with attributes and attribute values of the second business object definition; and
  executing a compare method between the first object definition and the second object definition based on the compare rules.

201. A method in accordance with claim 200 wherein the degree of comparison are scored by putting a weight on a partition context and by putting a weight on ingrediential attribute objects and their values within a context partition.

202. The compare method according to claim 200 wherein the compare method is used to determine whether the first business object definition is a true subset of the second business object definition.

203. A method for refreshing the ingrediential object content of a business object, the content including instantiation rules, preset values, collection rules, and derivation rules, so that the ingrediential object content of the business object is consistent with the ingrediential object instantiation content of a parent model template from which the business object was instantiated, the method comprising
  selecting the business object to be renewed;
  selecting a renew event;
  optionally designating a desired revision of the parent model template in place of a latest active released revision of the parent model template; and
  running a renew method to refresh the business object by synchronizing the business object's instantiation rules, preset values, collection rules and derivation rules with those of the parent model template.

204. The method according to claim 203 further comprising running the renew method to refresh in mass a plurality of existing instances of business objects instantiated from a given parent model template in response to a user request.

205. The method according to claim 204 wherein the step of running the renew method to refresh in mass comprises:
selecting a mass renew event;
providing the mass renew event with a list of business object instances to be refreshed; and
running the renew method for each object instance in the list of business object instances in accordance with the each object instance's parent model template.

206. A method for locating uses of a specific object of interest as an ingrediential object within a business object definition, the method comprising:
naming the object of interest;
selecting a where used event;
optionally requesting only uses of the object of interest that occur in a specific context partition;
optionally requesting only uses of the object that occur for a specific ingrediential object role;
optionally requesting only uses of the object that occur for a specific ingrediential object revision;
considering only the business object's latest revision or only the business object's open pending revisions;
executing the where used method; and
returning a displayed list of using business objects each with the context partition name and role in which the object of interest is used as an ingrediential object.

207. A method for performing a search of a plurality of business objects to find business objects that conform to designated search criteria, the method comprising:
providing the designated search criteria; and
executing a search method to search the plurality of business objects for business objects that conform to the designated search criteria.

208. The method of claim 207 wherein the step of providing the selected search criteria comprises providing one or more attribute objects wherein each attribute object is qualified by a value or a range of values.

209. The method of claim 207 wherein the step of providing one or more attribute objects comprises weighting selected attribute objects according to their importance in the search.

210. The method of claim 207 wherein the step of providing the selected search criteria comprises adding additional criteria by qualifying the attribute object with its context partition or its role.

211. The method of claim 207 wherein the step of providing the designated search criteria comprises providing one or more relationship objects each optionally qualified by a named partition context, a specific role or a specific revision.

212. The method of claim 207 wherein the execution also searches an ingrediential object's textual values for use of designated objects each optionally qualified by their context partition, their values, and their roles.

213. The method of claim 207 wherein the step of providing the designated search criteria comprises providing one or more rendering objects each optionally qualified by a named partition context, a specific topic or a specific owner.

214. The method of claim 207 wherein the step of providing the designated search criteria comprises providing reference objects each optionally qualified by a named partition context, a specific role or a specific owner.

215. A method according to claim 207 applied to a multi-tiered search to produce a list of result specifications containing one or more common attributes, the method further comprising:
providing a list of search templates having one or more common attributes;
sequencing the list of search templates;
naming one or more common attributes;
identifying constraining attributes for each level of the tiered search; and
executing the tiered search method.

216. A method according to claim 207 where a search is imbedded within a derivation expression using the specification manipulation language find syntax.

217. A method for prompting a user for object specification content during a specification capture session, the method comprising:
selecting an object specification;
triggering a prompted collection and derivation session;
prompting the user by context partition for entry of ingrediential objects or their values, or both; and
repeating the prompting until all specification definition content is completed or the prompting session is abandoned.

218. The method according to claim 217 wherein the method is invoked by a user or by an application function.

219. The method according to claim 217 wherein the prompted context partition can be a page of context partitions, the method further comprising including an ingrediential object in the last partition in the page whose role is page break.

220. The method according to claim 217 applied for prompted definition capture to always display certain ingrediential content objects during a prompted specification capture session regardless of their current state of definitional completeness, the method further comprising:
selecting the appropriate object template specification;
selecting an ingrediential object; and
setting the rule for "always include this ingrediential object in a prompt session".

221. The method according to claim 217 wherein a prompted object definition content session prompts only for missing object definition content for those objects instantiated from a particular model, the method further comprising:
selecting the particular object model template;
setting the prompting mode rule to display only objects within a context partition having missing or incomplete specification content; and
running the prompted definition capture session in the exception mode for any object specification instantiated from the model.

222. The method according to claim 217 wherein an ingrediential object's no-prompt attribution rule value is dynamically set or reset during a prompting session by a derivation expression contained within the same specification.

223. The method according to claim 217 wherein a partition can be given the status of page header for prompted object definition display and for other rendering of object specifications, the method further comprising:
selecting an object specification;
selecting or creating a partition to behave as a page header;
setting the partition rule option for display as a page header; and releasing the object specification for use.

224. The method according to claim 217 wherein a partition can be prompted a variable number of times in accordance with a user response to an iteration count question encountered during a prompting session, the method further comprising:
  adding an additional ingrediential object whose attribution content comprises:
    a partition name named for the partition that is to contain the iteration count question that the user answers
    an appropriately named iteration count attribute object;
    a role of partition iteration;
    the name of the target partition that is to be prompted multiple times; and
    a presentation sequence number to position it for display;
  adding appropriate domain refinements to the specification to bound the entered iteration count value; and
  providing for dynamic execution of the Partition Iteration method upon entry of the iteration count.

225. The method according to claim 217 wherein a partition having one or more attributing objects can be dynamically invoked for participation and display in a prompting session by the entry of a single domained attribute object value, the method further comprising:
  adding an additional ingrediential object whose attribution content comprises
    the Partition name that is to contain the Partition Selection attribute object;
    an appropriately named attribute object whose entered value is to trigger the in-line display of the Partition;
    a presentation sequence number to position it for display; and
    the ID for the target partition that will be invoked;
    a Role of Partition Iteration;
  adding appropriate domain refinements to the specification to bound the entered attribute object value; and
  providing for dynamic execution of the Partition Selection method that will providing for the in-line display of the target partition upon entry of the single domained attribute object value.

226. A method according to claim 217 for using an applicability object expression positioned within a partition to determine the relevance of automatically at the moment bypassing prompting or executing of other ingrediential objects within the partition, the method further comprising:
  adding an additional ingrediential object whose attribution content comprises:
    a Partition name equating to the Partition that is bypassed;
    an appropriately named text attribute object;
    a Role of Partition Applicability;
    and a value that contains the derivation expression applicability criteria; and
  providing for dynamic execution of the Partition Applicability method when the Partition is encountered during a prompting session.

227. The method according to claim 217 wherein there can be multiple Partition Applicability expressions within a Partition.

228. The method according to claim 217 wherein a derivation expression is dynamically executed immediately prior to the display of a page during a prompting session, the method further comprising:
  adding an ingrediential object to the specification whose attribution content comprises:
    a Partition name named for a Partition within the page whose immediate pending display is to trigger the precondition derivation expression object;
    an appropriately named text attribute object;
    a Role of Partition Precondition; and
    a derivation expression that contains the derivation expression;
  providing for dynamic execution of the Partition Applicability method when the Partition is encountered during a prompting session.

229. The method according to claim 228 wherein there can be multiple Partition Precondition expressions within a Partition.

230. The method according to claim 217 wherein during a prompting session, a derivation expression is dynamically executed immediately after the completion of user visible attribute objects contained on a prompting page and before proceeding to a next page, the method further comprising:
  adding an ingrediential object to the specification whose attribution content comprises:
    a Partition name named for a Partition within the page whose prompting completion triggers the Post Condition derivation expression object;
    an appropriately named text attribute object;
    a Role of Partition Post Condition; and
    a derivation expression that contains the post condition derivation expression; and
  providing for dynamic execution of the Partition Post Condition method when the Partition is completed during a prompting session.

231. The method according to claim 230 wherein there can be multiple Partition Post Condition expressions within a Partition.

232. The method according to claim 217 wherein during a prompting session a derivation expression is dynamically executed immediately prior to the display of a Partition to validate the efficacy of the Partition's data content, the method further comprising:
  adding an ingrediential object to the specification whose attribution content comprises:
    a Partition name named for a Partition whose data content is to be validated prior to its display in a prompting session;
    an appropriately named text attribute object;
    a Role of Partition Validation; and
    a derivation expression that will verify the efficacy of the Partition data; and
  providing for dynamic execution of the Partition Validation method when the Partition is encountered during a prompting session.

233. The method according to claim 217 wherein during a prompting session a combination of ingrediential objects within an attribution instance set provides the criteria for dynamic creation and prompting of a next specification, the method further comprising:
  selecting or adding a prompting partition to the appropriate specification model;
  selecting an instance number to serve as a Next Prompt Specification Set;
  optionally adding an attribute object with a Role of Applicability to the Next Specification set whose Derivation expression provides dynamic determination of the appropriateness of running the next prompt specification set;
  optionally adding an attribute object with a Role of Preparation to the Next Specification set that provides a Derivation expression to dynamically prepare for Next Specification prompting including optional selection of the Next Specification Model;

optionally adding an attribute object with a Role of Reuse to the Next Specification set to permit an existing specification with the same designated parent model to serve in the capacity of Next Specification; and providing an ingrediential attribute object with a Role of Next Specification to the Next Specification set to hold the dynamically created next specification instance.

234. The Method according to claim 233, wherein within the specification's Prompting Partition there can be multiple Next Prompt Spec sets containing multiple Applicability and Preparation attribute objects.

235. The Method according to claim 233 wherein specifications created by the Next Prompt Specification are hierarchically linked in a sub specification capacity forward and backward.

236. A system for creating a computer-processable definition of a business object, the system comprising:

a processor programmed to:

name the business object;

define one or more ingrediential objects within a specification construct including revision control for providing content effectivity and composition effectivity; and relate each of the ingrediential objects to the business object to define the business object.

237. The method according to claim 97 wherein an ingrediential object's value is dynamically validated as to its efficacy, such as manufacturability, using a limit dynamically retrieved from a two-dimensional data array domain.

* * * * *